US010576873B2

(12) United States Patent
Ichikawa et al.

(10) Patent No.: US 10,576,873 B2
(45) Date of Patent: Mar. 3, 2020

(54) VEHICLE LAMP AND VEHICLE LAMP CONTROL SYSTEM

(71) Applicant: KOITO MANUFACTURING CO., LTD., Minato-ku, Tokyo (JP)

(72) Inventors: Tomoyuki Ichikawa, Shizuoka (JP); Toshiaki Tsuda, Shizuoka (JP); Noriko Sato, Shizuoka (JP); Masanobu Mizuno, Shizuoka (JP); Osamu Kuboyama, Shizuoka (JP); Takeshi Masuda, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 16/572,890

(22) Filed: Sep. 17, 2019

(65) Prior Publication Data

US 2020/0010012 A1 Jan. 9, 2020

Related U.S. Application Data

(62) Division of application No. 15/123,537, filed as application No. PCT/JP2015/054928 on Feb. 23, 2015, now Pat. No. 10,457,193.

(30) Foreign Application Priority Data

Mar. 3, 2014 (JP) .................................. 2014-040193
Apr. 2, 2014 (JP) .................................. 2014-076421
Apr. 7, 2014 (JP) .................................. 2014-078554

(51) Int. Cl.
*B60Q 1/18* (2006.01)
*B60Q 1/068* (2006.01)
(Continued)

(52) U.S. Cl.
CPC ............. *B60Q 1/0683* (2013.01); *B60Q 1/18* (2013.01); *F21Y 2115/10* (2016.08); *F21Y 2115/30* (2016.08)

(58) Field of Classification Search
CPC .......... F21S 41/14; F21S 41/16; F21S 41/143; F21S 41/657; F21S 43/13
See application file for complete search history.

(56) References Cited

U.S. PATENT DOCUMENTS 9,221,509 B2 * 12/2015 Lai ........................... B62J 6/001
2003/0147247 A1 * 8/2003 Koike .................... B60Q 1/484
362/464

(Continued)

FOREIGN PATENT DOCUMENTS

DE 197 31 754 A1 2/1999
DE 10 2009 051 485 A1 6/2010
(Continued)

OTHER PUBLICATIONS

Communication dated Feb. 4, 2019, issued by the European Patent Office in counterpart European Application No. 18191789.9.
(Continued)

*Primary Examiner* — Alexander K Garlen
*Assistant Examiner* — Eric T Eide
(74) *Attorney, Agent, or Firm* — Sughrue Mion, PLLC

(57) ABSTRACT

A vehicle lamp includes a laser light source that is able to emit laser light and emits laser light generated by the laser light source forward from an emission end, and an optical mechanism that performs scanning with the laser light and depicts a figure in an irradiation destination.

1 Claim, 28 Drawing Sheets

(51) Int. Cl.
*F21S 41/65* (2018.01)
*F21S 41/663* (2018.01)
*F21S 41/675* (2018.01)
*F21Y 115/10* (2016.01)
*F21Y 115/30* (2016.01)

(56) References Cited

U.S. PATENT DOCUMENTS

| | | | |
|---|---|---|---|
| 2007/0025105 A1 | 2/2007 | Inoue et al. | |
| 2008/0062709 A1 | 3/2008 | Mochizuki et al. | |
| 2008/0225544 A1 | 9/2008 | Fujiwara et al. | |
| 2009/0015388 A1* | 1/2009 | Yagi | B60Q 1/0035 340/435 |
| 2009/0046474 A1* | 2/2009 | Sato | B60Q 1/076 362/466 |
| 2010/0264824 A1 | 10/2010 | Gotz et al. | |
| 2011/0012511 A1 | 1/2011 | Watanabe | |
| 2012/0106189 A1 | 5/2012 | Takahashi | |
| 2012/0327678 A1 | 12/2012 | Koike et al. | |
| 2013/0027962 A1 | 1/2013 | Takahashi | |
| 2013/0058816 A1 | 3/2013 | Galbas et al. | |
| 2013/0148371 A1 | 6/2013 | Kim | |
| 2013/0235601 A1 | 9/2013 | Takahashi | |
| 2014/0003070 A1* | 1/2014 | Nakaya | B60Q 1/08 362/466 |
| 2014/0042325 A1 | 2/2014 | Yamamura | |
| 2014/0062685 A1* | 3/2014 | Tamatsu | B60Q 5/005 340/425.5 |
| 2014/0071702 A1 | 3/2014 | Faber et al. | |
| 2014/0254188 A1 | 9/2014 | Masuda et al. | |
| 2014/0264395 A1* | 9/2014 | Lee | H01L 27/15 257/88 |
| 2014/0301102 A1* | 10/2014 | Han | F21S 41/663 362/520 |
| 2015/0191115 A1 | 7/2015 | Yamamura | |
| 2015/0369437 A1* | 12/2015 | Reinprecht | F21S 41/16 362/510 |
| 2017/0080848 A1* | 3/2017 | Christmas | B60Q 1/16 |

FOREIGN PATENT DOCUMENTS

| | | |
|---|---|---|
| DE | 10 2011 004 937 A1 | 9/2012 |
| DE | 10 2012 209 927 A1 | 12/2013 |
| EP | 2 071 228 A2 | 6/2009 |
| EP | 2772682 A2 | 9/2014 |
| JP | 2003-231438 A | 8/2003 |
| JP | 2007-35513 A | 2/2007 |
| JP | 2008-45870 A | 2/2008 |
| JP | 2006040707 A | 2/2009 |
| JP | 2009-48786 A | 3/2009 |
| JP | 2009-286199 A | 12/2009 |
| JP | 2010-36835 A | 2/2010 |
| JP | 2013-132984 A | 7/2013 |
| JP | 2013-134887 A | 7/2013 |
| JP | 2014022084 A | 2/2014 |
| WO | 2013088673 A1 | 6/2013 |
| WO | 2013099144 A1 | 7/2013 |

OTHER PUBLICATIONS

Communication dated Jan. 2, 2018, from the European Patent Office in counterpart European Application No. 15758179.4.
Communication dated Jan. 25, 2019, issued by the European Patent Office in counterpart European Application No. 18191785.7.
Communication dated Oct. 24, 2018, issued by the State Intellectual Property Office of the People's Republic of China in counterpart Chinese Application No. 201580012062.7.
Communication dated Nov. 14, 2017, issued by the Japanese Patent Office in counterpart Japanese Patent Application No. 2014-040193.
International Search Report dated May 19, 2015 issued by the International Searching Authority in counterpart International Application No. PCT/JP2015/054928 (PCT/ISA/210).
Written Opinion dated May 19, 2015 issued by the International Searching Authority in counterpart International Application No. PCT/JP2015/054928 (PCT/ISA/237).

* cited by examiner

VEHICLE LAMP AND VEHICLE LAMP CONTROL SYSTEM

CROSS-REFERENCE TO RELATED APPLICATIONS

This is a divisional of U.S. patent application Ser. No. 15/123,537, filed Sep. 2, 2016, which is a National Stage of International Application No. PCT/JP2015/054928, filed Feb. 23, 2015, which claims priority from JP Patent Application No. 2014-040193, filed Mar. 3, 2014, JP Patent Application No. 2014-076421, filed Apr. 2, 2014, and JP Patent Application No. 2014-078554, filed Apr. 7, 2014, the contents of which are incorporated herein by reference.

TECHNICAL FIELD

The present invention relates to a vehicle lamp which includes a laser light source irradiating a place on the periphery of a vehicle with laser light, and a vehicle lamp control system.

BACKGROUND ART

JP-A-2008-45870 discloses a laser depiction apparatus which calls the attention of a driver in a vehicle by depicting a predetermined warning mark which indicates the circumstances of a road, on a road surface in a vehicle advancing direction with laser light. The laser depiction apparatus having a depiction system disclosed in JP-A-2008-45870 depicts a mark on a road surface by driving a laser head which radiates a laser.

SUMMARY OF THE INVENTION

In a laser depiction apparatus disclosed in PTL 1, from a viewpoint of making a driver strongly recognize the issuance of "a warning", there are cases where a warning mark is depicted on a road surface in front of a vehicle with laser light in red implying a warning. However, there is concern that laser light in red or the like emitted forward from the vehicle is mistaken as a tail lamp or the like in a case of being erroneously recognized as configuring a portion of a headlamp, or is against the regulation defining that "the color of light of a headlamp shall be white".

In addition, in vehicle lamps, it is required that the form of depiction is improved through the configuration of an irradiation apparatus, the shape of depiction performed with radiation, controlling of depiction, and the like, and the visual recognizability of the circumstances of a road on the periphery of the vehicle is further improved so that a driver more easily grasps the circumstances of a road. Accordingly, in the laser depiction apparatus disclosed in PTL 1, it is necessary to make a driver easily recognize the circumstances of a road by further enhancing the degree of freedom of laser radiation in colors and the like, and depicting lines, marks, and the like having higher visual recognizability.

An object of the present invention of this application is to provide a vehicle lamp of which laser light in red or the like other than white depicting a warning mark and the like in front of a vehicle is prevented from being recognized as configuring a headlamp of the vehicle by a person viewing from a place in front of the vehicle.

Another object of the present invention of this application is to provide a vehicle lamp in which the degree of freedom of laser radiation in colors and the like is enhanced and lines, marks, and the like allowing a driver to more easily recognize the circumstances of a road can be depicted, and a vehicle lamp control system.

According to an aspect of the present invention, there is provided a vehicle lamp including:

(1) a first light source that is able to emit laser light. Laser light generated by the first light source is emitted forward from an emission end. The vehicle lamp further includes a light-shielding member that shields the emission end from light from above to at least a horizontal position in front of the emission end.

(Operation) The emission end emitting laser light is concealed behind the light-shielding member. Thus, the emission end is not visually recognized from a place in front of a vehicle even though light-emitting in red or the like is performed.

(2) The vehicle lamp according to (1) further includes a second light source that generates light distribution pattern forming light in white or yellow, and a light-transmitting member that transmits the light distribution pattern forming light. The emission end is disposed so as to emit the laser light obliquely downward toward a transmissive region of light distribution pattern forming light in the light-transmitting member.

There is concern that laser light in red or the like depicting a figure such as a warning mark and the like is subjected to diffused reflection due to dirt or a scratch present on the light-transmitting member of the vehicle lamp in a case of being transmitted through the light-transmitting member and emitted forward. There is concern that laser light in red or the like subjected to diffused reflection is recognized as a portion of a headlamp by a pedestrian or the like viewing from a place in front of the vehicle.

(Operation) However, in the vehicle lamp of (2), laser light in red or the like oriented obliquely downward intersects a luminous flux of light distribution pattern forming light in white or the like having higher luminance at the transmissive region of the light-transmitting member, that is, a region where the luminous flux of a light distribution pattern forming light in white or the like passes through in the light-transmitting member. As a result thereof, even though diffused reflection occurs in the light-transmitting member due to laser light in red or the like, the light in red or the like subjected to diffused reflection is countervailed by the white light or the like. Thus, the diffused and reflected light in red is not visually recognized from a place in front of the vehicle.

(3) The vehicle lamp according to (2) further includes a lamp body that has an opening portion in the front and internally contains the light sources and the emission end, and a front cover that is the light-transmitting member attached to the lamp body so as to block the opening portion.

(Operation) In the vehicle lamp of (3), laser light in red or the like intersects a luminous flux of light distribution pattern forming light in white having higher luminance at the transmissive region of the front cover. As a result thereof, even though diffused reflection occurs in the front cover due to laser light in red or the like, the light in red subjected to diffused reflection is countervailed by the white light. Thus, the diffused and reflected light in red is not visually recognized from a place in front of the vehicle.

According to the vehicle lamp of (3), a driver in an oncoming vehicle, a pedestrian, or the like viewing the vehicle lamp from a place in front of the vehicle cannot visually recognize diffused and reflected light in red or the like other than white in the front cover. Therefore, it is not possible to recognize that the headlamp is configured to emit laser light in red or the like other than white.

(4) In the vehicle lamp according to (2) or (3), the emission end is disposed above the second light source.

(Operation) Laser light emitted from the emission end is incident on the transmissive region of the light-transmitting member or the like obliquely downward from above the second light source and intersects a luminous flux of light distribution pattern forming light in white having higher luminance at the transmissive region. Even though diffused reflection occurs in the front cover due to laser light in red or the like, light in red or the like subjected to diffused reflection is countervailed by white light and is not visually recognized from a place in front of the vehicle.

(5) In the vehicle lamp according to any one of (1) to (4), the light-shielding member is an extension reflector, and the emission end is disposed behind the extension reflector.

(Operation) The emission end emitting laser light is concealed behind the extension reflector. Thus, the emission end is not visually recognized from a place in front of the vehicle even though light-emitting in red or the like is performed.

(6) In the vehicle lamp according to any one of (1) to (5), the color of the laser light is red.

(Operation) The emission end emitting red laser light which forms marks and the like implying a warning is concealed behind the light-shielding member. Thus, the emission end is not visually recognized from a place in front of the vehicle even though light-emitting in red is performed.

According to another aspect of the present invention, there is provided a vehicle lamp including:

(7) a light source that is able to emit rays of laser light of multiple colors and is able to change the color of irradiation light, and an optical mechanism that receives the laser light and depicts a figure in an irradiation destination.

(Operation) As a result of color mixing with respect to rays of laser light of multiple colors, the color of radiation laser light changes specifically and diversely. Thus, the visual recognizability of figures such as lines and shapes depicted in the irradiation destination for a driver is improved.

(8) In a vehicle lamp control system according to (7), the light source and the optical mechanism are operated by first control means which performs compositing of rays of laser light of multiple colors and radiates the composite laser light as white light, second control means which reduces at least rays of laser light of some colors among the rays of laser light of multiple colors and depicts a dark portion in the irradiation destination, and third control means which radiates light other than white light among the rays of laser light of multiple colors and depicts a bright portion within the dark portion. The reduction of laser light includes both light-off of laser light and light-on of laser light having the luminance lowered while the dark portion is formed.

(Operation) When the dark portion is depicted in a figure which is depicted with laser light, and then, the bright portion intended to be emphasized is depicted within the dark portion, the bright portion is depicted more vividly. Thus, the visual recognizability of a depicted figure is improved.

According to further another aspect of the present invention, there is provided a vehicle lamp including:

(9) a daytime running lamp or a clearance lamp that forms a light emission area by using multiple white LED light sources, and a laser light source that is able to emit laser light other than white. In the vehicle lamp in which the laser light is emitted forward from an emission end, the emission end is disposed so as to be superimposed within the light emission area.

(Operation) Since the emission end emitting laser light leading to light-emitting in red or the like is disposed so as to be superimposed within the light emission area luminant in white due to multiple white LEDs, the luminescent color is countervailed. Thus, the emission end emits light in color other than white which is not visually recognized from a place in front of the vehicle.

(10) In the vehicle lamp according to (9), the light emission area is formed to have multiple reflectors which respectively reflect rays of emission light of the white LED light sources, and the emission end is disposed so as to be superimposed within an insertion portion which is formed among the multiple reflectors.

(Operation) The emission end emitting laser light leading to light-emitting in red or the like is exposed to the front from an insertion hole formed among the reflectors. However, the insertion hole is disposed so as to be superimposed within the light emission area which is formed over the reflectors when light of the multiple white LED light sources is reflected, and the emission end is surrounded by the light emission area of the reflectors. As a result thereof, the luminescent color of laser light of the emission end leading to light-emitting in red or the like is countervailed by rays of reflected light in white from the multiple white LED light sources. Thus, the emission end emitting light in color other than white is not visually recognized from a place in front of the vehicle.

(11) In the vehicle lamp according to (9) or (10), the laser light source forms an overhead sign lamp.

(Operation) The luminescent color of laser light of the emission end leading to light-emitting in red or the like forming the overhead sign lamp is countervailed by white light from the light emission area which emits light from the multiple white LED light sources. Thus, the emission end emitting light in color other than white is not visually recognized from a place in front of the vehicle.

(12) In the vehicle lamp according to any one of (9) to (11), the laser light source depicts a figure on the periphery of a vehicle.

(Operation) The luminescent color of laser light of the emission end depicting a figure on the periphery of the vehicle and leading to light-emitting in red or the like is countervailed by white light from the light emission area which emits light from the multiple white LED light sources. Thus, the emission end emitting light in color other than white is not visually recognized from a place in front of the vehicle.

According to an aspect of the present invention, in the vehicle lamp, a driver in an oncoming vehicle, a pedestrian, or the like viewing the vehicle lamp from a place in front of a vehicle cannot visually recognize the emission end emitting light in red or the like in the vehicle lamp. Therefore, it is not possible to recognize that the headlamp is configured to emit laser light in red or the like other than white.

In addition, according to another aspect of the present invention, in the vehicle lamp, the degree of freedom of laser radiation is improved, and a driver easily recognizes the circumstances of a road.

DETAILED DESCRIPTION OF EMBODIMENTS

Figure 12:
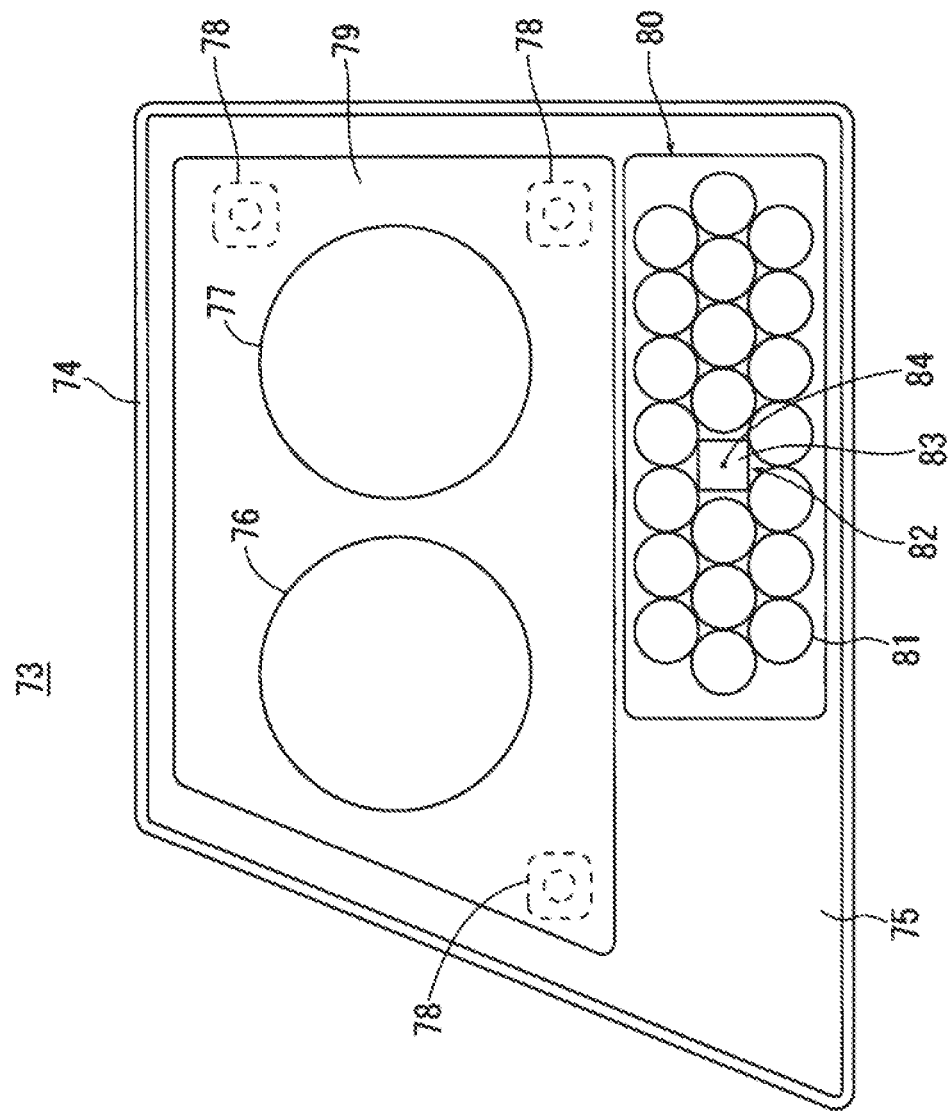
FIG. 12 is a front view of a vehicle lamp in a third example having a DRL.
Figure 13:
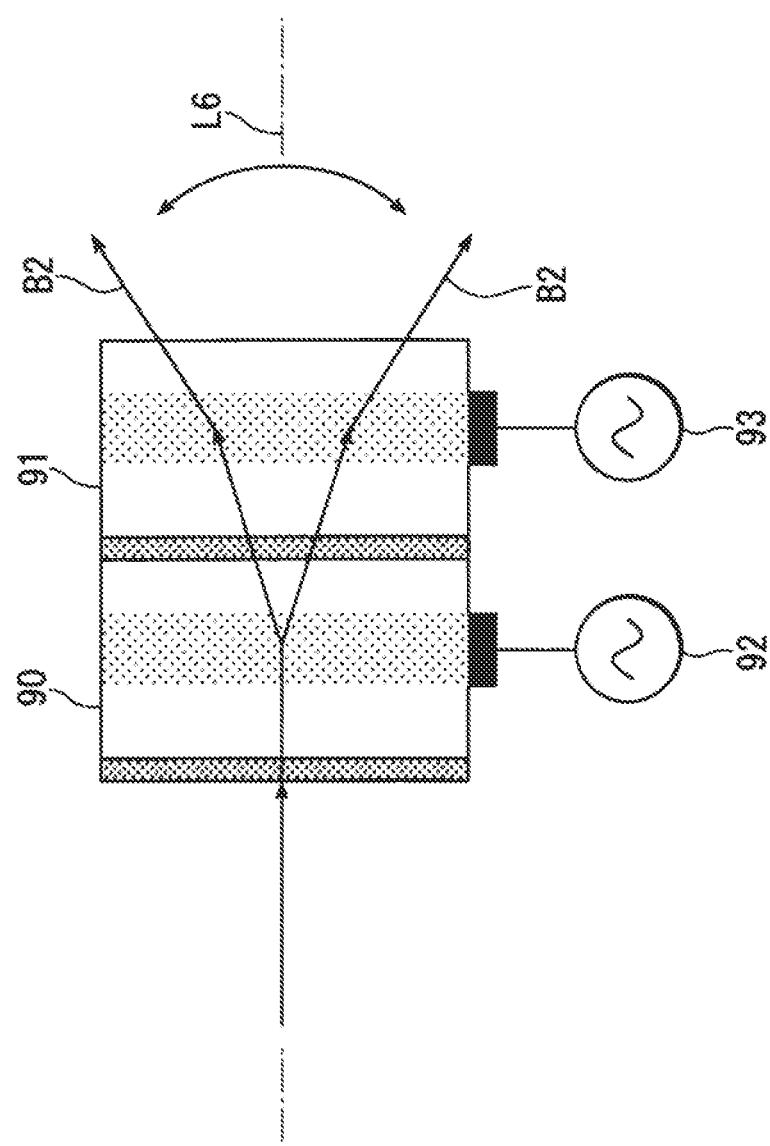
FIG. 13 is an explanatory view of a fourth example related to an AO device which is provided as an optical device instead of a MEMS mirror.

Hereinafter, an embodiment of the present invention will be described based on a first example to a fourth example illustrated in FIGS. 1 to 13. FIGS. 1 to 4 illustrate the first example of a vehicle lamp in the present invention emitting laser light forward via an optical mechanism 8. FIG. 5 illustrates the second example of a vehicle lamp emitting laser light directly forward from a laser light source unit. FIGS. 6 to 11 illustrate depiction forms which the vehicle lamps in the first and second examples form by using laser light. FIG. 12 illustrates the third example of a vehicle lamp having a DRL. FIG. 13 illustrates the fourth example of a vehicle lamp in which an AO device serves as an optical mechanism. In each of the drawings, directions of a vehicle and the vehicle lamp will be described as follows on the assumption that a driver is viewing from a driver's seat (upward, downward, left, right, forward, and rearward=Up, Lo, Le, Ri, Fr, and Re).

Figure 1:
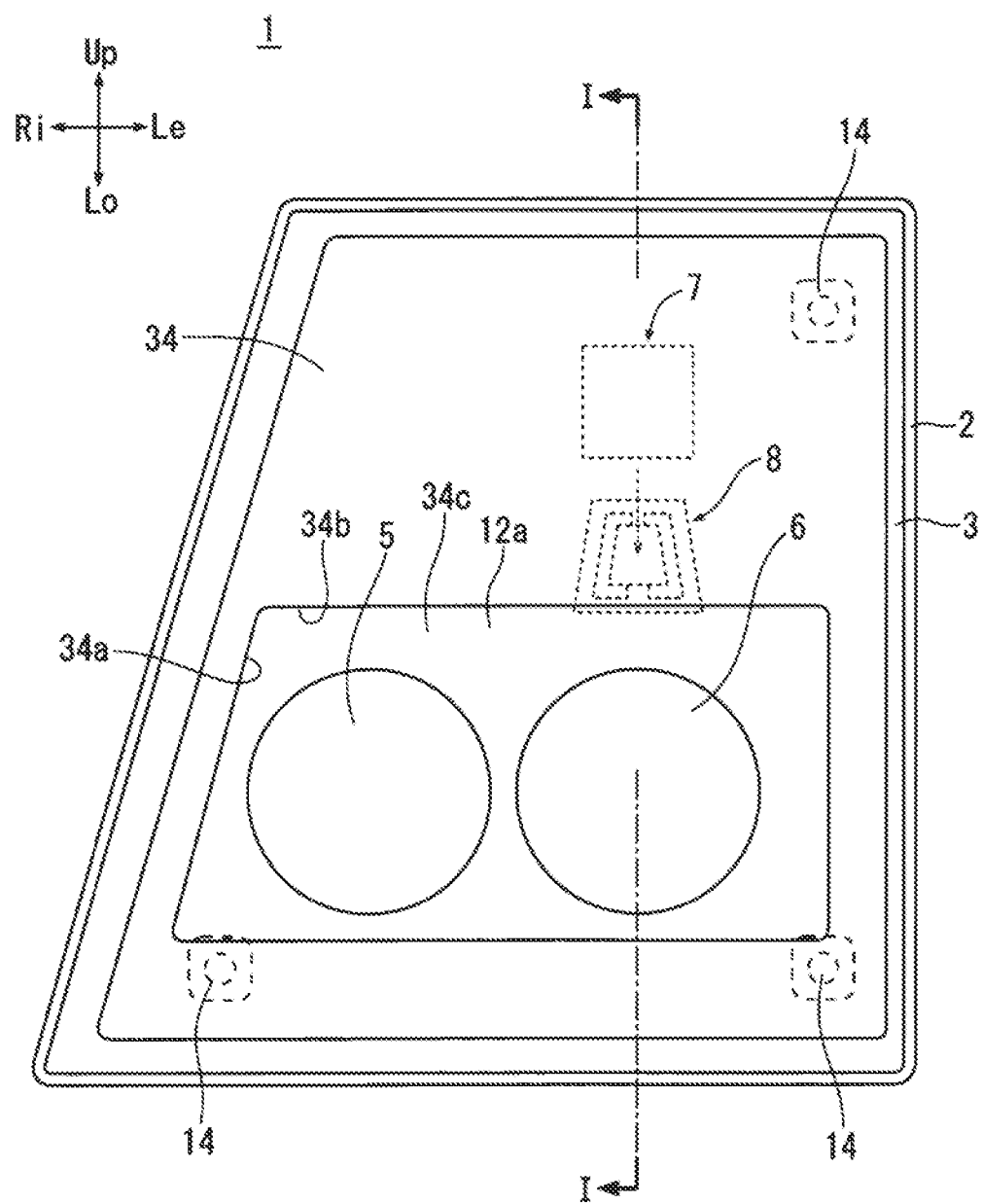
FIG. 1 is a front view of a vehicle lamp in a first example.
Figure 2:
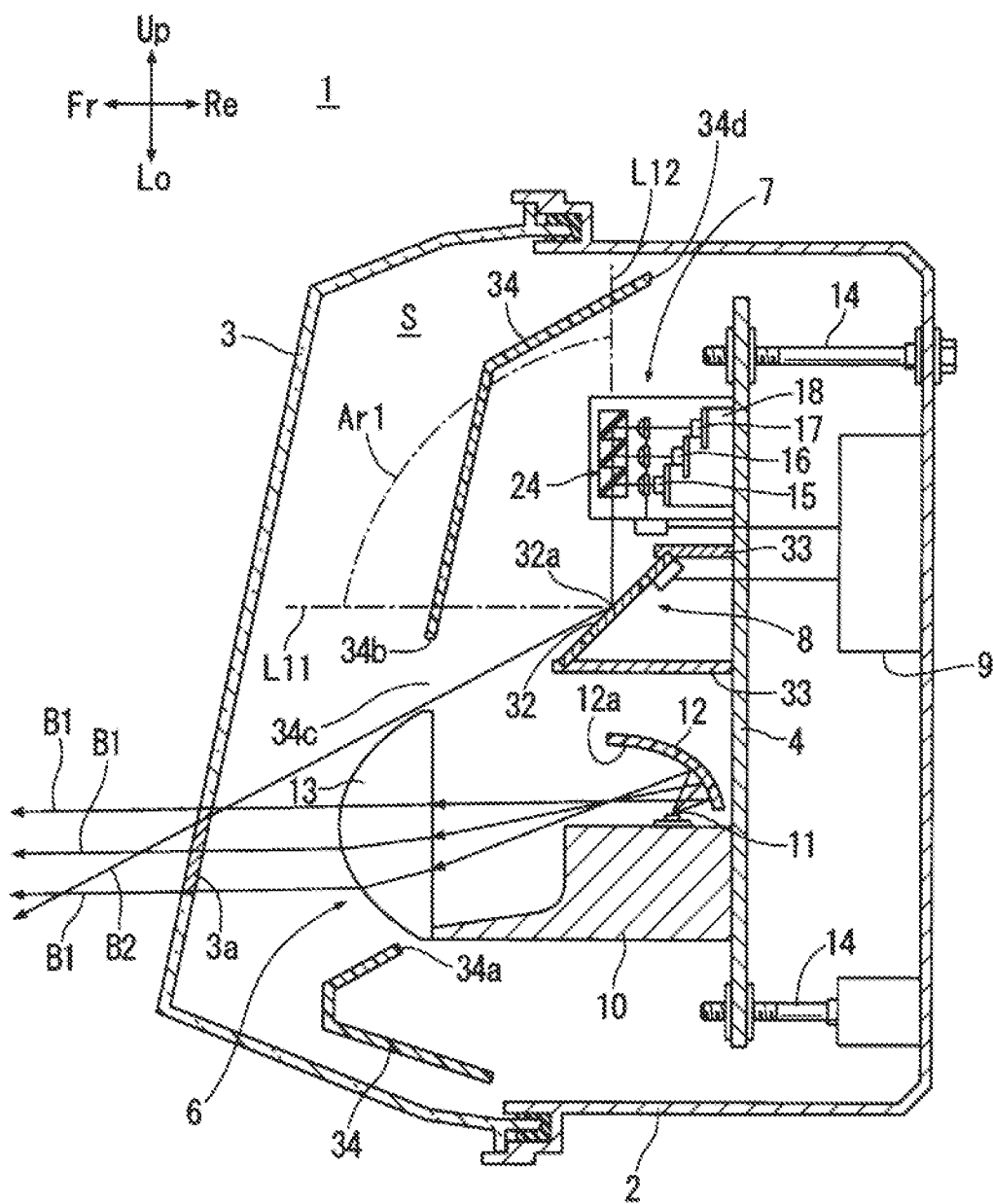
FIG. 2 is a sectional view taken along line I-I in FIG. 1.

A vehicle lamp 1 in the first example illustrated in FIGS. 1 and 2 shows an example of a headlamp on the right side, and includes a lamp body 2 which has an opening portion on the front side of the vehicle, and a front cover 3 which is attached to the opening portion of the lamp body 2. The front cover 3 is a light-transmitting member formed with a resin, glass, or the like having light-transmitting properties. Inside a lighting chamber S which forms the inside of the lamp body 2 and the front cover 3, a plate-like support member 4, a pair of LED light source units (5, 6) which are second light sources for forming a light distribution pattern, a laser light source unit 7 which is a light source able to change the color of irradiation light by emitting multiple rays of laser light, an optical mechanism 8 which is configured be a MEMS mirror or the like and depicts a figure such as a line and a diagram in an irradiation destination by causing the laser light source unit 7 to perform scanning with reflected laser light B2, a control apparatus 9 which controls emitting and scanning of laser light, and an extension reflector 34 which is a light-shielding member are accommodated.

The LED light source units (5, 6) (will be described later in detail) form a light distribution pattern of the headlamp by emitting a luminous flux B1 of light distribution pattern forming light in white illustrated in FIG. 2 forward from a transmissive region 3a of the front cover 3. Light distribution pattern forming light may be yellow in consideration of a conventional fog lamp and the like. In addition, the optical mechanism 8 illustrated in FIGS. 2 and 3B is a MEMS mirror depicting an attention calling mark and the like for the driver on a road surface or the like in front of the vehicle by reflecting the laser light B2 in red or the like from the laser light source unit 7 forward at a reflection point (a light emission end 32a for light) of a reflection portion 32 and oscillating the reflection portion 32 vertically and laterally.

Here, as illustrated in FIG. 2, a straight line extending horizontally forward from the light emission end 32a of the optical mechanism 8 is indicated by the reference sign L11, a straight line extending upward from the emission end 32a is indicated by the reference sign L12, and a region surrounded by the straight lines L11 and L12 is indicated by the reference sign Ar1. The extension reflector 34 is disposed in front of the emission end 32a so as to shield the emission end 32a from light from at least a position above (a position on the straight line L12) to a horizontal position in front thereof (a position on the straight line L11), that is, so as to cover at least the region Ar1 surrounded by the straight lines L11 and L12. As illustrated in FIG. 2, an upper end edge portion 34b of an opening portion 34a of the extension reflector 34 may be disposed below the straight line L11, and a rear end portion 34d may be disposed behind the straight line L12.

A person experiences extremely strong dazzling feeling when directly staring at laser light. In addition, there is a need to consider the regulation defining that the light distribution pattern of the headlamp has to be formed by using only white light. Therefore, it is desirable that the emission end 32a emitting laser light in color other than white cannot be visually recognized from a place in front of a vehicle. As illustrated in FIG. 2, the emission end 32a in the present example is concealed from the position in the horizontal direction to the position above thereof by the extension reflector 34 in front thereof. Therefore, a pedestrian, a driver in an oncoming vehicle, or the like in front of the vehicle cannot visually recognize the emission end 32a in the horizontal direction or from obliquely above.

In addition, generally, a vehicle lamp forming the headlamp is likely to be disposed at a position lower than the eye level of a person (for example, equal to or lower than 1 m), and the laser light B2 reflected forward by the emission end 32a can only be emitted obliquely downward since light oriented obliquely upward from the position in the horizontal direction is cut by the upper end edge portion 34b of the extension reflector 34. Therefore, a pedestrian or a driver in an oncoming vehicle in front of the vehicle cannot recognize that the emission end 32a reflecting laser light in color other than white forms the light source of the headlamp.

In addition, as illustrated in FIG. 2, in the vehicle lamp 1, it is more desirable that the reflection portion 32 of the optical mechanism 8 is disposed such that the laser light B2 reflected by the emission end 32a is incident on the transmissive region 3a of the front cover 3. As a result thereof, the laser light B2 reflected by the emission end 32a intersects the luminous flux B1 of light distribution pattern forming light in white at the transmissive region 3a. Generally, in a case where dirt or the like adhered to a front cover is irradiated with laser light in red or the like, there is concern that the light-transmitting member such as the front cover 3 looks as if the front cover 3 emits light in red or the like, due to diffused reflection occurring at the adhered portion of the dirt. However, the laser light B2 in red or the like of the vehicle lamp 1 in the first example intersects the luminous flux B1 of light distribution pattern forming light in white having higher luminance at the transmissive region 3a. Therefore, diffused and reflected light in red or the like generated in the front cover is countervailed by the white light and is no longer visually recognized from a place in front of the vehicle. As a result thereof, a driver or the like in an oncoming vehicle cannot recognize that the headlamp is configured to emit laser light in red or the like other than white.

Subsequently, the LED light source units (5, 6), the laser light source unit 7, and the optical mechanism 8 will be described in detail with reference to FIGS. 1 to 3.

The LED light source units (5, 6) generating the light distribution pattern forming light have a metal bracket 10 which is fixed to the support member 4, LED light emitters 11 each of which is attached to the bracket 10, reflectors 12, and transparent or semitransparent projection lenses 13. The LED light source unit 5 forms a high beam light distribution pattern, and the LED light source unit 6 forms a low beam light distribution pattern. The luminous flux B1 of light distribution pattern forming light emitted from the LED light emitter 11 is reflected forward by a reflection surface 12a of the reflector 12 and passes through the projection lens 13 and the transmissive region 3a of the front cover 3, thereby being emitted forward from the vehicle.

The laser light source unit 7 and the optical mechanism 8 illustrated in FIGS. 1 and 2 are attached to the support member 4 so as to be positioned above the LED light source unit 6 forming a low beam light distribution pattern, and the support member 4 is attached to the lamp body 2 by multiple (three in the present example) aiming screws 14. The optical mechanism 8 is fixed to a front end of a fixing portion 33 protruding forward from the support member 4. The control apparatus 9 is fixed to the lamp body 2. The lens axis of the vehicle lamp 1 is adjusted in the horizontal direction and the vertical direction by turning the aiming screws 14.

Figure 3A:
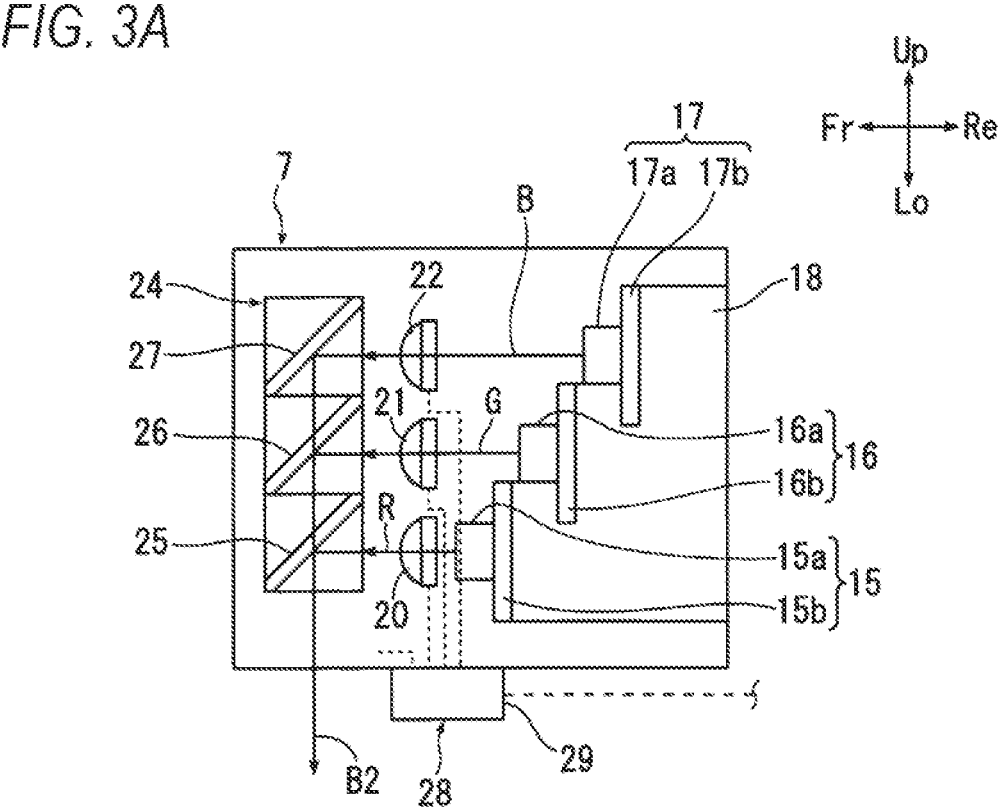
FIG. 3A is an enlarged view of a laser light source unit in FIG. 2.
Figure 3B:
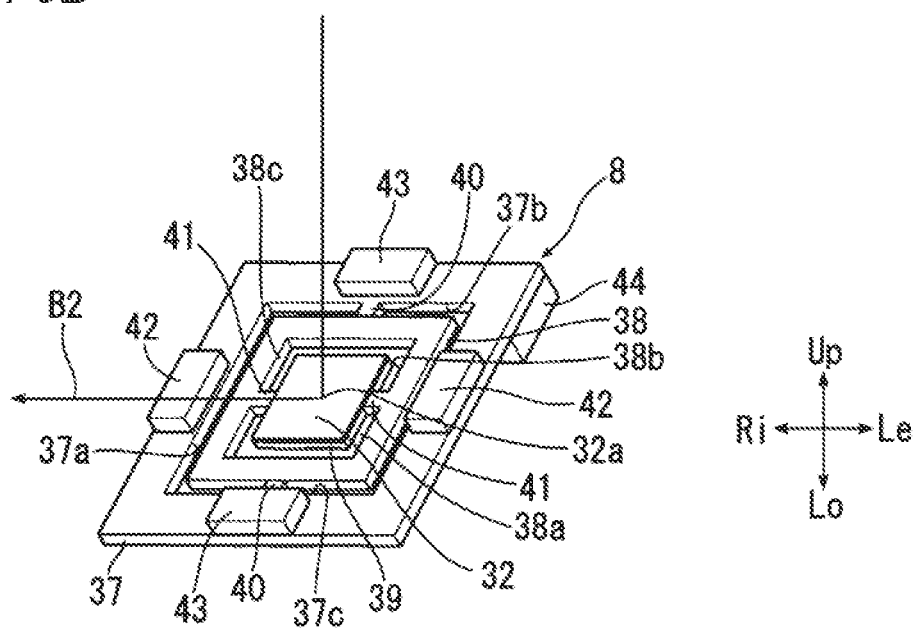
FIG. 3B is a perspective view of a light distribution portion in FIG. 2 viewed from a place in front of a vehicle.

The laser light source unit 7 illustrated in FIG. 3A has a first light source 15 generating red light (refer to the reference sign R), a second light source 16 generating green light (refer to the reference sign G), a third light source 17 generating blue light (refer to the reference sign B), a heat radiation member 18 formed with metal such as aluminum having high heat conductivity, first to third condensing lenses (20 to 22), and light condensing portion 24. The heat radiation member 18 is attached to the support member 4 which is also formed with metal, and the laser light source unit 7 is fixed to the front surface of the support member 4 by the heat radiation member 18.

The first to third light sources (15 to 17) illustrated in FIG. 3A respectively generate rays of laser light in red, green, and blue. The first to third light sources (15 to 17) are configured to respectively have laser diodes (15a, 16a, 17a) which are semiconductor laser devices for red, green, and blue, and substrates (15b, 16b, 17b). Each of the substrates (15b to 17b) is attached to the heat radiation member 18.

The light source of the laser light source unit 7 is not limited to the configuration having three light sources of RGB. A light source having a single color and a single body may be adopted. Four light sources in which an orange laser diode is added to three light sources of RGB may be provided. Otherwise, white light may be generated by providing a configuration in which emission light of the blue laser diode is caused to pass through a yellow fluorescent body. In addition, each of the light sources may be configured by a different laser device other than the laser diode.

Each of the first to third condensing lenses (20 to 22) illustrated in FIG. 3A is configured to be a collimate lens or the like. The light condensing portion 24 has first to third dichroic mirrors (25 to 27).

As illustrated in FIGS. 2 and 3A, the red laser light R emitted from the first light source 15 is transmitted through the first condensing lens 20 and is converted into parallel light. Thereafter, the red laser light R is directly reflected toward the below-described reflection portion 32 of the optical mechanism 8 by the first dichroic mirror 25. The green laser light G emitted from the second light source 16 is transmitted through the second condensing lens 21 and is converted into parallel light. Thereafter, the green laser light G is reflected by the second dichroic mirror 26 and is transmitted through the first dichroic mirror 25. Thereafter, the green laser light G is incident on the reflection portion 32 of the optical mechanism 8. The blue laser light B emitted from the third light source 17 is transmitted through the third condensing lens 22 and is converted into parallel light. Thereafter, the blue laser light B is reflected by the third dichroic mirror 27 and is transmitted through the second and first dichroic mirrors (26, 25) in order. Thereafter, the blue laser light B is incident on the reflection portion 32 of the optical mechanism 8 as illustrated in FIG. 3B.

The rays of the red laser light R, the green laser light G, and the blue laser light B reflected by the light condensing portion 24 become the laser light B2 in composite color, and the laser light B2 is emitted toward the reflection portion 32 of the optical mechanism 8 as illustrated in FIG. 3B.

The extension reflector 34 inside the lighting chamber S has the opening portion 34a. Each of the projection lenses 13 of the LED light source units (5, 6) is exposed to the front from the opening portion 34a. The laser light source unit 7 and the optical mechanism 8 are disposed behind the extension reflector 34 and on the LED light source unit 6 forming a low beam light distribution pattern.

The optical mechanism 8 illustrated in FIG. 3B is a MEMS mirror and has a base portion 37, a first pivoting body 38, a second pivoting body 39, a first torsion bar 40, a second torsion bar 41, permanent magnets 42, 43, and a terminal portion 44. The plate-like base portion 37 and the first pivoting body 38 respectively have opening portions (37a, 38a) at their centers. The reflection portion 32 is formed on the front surface of the plate-like second pivoting body 39 through processing such as silver deposition, plating, or the like. As the optical mechanism 8, it is also possible to employ various types of optical mechanisms such as a galvano mirror other than the MEMS mirror.

The first pivoting body 38 is supported by a pair of first torsion bars 40 which are respectively provided in upper and lower end portions (37b, 37c) of the opening portion 37a so as to be able to pivot laterally with respect to the base portion 37. The second pivoting body 39 is supported by a pair of second torsion bars 41 which are respectively provided in left and right end portions (38b, 38c) of the opening portion 38a so as to be able to pivot vertically with respect to the first pivoting body 38. The base portion 37 and the first and second pivoting bodies (38, 39) are fixed to the fixing portion 33 of the support member 4 illustrated in FIG. 2 in a state of tilting downward with respect to the forward-rearward direction of the vehicle lamp as illustrated in FIG. 2.

As illustrated in FIG. 3B, in the base portion 37, a pair of the permanent magnets 42 are provided at positions orthogonal to a direction in which the first torsion bars 40 extend. Moreover, a pair of permanent magnets 43 are provided at positions orthogonal to a direction in which the second torsion bars 41 extend. The first and second pivoting bodies (38, 39) are respectively provided with first and second coils (not illustrated). The permanent magnets 42 form a magnetic field orthogonal to the first torsion bars 40, and the permanent magnets 43 form a magnetic field orthogonal to the second torsion bars 41. The first and second coils (not illustrated) are connected to the control apparatus 9 via the terminal portion 44.

The first coil and the permanent magnets 42, and the second coil and the permanent magnets 43 configure a scanning actuator 35 (will be described below) in FIG. 5. The scanning actuator 35 individually changes the magnitude and the orientations of driving currents flowing in the first and second coils, thereby causing the first pivoting body 38 to vertically pivot with respect to the base portion 37, and causing the second pivoting body 39 to laterally pivot with respect to the first pivoting body 38. The orientation of the reflection portion 32 changes vertically and laterally based on the pivoting of the first and second pivoting bodies (38, 39).

The optical mechanism 8 illustrated in FIGS. 2 and 3B causes the laser light B2 emitted from the laser light source unit 7 in FIG. 3A to be reflected forward by the reflection portion 32 of the second pivoting body 39. A place in front of the vehicle is subjected to scanning performed with the laser light B2 reflected forward by the emission end 32a (the reflection point) of the reflection portion 32 by causing the reflection portion 32 of the second pivoting body 39 to vertically and laterally pivot in a reciprocating manner.

A luminous flux B1 of low beam light distribution pattern forming light emitted from the projection lens 13 of the LED light source unit 6 illustrated in FIG. 2 is emitted forward from the transmissive region 3a of the front cover 3 in the front. Meanwhile, the emission light B2 from the laser light source unit 7 is reflected obliquely downward by the reflection portion 32 of the optical mechanism 8 and passes through a gap 34c which is formed from the light emission end 32a, that is, the reflection point through the upper end edge portion 34b of the opening portion 34a and the LED light source units (5, 6). Thereafter, the emission light B2 is emitted forward through the front cover 3. In the optical mechanism 8, as illustrated in FIG. 2, it is desirable that the reflection portion 32 is disposed such that the reflected light B2 is incident on the transmissive region 3a of the front cover 3. In such a case, the laser light B2 intersects the light distribution pattern forming light B1 in white having high luminance when passing through the transmissive region 3a of the front cover 3, and thus, diffused reflection occurring due to dirt or the like on the front cover 3 is countervailed.

Figure 4:
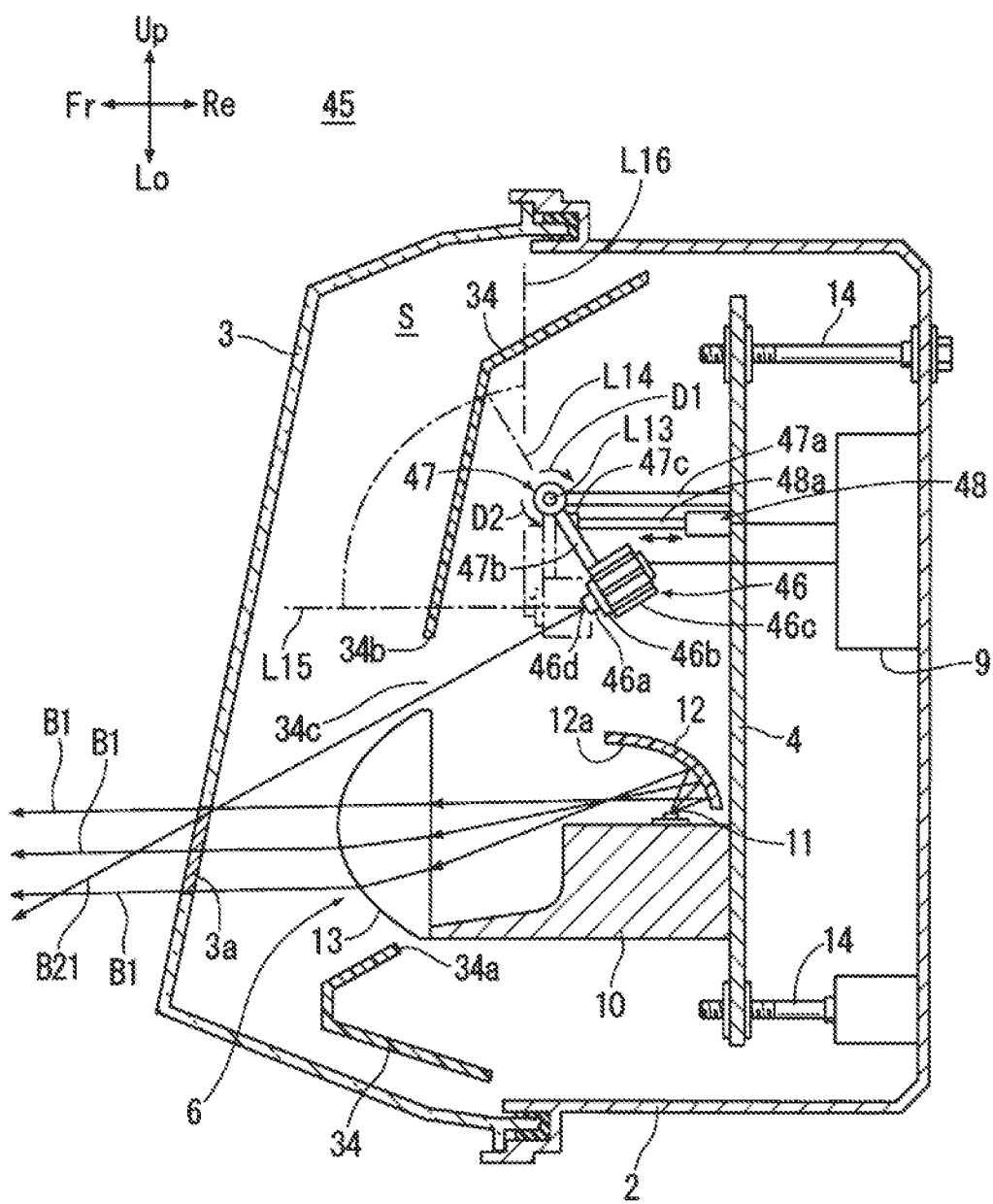
FIG. 4 is a vertical sectional view of a vehicle lamp in a second example cut at the same position as that in FIG. 2.
Figure 5:
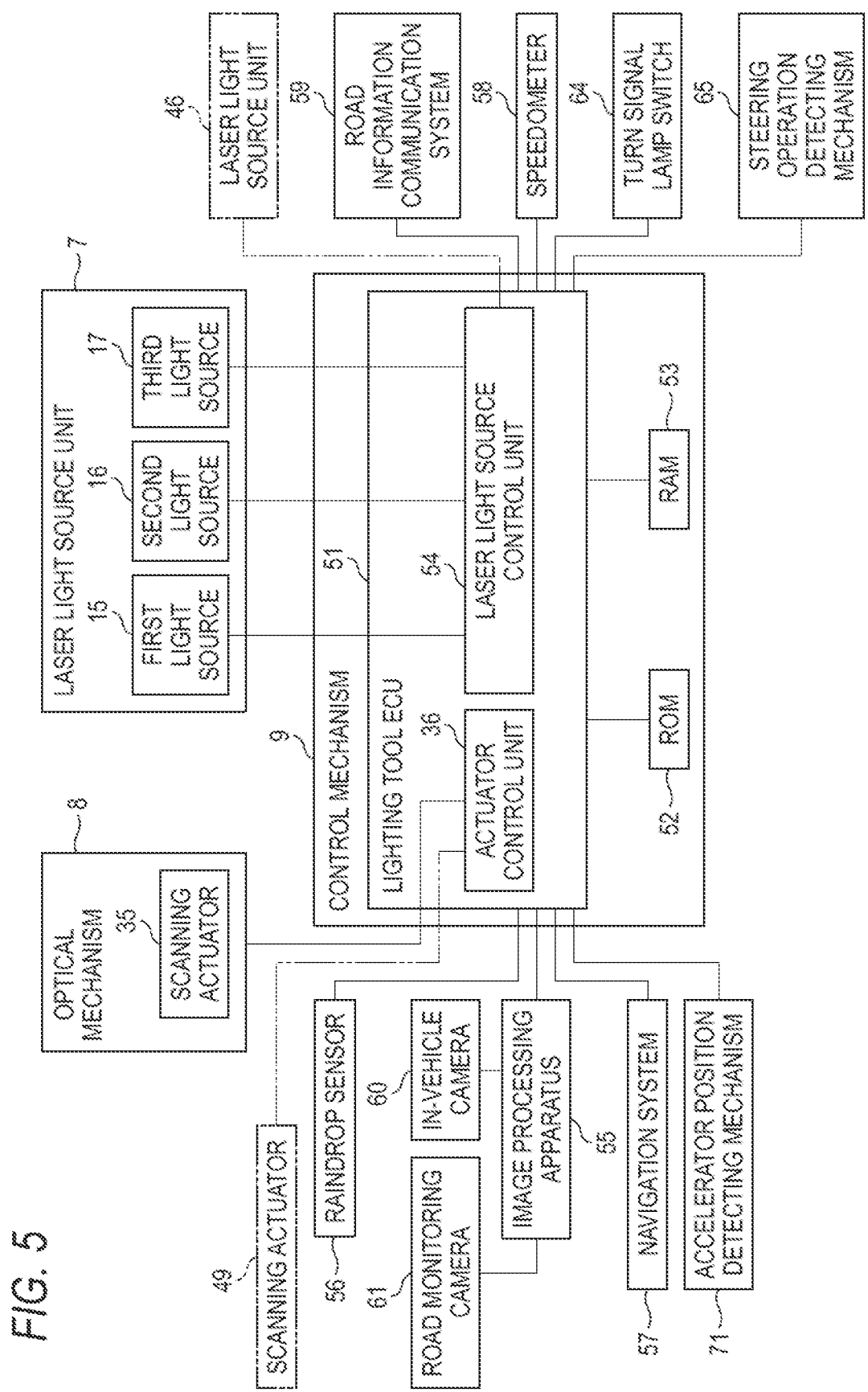
FIG. 5 is a block diagram describing a control apparatus.

FIG. 4 illustrates a vehicle lamp 45 in the second example. In the vehicle lamp 45 in the second example, a laser light source unit 46 replaces the laser light source unit 7 and the optical mechanism 8 of the vehicle lamp 1 in the first example, and the vehicle lamp 45 shares the rest of the configurations with the vehicle lamp 1 in the first example. The laser light source unit 46 emits laser light B21 directly to the front cover 3 without causing the laser light B21 to pass through such an optical mechanism 8 in the first example.

The laser light source unit 46 illustrated in FIG. 4 is configured to have a laser diode 46*a*, a substrate 46*b*, and a heat sink 46*c* in which the substrate 46*b* is mounted. The laser light source unit 46 is attached to the support member 4 by a link mechanism 47. The link mechanism 47 is configured to have a first link 47*a* which is fixed to the support member 4 and protrudes forward, and a second link 47*b* which is attached so as to be able to pivot around a horizontal pivot axis L13 of the first link 47*a*. The laser light source unit 46 is attached to the second link 47*b*. An actuator mechanism 48 which causes an arm 48*a* to advance and treat forward and rearward is provided in the support member 4. The second link 47*b* is connected to the tip of the arm 48*a* of the actuator mechanism 48 via an elastic member 47*c* such as rubber. The laser light source unit 46 and the second link 47*b* oscillate around the horizontal pivot axis L13 based on an advance-treat operation of the arm 48*a*.

When the arm 48*a* of the actuator mechanism 48 advances and the second link 47*b* illustrated in FIG. 4 pivots around the horizontal pivot axis L13 in the clockwise direction D1, the orientation of the laser beam B21 emitted from the laser light source unit 46 changes to an upward direction. In addition, when the arm 48*a* retreats and the second link 47*b* pivots in the counterclockwise direction D2, the orientation of the laser beam B21 changes to a downward direction. Meanwhile, the laser light source unit 46 is attached to the second link 47*b* so as to be able to pivot around a center axis line L14 of the second link 47*b*, and is oscillated around the center axis line L14 by a motor (not illustrated). The orientation of the laser beam B21 is changed laterally by the motor (not illustrated).

The vehicle lamp 45 in the second example causes the actuator mechanism 48 and a motor (not illustrated) to perform scanning with the laser beam B21 such that the laser beam B21 is oriented in all directions, and causes the laser beam B21 to be transmitted through the front cover 3, thereby depicting a figure on the road surface or the like in front of the vehicle. All of a light emitting operation of the laser light source unit 46, an advance-treat operation of the arm 48*a* of the actuator mechanism 48, and a turning operation of the laser light source unit 46 performed by the motor (not illustrated) are controlled by the control apparatus 9 which is connected thereto. The actuator mechanism 48 and the motor (not illustrated) configure a scanning actuator 49 in FIG. 5.

Similar to the emission end 32*a* in the first example illustrated in FIG. 2, a light emission end 46*d* of the laser diode 46*a* is shielded from light by the extension reflector 34 from at least a position above (a position on the straight line L16 extending vertically upward from the emission end) to a horizontal position in front thereof (a position on the straight line L15 extending horizontally forward from the emission end). The laser light source unit 46 emits figure-depicting laser light obliquely downward toward the front cover 3 via the gap 34*c* of the opening portion 34*a*. As a result thereof, a pedestrian or the like in front of the vehicle cannot visually recognize the emission end. In addition, it is desirable that the laser light source unit 46 is oriented toward the transmissive region 3*a* of the front cover 3 where the luminous flux B1 of the LED light source unit 6 passes through. In such a case, the laser light B21 emitted from the laser light source unit 46 intersects the light distribution pattern forming light B1 in white having higher luminance, and thus, diffused reflection occurring due to dirt or the like on the front cover 3 is countervailed.

In addition, the control apparatus 9 illustrated in FIG. 5 has a lighting tool ECU (an electronic control device) 51, a ROM 52, a RAM 53, and the like. The lighting tool ECU 51 has an actuator control unit 36 and a laser light source control unit 54. Various types of control programs are recorded in the ROM 52. The lighting tool ECU 51 executes the control program recorded in the ROM 52 by using the RAM 53 and generates various types of control signals.

The laser light source control unit 54 controls the color of laser light from the first to third light sources (15 to 17), and the intensity of emission and the on-off state of light from the first to third light sources (15 to 17) and the laser light source unit 46 for each light source. The actuator control unit 36 controls the scanning actuators (35, 49) and performs scanning with the laser light B2 with respect to a place in front of the vehicle, thereby depicting a figure such as a mark and a letter on the road surface, a structure, or the like around the vehicle so as to call the attention of the driver, a pedestrian, or the like.

In addition, an image processing apparatus 55, a raindrop sensor 56, a navigation system 57, a speedometer 58, a road information communication system 59, a turn signal lamp switch 64, a steering operation detecting mechanism 65, an accelerator position detecting mechanism 71, and the like are connected to the ECU 51. An in-vehicle camera 60, a road monitoring camera 61, and the like are connected to the image processing apparatus 55. The image processing apparatus 55 sends a video image and the like related to a road or a structure captured by the in-vehicle camera 60 or the road monitoring camera 61 such as an intersection camera connected via a communication line, as analysis-processed data to the lighting tool ECU 51. The navigation system 57 sends a data signal related to a current position of a host vehicle to the lighting tool ECU 51.

The lighting tool ECU 51 analyzes the circumstances of the host vehicle on a road obtained through video image data of the image processing apparatus 55 or the navigation system 57, road surface conditions such as wetness and frozenness obtained through the raindrop sensor 56 or data of the road information communication system 59, and scanning of the host vehicle obtained through the turn signal lamp switch 64, the steering operation detecting mechanism 65, and the accelerator position detecting mechanism 71 by the driver. Then, the lighting tool ECU 51 controls the laser light source unit 7 and the optical mechanism 8 to depict a predetermined figure calling the attention of drivers in the host vehicle and a different vehicle, at a predetermined position such as a road surface.

Figure 6:
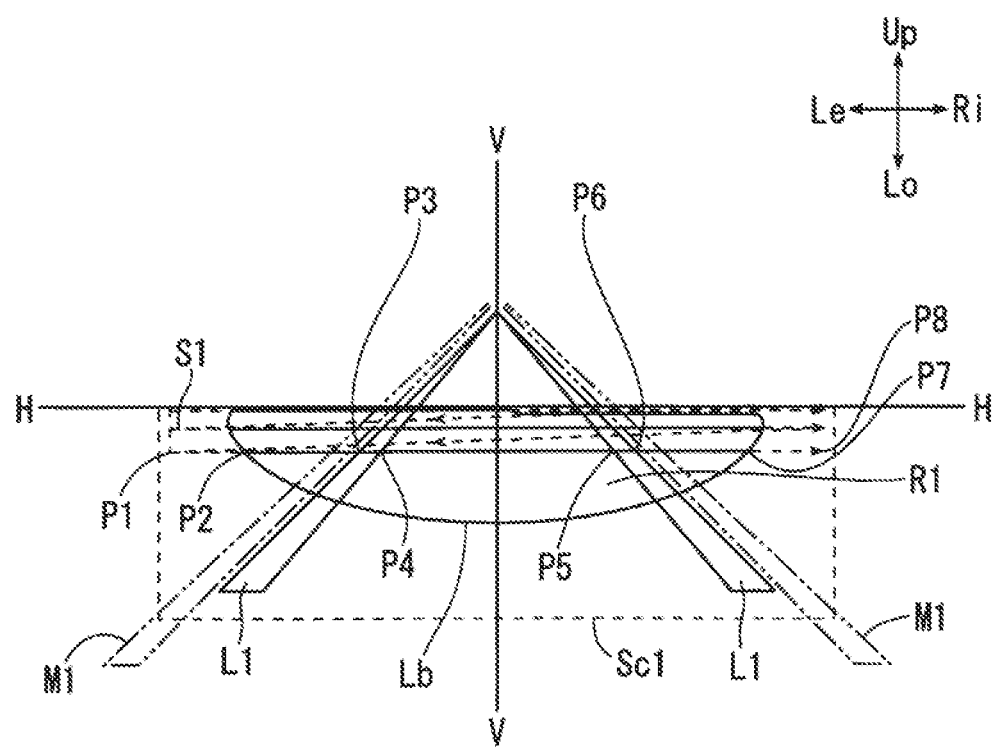
FIG. 6 is an explanatory view related to depiction in front of a vehicle performed with laser light.

For example, depiction of the figure is performed as illustrated in FIG. 6. The optical mechanism 8 in the first example and the laser light source unit 46 in the second example change the orientation of the laser beams (B2, B21) vertically and laterally, thereby performing scanning laterally and repeatedly while moving the orientation downward by a very small length within a rectangular region (the reference sign Sc1) in front of the vehicle. The reference sign S1 indicates a tracking path of a scanning line of the optical mechanism 8 and the laser light source unit 46. The dashed line portion of the scanning line S1 indicates a light-off state, and the solid line portion indicates a light-on state. The rays of laser light (B2, B21) depict a figure such as a letter, a mark, and the like by vertically stacking the tracking paths in the lateral direction when light is on. Hereinafter, predetermined figures depicted by utilizing the vehicle lamp (1 or 45) in the first or second example so as to call the attention of drivers in the host vehicle and a different vehicle will be exemplified.

In FIG. 6, a low beam light distribution pattern Lb in white is projected, and lines L1 are depicted with laser light in red or the like along lane marks M1 (portions indicated by the two-dot chain lines) on a road surface R1 in which a position is specified by the in-vehicle camera 60 or the like. A driver visually recognizes the lines L1 and recognizes the positions of the lane marks. Particularly in a case where the lines are depicted with laser light along the lane marks on a curved road, the driver can precisely and visually recognize the curved direction of the road in advance, and thus, it is possible to avoid a deviation accident from the lane.

In a case where the low beam light distribution pattern Lb is formed to be a composite light distribution pattern by the LED light source unit 6, the laser light source unit 7, and the optical mechanism 8 performing scanning with white laser light, in order to accentuate the lines L1 and the marks, it is desirable to form a dark portion on the periphery of the lines L1 and other marks formed within the white light distribution pattern, by reducing the white laser light (including light-off).

Figure 7A:
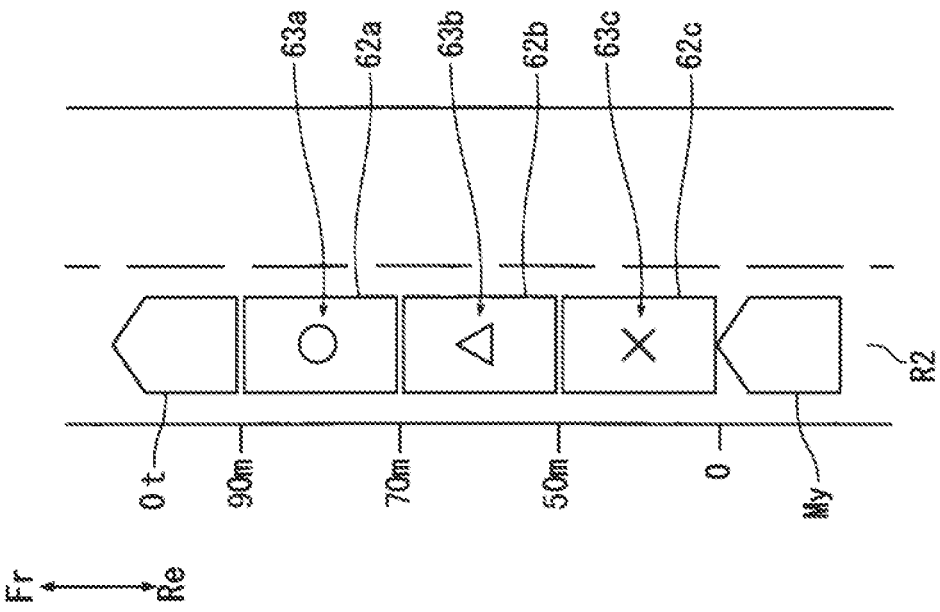
FIG. 7A is an explanatory view in which a figure making a driver recognize a vehicle-to-vehicle distance to a vehicle in front is depicted on a road surface with laser light.
Figure 7B:
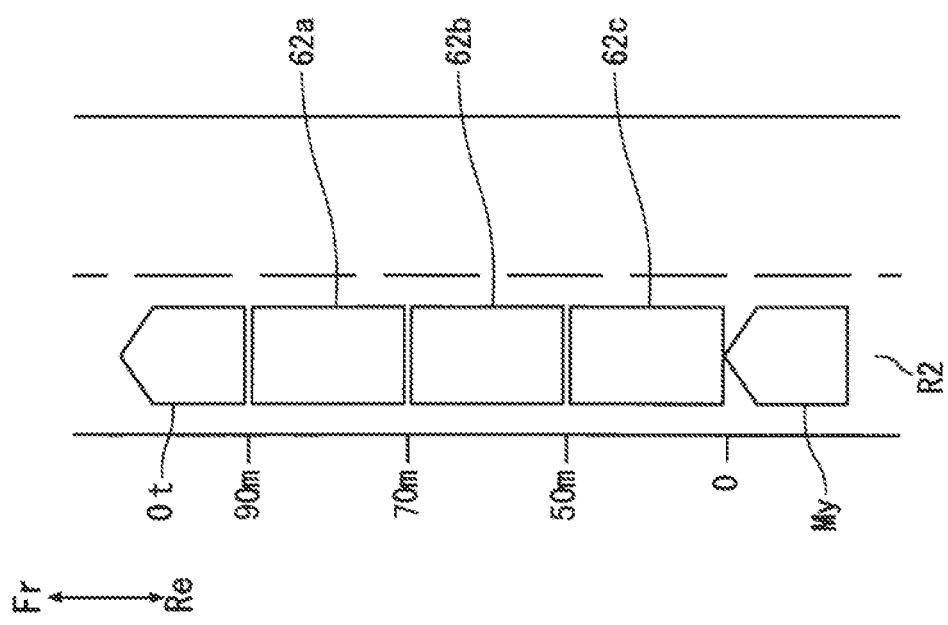
FIG. 7B is a view illustrating a modification example of marks in FIG. 7A.

In addition, FIGS. 7A and 7B illustrate figures in which marks and the like indicating a stopping vehicle-to-vehicle distance are depicted on the road surface with laser light through a depiction system of the vehicle lamp (1 or 45) by automatically calculating a stopping distance based on the traveling speed of the host vehicle and the road surface conditions.

In this case, the lighting tool ECU 51 calculates a braking distance in accordance with the speed of the host vehicle as well as an amount of rainfall and the presence or absence of frozenness on the traveling road surface which are obtained through the speedometer 58, the raindrop sensor 56, the road information communication system 59, and the like. Then, the lighting tool ECU 51 depicts multiple marks indicating a position where the host vehicle can stop on the road surface in accordance with the application degree of the brake. For example, in a case where a braking distance in which a host vehicle My traveling 60 km per hour on the road surface in wet weather can stop through a gentle braking operation is calculated to be 90 m, a braking distance in which the host vehicle My can stop through an ordinarily forceful braking operation is calculated to be 70 m, and a braking distance in which the host vehicle My can stop through a braking operation performed with full strength is calculated to be 50 m, the vehicle lamp (1 or 45) depicts a rectangular and green first mark 62a within a range from 70 m to 90 m in front of the vehicle, a rectangular and yellow second mark 62b within a range from 50 m to 70 m, a rectangular and red third mark 62c within a range equal to or less than 50 m, and the like in front of the host vehicle My. When the driver in the host vehicle My visually recognizes that a different vehicle Ot traveling forward in the same lane R2 intrudes into any one of the first mark to the third mark which are different from each other in color, the driver specifically recognizes the degree of risk of a rear-end collision and attempts to ensure an appropriate vehicle-to-vehicle distance with respect to the different vehicle Ot so as to avoid the rear-end collision. The first to third marks may be marks such as O, Δ, and X having shapes different from each other (refer to 63a to 63c in FIG. 7B) instead of applying different colors, as long as the marks indicate that the risk of a rear-end collision has increased.

Figure 8B:
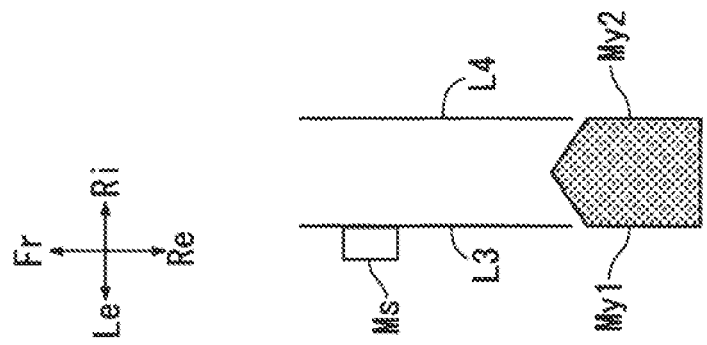
FIG. 8B is an explanatory view in which marks and the like imparting information on the vehicle width of a host vehicle are depicted on a road surface with laser light.
Figure 8A:
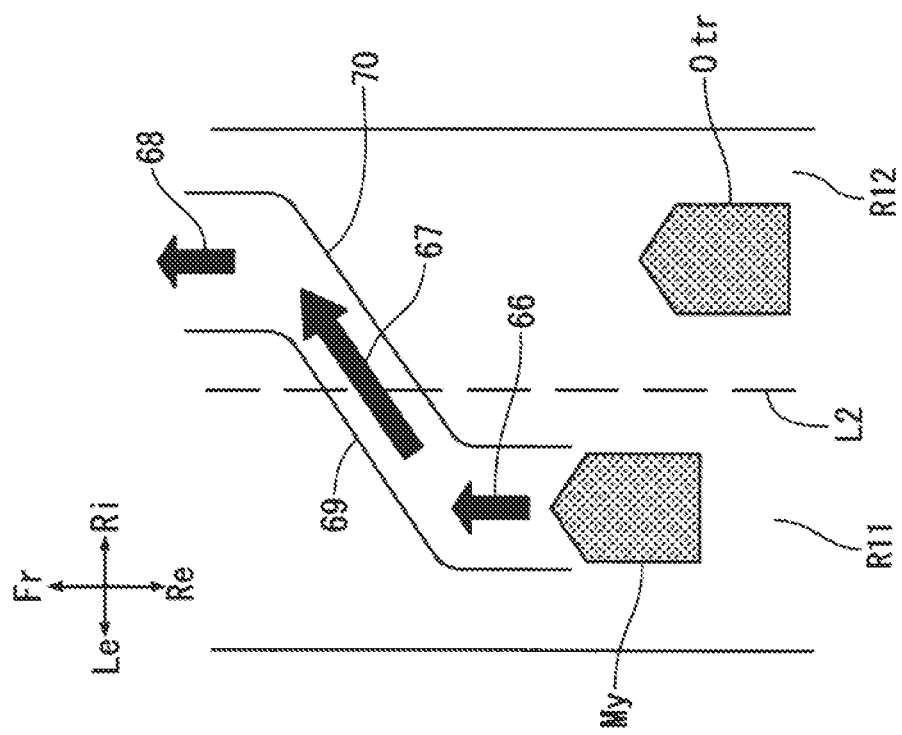
FIG. 8A is an explanatory view in which a figure informing a following vehicle in an adjacent lane of a lane change is depicted on a road surface with laser light.

FIG. 8A is a view in which marks and the like informing the driver in a following vehicle in an adjacent lane of a lane change of the host vehicle are depicted on the road surface with laser light by the vehicle lamp (1 or 45). In the vehicle lamp (1 or 45), the lane change direction of the host vehicle detected by the turn signal lamp switch 64 or the steering operation detecting mechanism 65 is detected, and first to third arrow marks (66 to 68) indicating a lane change of the host vehicle My changing the lane from a traveling lane R11 to an adjacent lane R12 are depicted based on the detection result. Even though a turn signal lamp of the host vehicle My cannot be viewed, a driver in a different vehicle Otr can avoid a minor collision by visually recognizing the first to third arrow marks (66 to 68) in front thereof.

In FIG. 8B, marks and the like imparting information on the vehicle width of the host vehicle are depicted on the road surface in front of the host vehicle with laser light. The vehicle lamp (1 or 45) forms lines (L3, L4) in front of the host vehicle My with laser light along left and right side end portions (My1, MY2) of the vehicle. As illustrated in FIG. 8B, the driver can avoid a minor collision in advance by steering the vehicle such that the depicted lines (L3, L4) do not come into contact with an obstacle Ms in front of the host vehicle My.

Figure 9B:
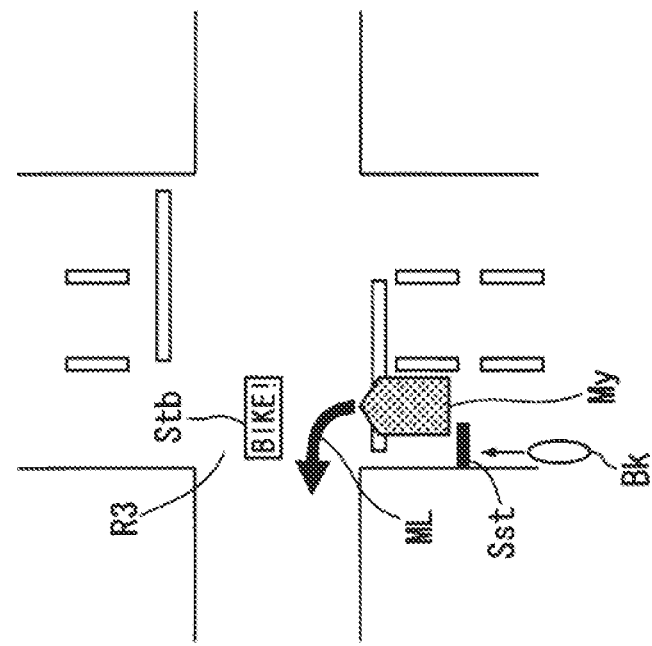
FIG. 9B is an explanatory view in which attention calling marks and the like regarding a two-wheeled vehicle intending to pass ahead from behind on the left side of the vehicle at an intersection are depicted on a road surface with laser light.
Figure 9A:
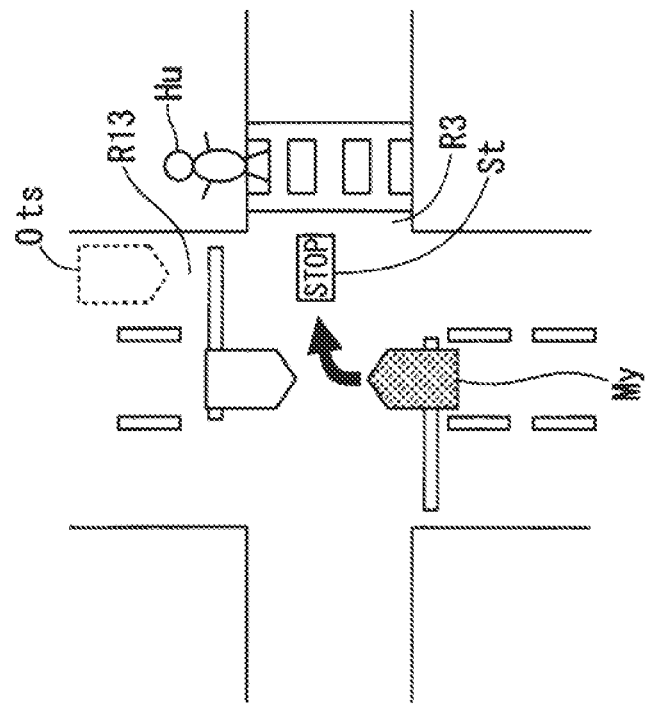
FIG. 9A is an explanatory view in which attention calling marks and the like related to the presence of a vehicle in the opposite lane, a pedestrian, and the like at an intersection are depicted on a road surface with laser light.

Subsequently, FIGS. 9A and 9B are views in which attention calling marks and the like related to passing vehicles, a pedestrian, and the like near an intersection are depicted on the road surface with laser light. First, FIG. 9A illustrates a view of a case where the host vehicle turns right in a state of facing a vehicle turning right in the opposite lane. The reference sign My indicates the host vehicle, the reference sign Ott indicates a different vehicle turning right in the opposite right-turn lane, the reference sign Ots indicates a different vehicle traveling straight ahead in the opposite lane, the reference sign Hu indicates a walking pedestrian, and the reference sign R3 indicates the road surface at an intersection, respectively.

In the vehicle lamp (1 or 45), the lighting tool ECU 51 calculates a current place and the speed of an oncoming vehicle, and positions of the pedestrian Hu, a bicycle (not illustrated), and the like on a crosswalk based on video image information and the like of the in-vehicle camera 60 or the road monitoring camera 61. Moreover, the lighting tool ECU 51 detects whether the vehicle turns right or left through the turn signal lamp switch 64 or the steering operation detecting mechanism 65.

For example, as illustrated in FIG. 9A, in a case where it is detected that the oncoming vehicle Ots approaches in an opposite lane R13 when the host vehicle My turns right or the pedestrian Hu is present on the crosswalk, the vehicle lamp (1 or 45) depicts a mark of framed letters or the like such as "STOP" on the road surface R3 in the advancing direction with laser light in red or the like, thereby making the drivers in the host vehicle My and the oncoming vehicle Ots recognize the risk of a right turn. In addition, as illustrated in FIG. 9B, in a case where a motorcycle Bk intending to pass ahead from behind on the left side of the host vehicle My is detected, the vehicle lamp (1 or 45) depicts an arrow of a left-turn mark ML on the road surface R3 in the advancing direction and a stop line Sst on the road surface behind the host vehicle My with laser light in red or the like, thereby making a rider of the motorcycle Bk recognize the risk of being embroiled in the left turn. In addition, a mark of framed letters or the like such as "BIKE!" indicating the presence of the motorcycle Bk on the road surface in the advancing direction of the host vehicle MY is depicted with laser light in red or the like, thereby making the driver in the host vehicle recognize the risk of having the motorcycle Bk embroiled in the left turn.

Figure 10:
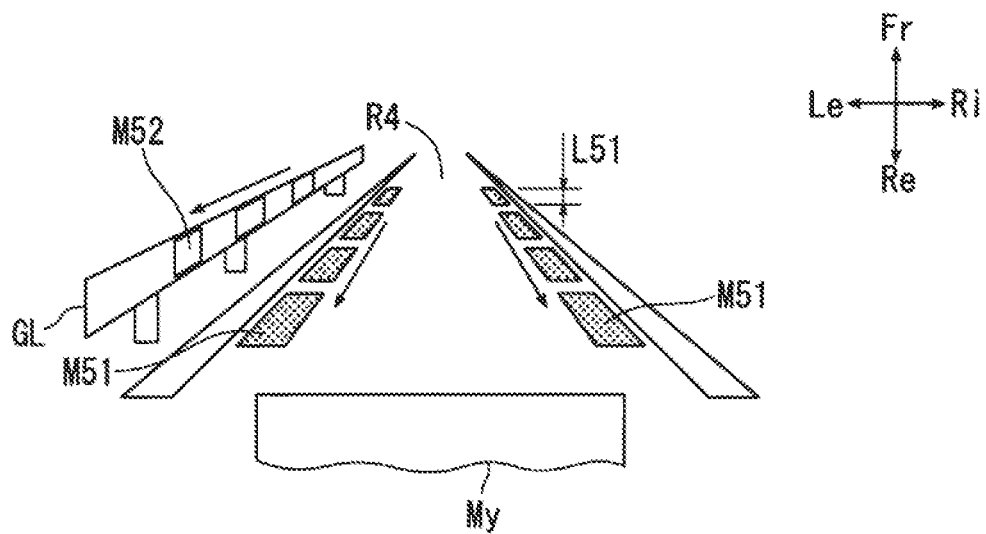
FIG. 10 is an explanatory view in which marks and the like calling the attention of the driver to deceleration or acceleration of the host vehicle are depicted on a road surface with laser light.

FIG. 10 illustrates a view in which marks and the like making the driver suppress over-speeding of the host vehicle and calling the attention of the driver to an increase of speed in order to solve the traffic congestion are depicted on the road surface with laser light.

Multiple marks M51 illustrated in FIG. 10 are multiple rectangular marks which are intermittently depicted on the road surface in the forward-rearward direction with laser light in red or the like, and multiple marks M52 are multiple rectangular marks which are intermittently depicted in the forward-rearward direction with respect to a guardrail GL of which the position is specified by the in-vehicle camera 60 or the like.

The driver visually recognizes a structure on the road, such as the guardrail GL moving rearward with respect to the host vehicle while traveling at the traveling speed of the host vehicle, thereby sensing the traveling speed of the host vehicle. The vehicle lamp (1 or 45) causes the marks (M51, M52) depicted on a road surface R4 and the guardrail GL at a speed faster than or a speed slower than the speed of the traveling host vehicle My in the advancing direction or the reverse direction of the host vehicle. In a case where the marks (M51, M52) are caused to move in the reverse direction, when the speed of the mark M51 moving rearward increases, the driver feels that the traveling speed of the host vehicle My is high and the attention of the driver is called to decelerating the host vehicle My. When, the speed of the marks (M51, M52) moving rearward decreases, the driver feels that the traveling speed of the host vehicle My is low and the attention of the driver is called to accelerating the host vehicle My.

When the speed of the host vehicle My is increased, a structure on a road looks short from the driver with respect to the advancing direction. Accordingly, when the vehicle lamp (1 or 45) depicts a longitudinal length L51 of the mark M51 shorter, the driver feels that the traveling speed of the host vehicle My is high and the attention of the driver is called to deceleration. When the longitudinal length L51 is depicted longer, the driver feels that the traveling speed of the host vehicle My is low and the attention of the driver is called to acceleration.

Figure 11:
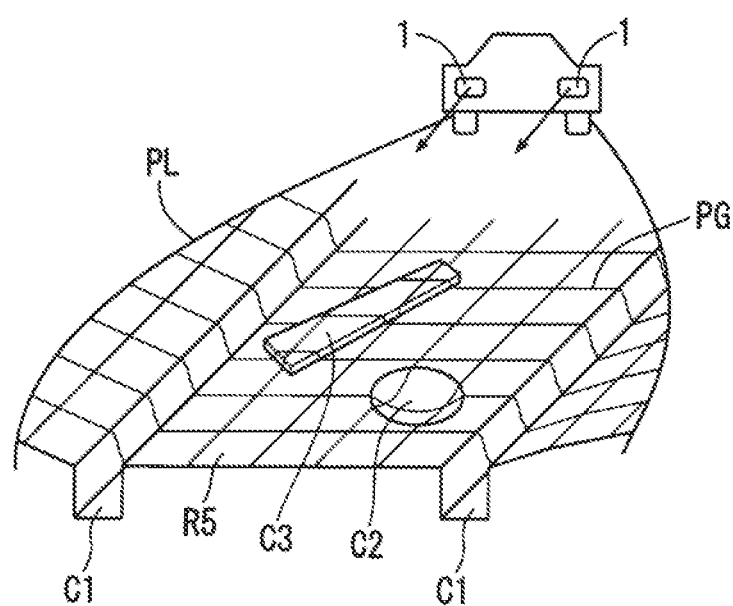
FIG. 11 is an explanatory view in which a latticed grid line figure is depicted on a road surface or the like with laser light together with a low beam light distribution pattern.

FIG. 11 illustrates a view in which a latticed grid line figure is depicted on the periphery of the vehicle with laser light in red or the like. In a case where the vehicle lamp (1 or 45) irradiates a road surface R5, a road surface side groove C1, a sinkhole C2, a fallen object C3, and the like in front of the vehicle with a grid line figure PG both inside and outside a low beam light distribution pattern PL by using laser light in red or the like, the grid line figure PG is curved and cut into pieces based on the unevenness of the irradiated place. Therefore, the shapes of the side groove C1 and the like are accentuated, and thus, it is easy for the driver to grasp the shapes and the positions thereof.

FIG. 12 illustrates the third example of the vehicle lamp. A vehicle lamp 73 in FIG. 12 has a lamp body 74, a front lens 75, two LED light source units (76, 77) for forming a high beam and a low beam tiltably attached to the inside of the lamp body 74 via aiming screws 78 and a support member 79, a DRL unit 80 having multiple LED light emitters 81, a laser light source unit (not illustrated), and an optical mechanism 82 having a reflection portion 83 which is vertically and laterally tiltable. An emission end 84 (a reflection point) of the reflection portion 83 reflecting laser light is exposed to the front from the multiple LED light emitters 81. Even though laser light in color other than white is reflected, the luminescent color of the emission end 84 is countervailed by the multiple LED light emitters 81 having high luminance. Therefore, the emission end 84 is not visually recognized by a pedestrian in front thereof or a driver in an oncoming vehicle.

Figure 14:
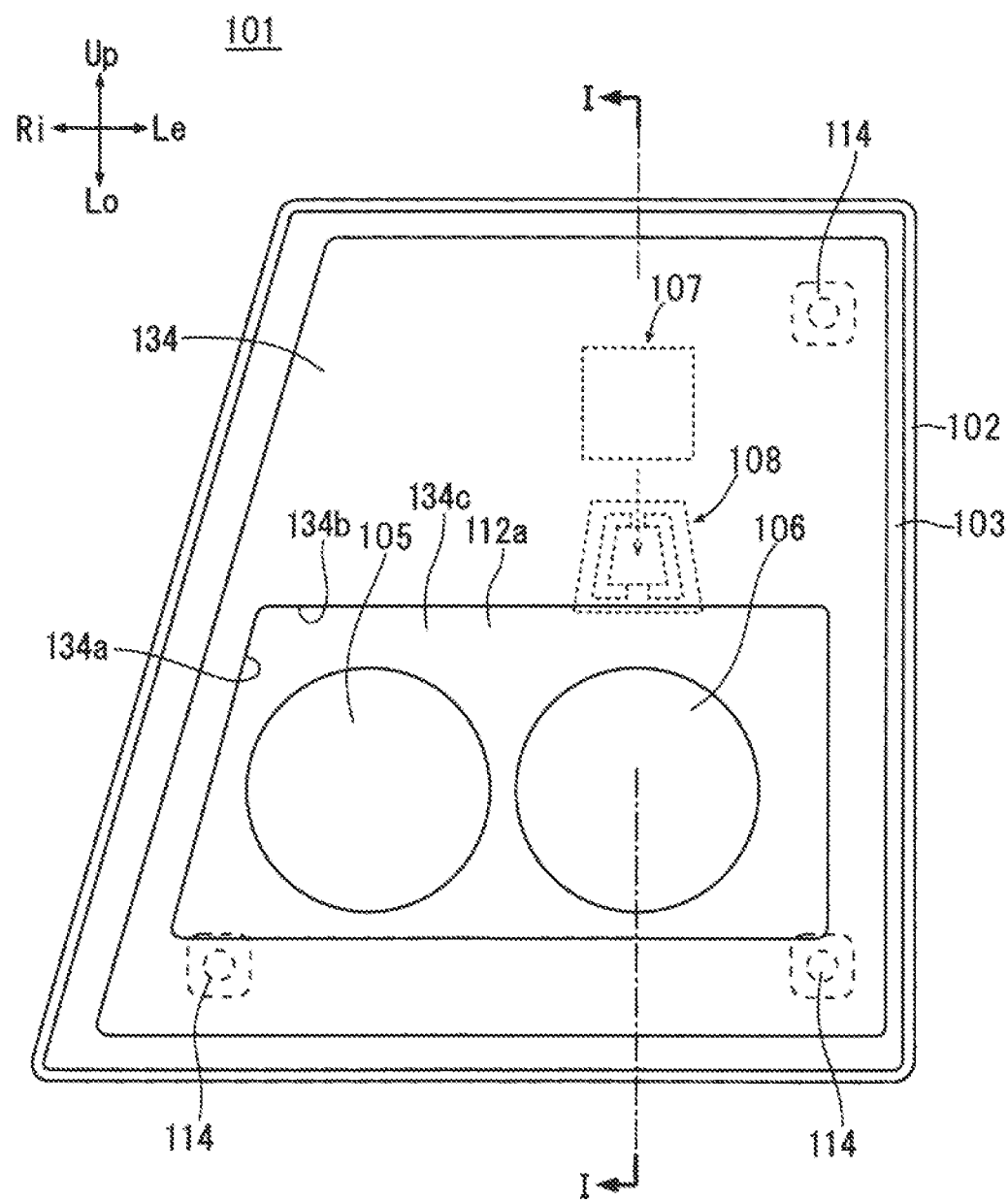
FIG. 14 is a front view of a vehicle lamp in a fifth example.

FIG. 13 is an explanatory view of the fourth example related to the AO device which is used instead of the MEMS mirror used in the vehicle lamp 1 in the first example. In the acousto-optic device (AO device), a periodical change occurs in the refractive index when a high-frequency electric signal is applied. Scanning is performed along a straight line with laser light that has passed through the AO device to which the high-frequency electric signal is applied. In the present example, as illustrated in FIG. 14, two AO devices (90, 91) respectively connected to high-frequency electric signal applying means (92, 93) are disposed in series. Laser light which has passed through the AO device 90 is periodically refracted so that scanning is performed along a straight line. The laser light in a straight line is refracted again by the AO device 91, and scanning of a wider range is performed along a straight line.

It is desirable that another set of AO devices (90, 91) (not illustrated) is disposed in series next to the AO devices (90, 91) in a state of being rotated by 90 degrees with respect to a straight line L6 indicating the incident ray direction of light (another set of AO devices is not illustrated). As a result thereof, for example, the laser light B2 which is incident on the first set of the AO devices (90, 91) and is used for scanning on the line in the vertical direction is incident on the second set of the AO devices (not illustrated) which is disposed in a state of being rotated by 90 degrees and is used for scanning in the lateral direction. The multiple AO devices disposed in series in a state of being rotated by 90 degrees can perform plane-scanning with laser light in the vertical and lateral directions.

In a mechanical optical mechanism such as the MEMS mirror, there is concern that when the condensing lens, the dichroic mirror, and the like receive vibration and resonate, depiction performed with laser light is distorted. However, in regard to the point of performing depiction on the road surface with little distortion, it is desirable to adopt the optical mechanism using the AO device for being less likely to be affected by vibration.

Hereinafter, another embodiment of the present invention will be described based on a fifth example to a twelfth example illustrated in FIGS. 14 to 24. FIGS. 14 to 17 illustrate the fifth example of a vehicle lamp of the present invention, and FIG. 18 illustrates the sixth example of the vehicle lamp in which the LED light source unit of the fifth example is removed. FIGS. 19 to 24 illustrate a depiction system used in the vehicle lamp in the fifth and sixth examples.

Figure 15:
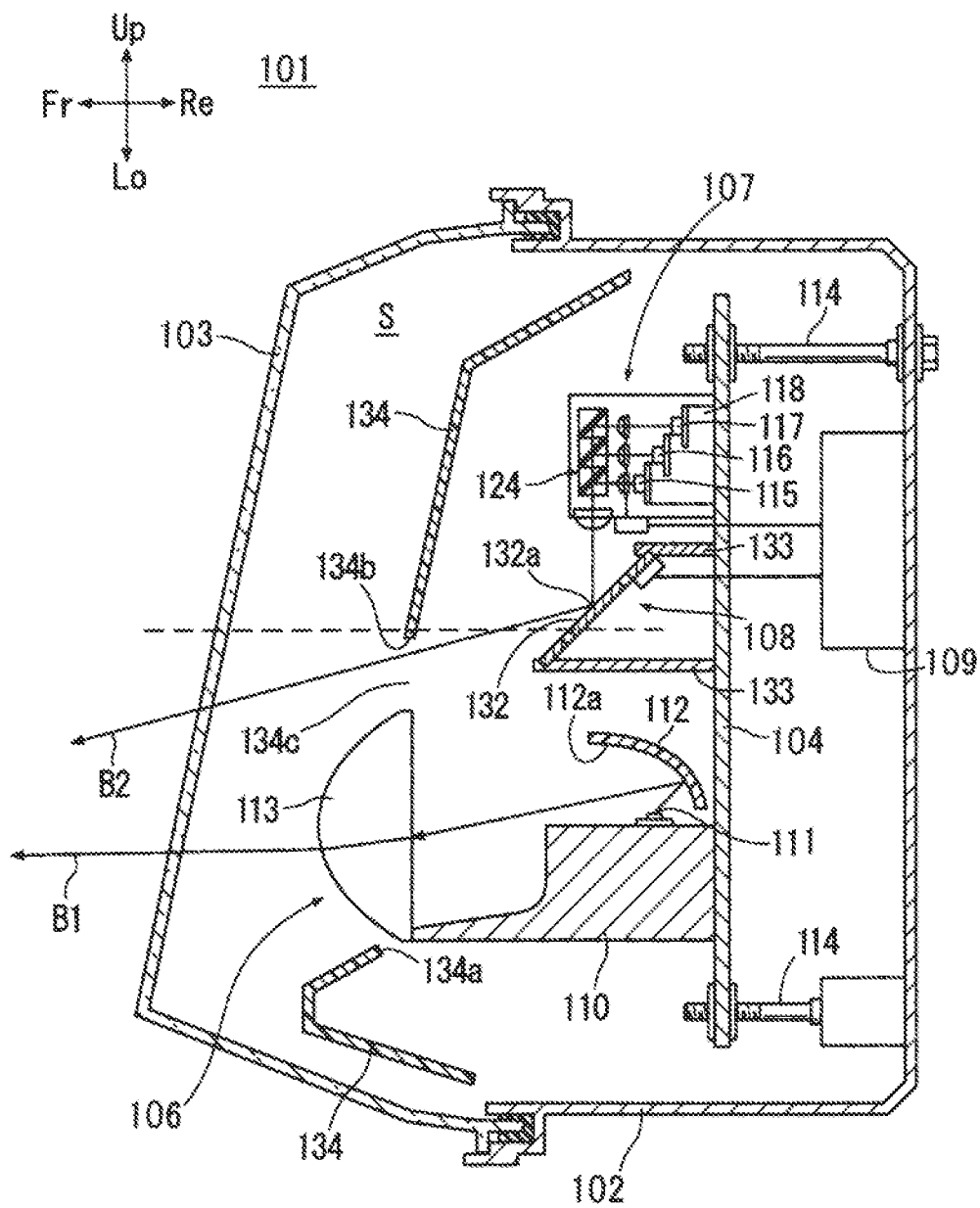
FIG. 15 is a sectional view taken along line I-I in FIG. 14.

A vehicle lamp 101 in the fifth example illustrated in FIGS. 14 and 15 is an example of a headlamp on the right side, and the configuration thereof is substantially the same as that of the vehicle lamp 1 illustrated in FIGS. 1 and 2.

Figure 16A:
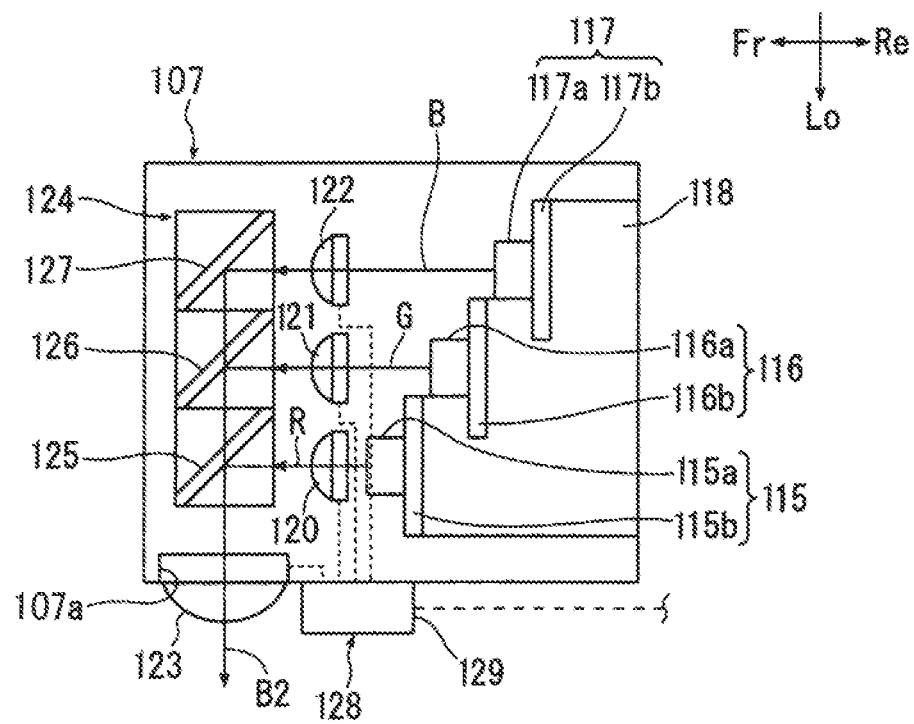
FIG. 16A is an enlarged view of the laser light source unit in FIG. 15.

A laser light source unit 107 illustrated in FIG. 16A shares the configuration with the vehicle lamp 1 in the first example except that a fourth condensing lens 123 is provided.

Each of the first to fourth condensing lenses (120 to 123) illustrated in FIG. 16A is configured to be a collimate lens or the like. A light condensing portion 124 has first to third dichroic mirrors (125 to 127). On optical paths of rays of the red laser light R, the green laser light G, and the blue laser light B respectively emitted from light sources (115 to 117), the first to third condensing lenses (120 to 122) and the first to third dichroic mirrors (125 to 127) are disposed in order. The first dichroic mirror 125 is configured to reflect red light and to transmit blue light and green light, the second dichroic mirror 126 is configured to reflect green light and to transmit blue light, and the third dichroic mirror 127 is configured to reflect blue light.

As illustrated in FIG. 16A, the red laser light R emitted from the first light source 115 is transmitted through the first condensing lens 120 and is converted into parallel light. Thereafter, the red laser light R is directly reflected toward the fourth condensing lens 123 by the first dichroic mirror 125. The green laser light G emitted from the second light source 116 is transmitted through the second condensing lens 121 and is converted into parallel light. Thereafter, the green laser light G is reflected by the second dichroic mirror 126 and is transmitted through the first dichroic mirror 125. Thereafter, the green laser light G is incident on the fourth condensing lens 123. The blue laser light B emitted from the third light source 117 is transmitted through the third condensing lens 122 and is converted into parallel light. Thereafter, the blue laser light B is reflected toward the fourth condensing lens 123 by the third dichroic mirror 127 and is transmitted through the second and first dichroic mirrors (126, 125) in order. Thereafter, the blue laser light B is incident on the fourth condensing lens 123.

The fourth condensing lens 123 is attached to an opening portion 107a of a housing of the laser light source unit 107. The rays of the red laser light R, the green laser light G, and the blue laser light B reflected by the light condensing portion 124 become the laser light B2 having a composite color. The laser light B2 subjected to compositing is transmitted through the fourth condensing lens 123 and is converted into parallel light. Thereafter, the laser light B2 is emitted toward an optical mechanism 108.

An extension reflector 134 inside the lighting chamber S has an opening portion 134a. In LED light source units (105, 106), in order to cause an LED light emitter 111 to emit emission light B1 forward through the opening portion 134a, each of projection lenses 113 is attached to a support member 104 in a state of being exposed to the front from the opening portion 134a. Both the laser light source unit 107 and the optical mechanism 108 are disposed above the opening portion 134a and behind the extension reflector 134, thereby being concealed when viewed from a place in front of the vehicle. The emission light B2 from the laser light source unit 107 is emitted forward through a gap 134c formed between an upper end edge portion 134b of the opening portion 134a and the LED light source units (105, 106).

Figure 16B:
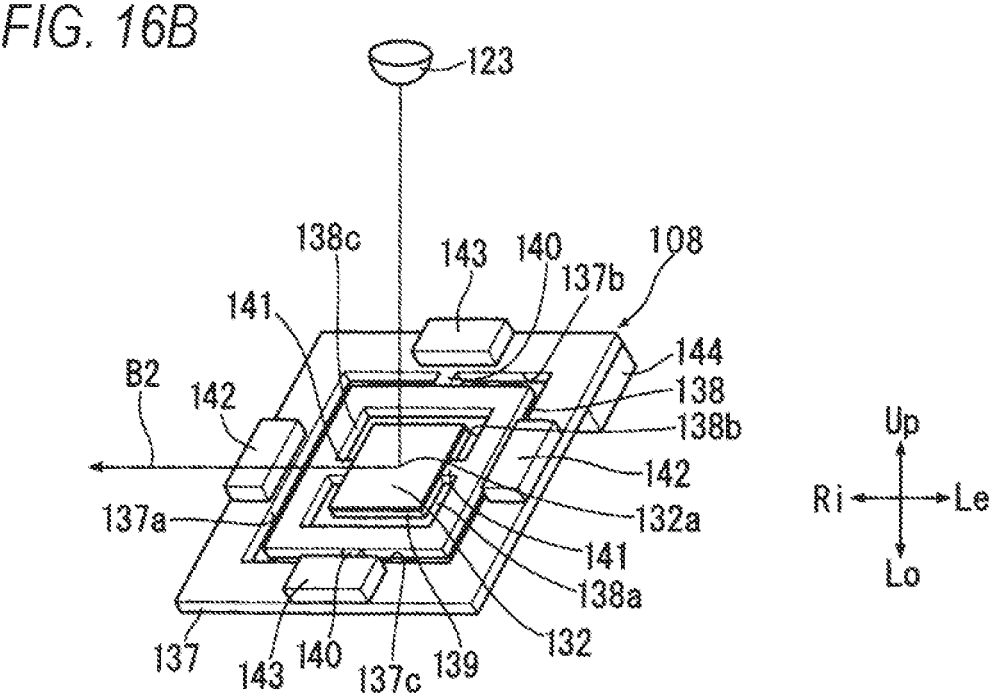
FIG. 16B is a perspective view of a light distribution portion in FIG. 15 viewed from a place in front of the vehicle.

The optical mechanism 108 illustrated in FIG. 16B is a MEMS mirror and shares the configuration with the optical mechanism 8 in the first example. Therefore, detailed description will be omitted.

As illustrated in FIG. 16B, the optical mechanism 108 causes the laser light B2 emitted from the fourth condensing lens 123 in FIG. 16A to be reflected forward by a reflection portion 132 of a second pivoting body 139 which is an emission end emitting laser light forward. A place in front of the vehicle is subjected to scanning performed with the laser light B2 reflected forward by a light-emitting portion 132a (a reflection point) of the reflection portion 132 by causing the reflection portion 32 of the second pivoting body 139 to vertically and laterally pivot in a reciprocating manner. In the vehicle lamp 101 in the fifth example, the LED light source units (105, 106) are switched, thereby forming white light distribution patterns for a low beam and a high beam having predetermined shapes. In addition, the optical mechanism 108 performs scanning of a figure pattern calling the attention of the driver to a white light distribution pattern supplementing the low beam light distribution pattern, the road surface, a structure, and the like in front of the vehicle with the laser light B2 in color other than white.

Figure 17:
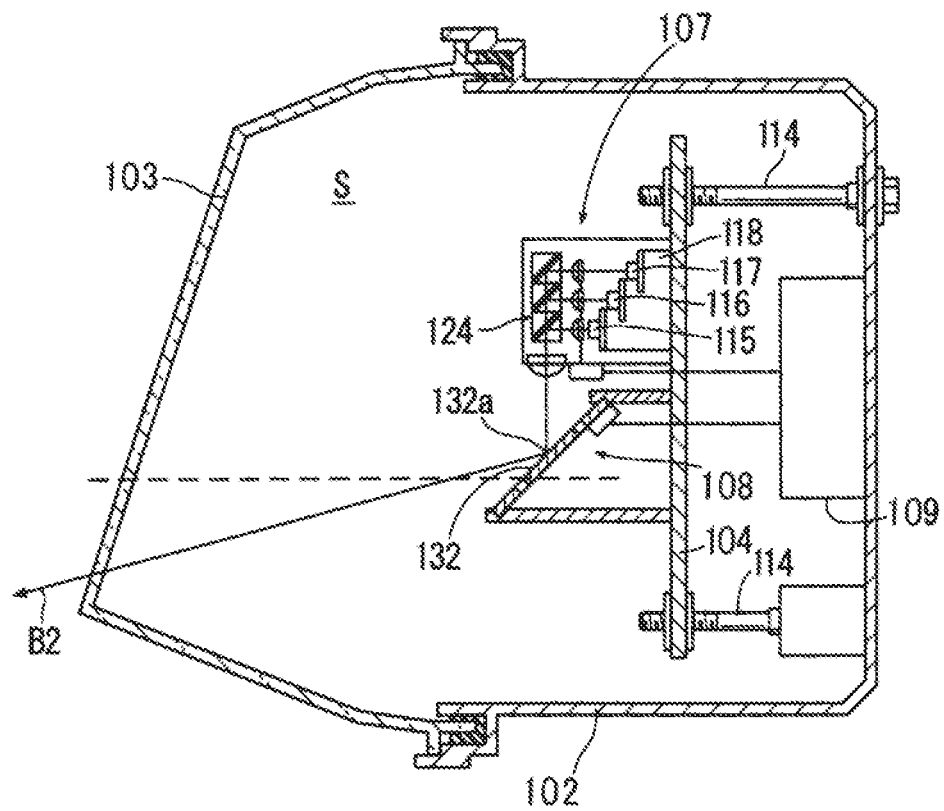
FIG. 17 is a vertical sectional view of a vehicle lamp in a sixth example cut at the same position as that in FIG. 15.
Figure 18:
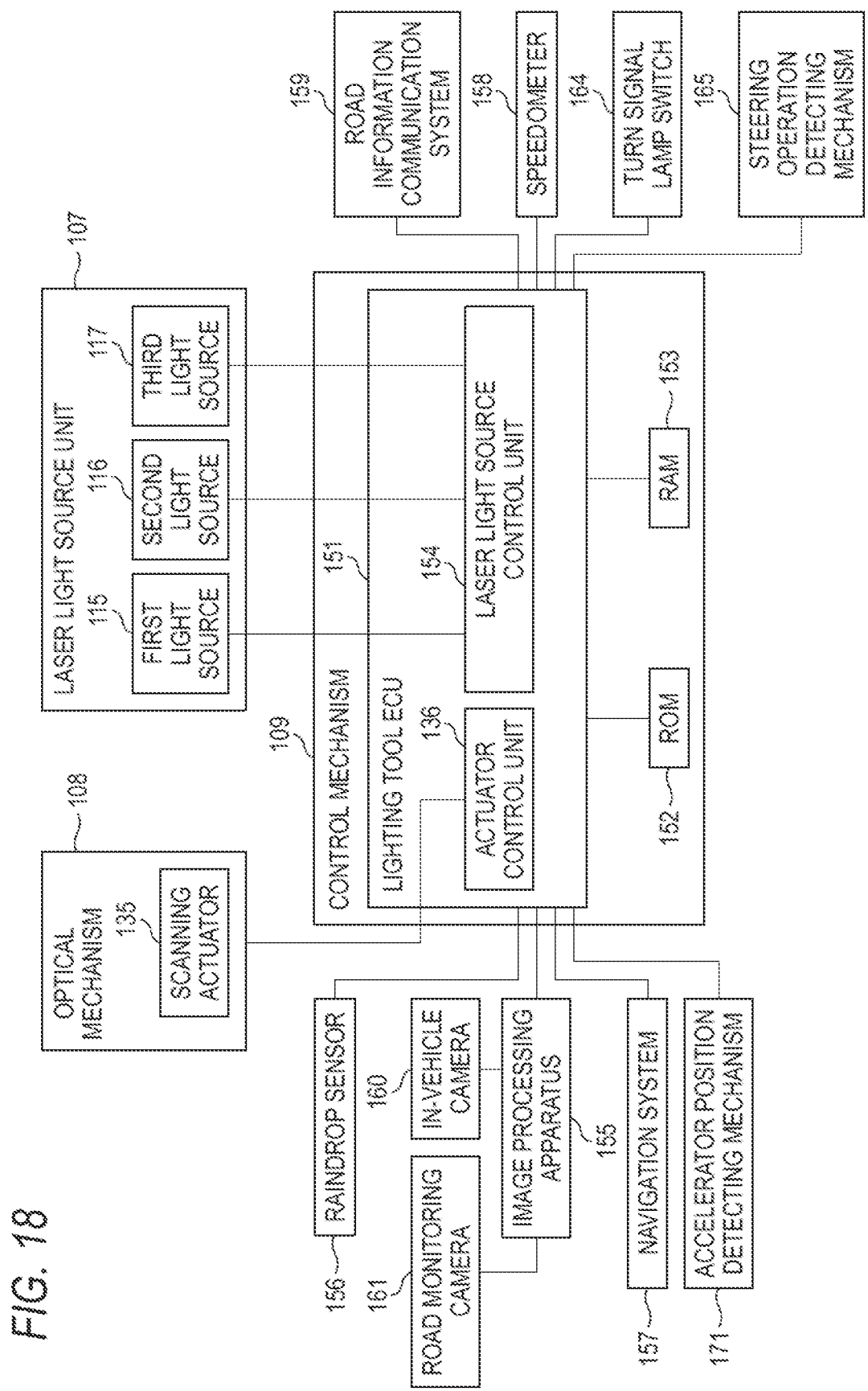
FIG. 18 is a block diagram describing a control apparatus.

FIG. 17 illustrates a vehicle lamp 145 in the sixth example. In the vehicle lamp 145 in the sixth example, the LED light source units (105, 106) and the extension reflector 134 of the vehicle lamp 101 in the fifth example are omitted, and the vehicle lamp 145 shares the rest of the configurations with the vehicle lamp 101 in the fifth example. In the vehicle lamp 145 in the sixth example, in addition to the depiction of a figure for calling the attention of the driver performed with laser light other than white light, white light distribution patterns for a low beam and a high beam are also formed by white the laser light B2 used in scanning performed by the laser light source unit 107 and the optical mechanism 108. In the vehicle lamp 145 in the sixth example, the low beam light distribution pattern and the high beam light distribution pattern may be independently formed by providing two sets of combination of the laser light source unit 107 and the optical mechanism 108. In this case, three sets of combination of the laser light source unit 107 and the optical mechanism 108 may be provided.

Subsequently, a control apparatus 109 will be described with reference to FIG. 18. The control apparatus 109 shares the configuration with the control apparatus 9 in the first example.

A laser light source control unit 154 controls the intensity of emission, and states of light-on and light-off of various types of laser light (R, G, B) from the first light source 115, the second light source 116, and the third light source 117 independently for each of the light sources, thereby generating laser light in diverse composite colors. In addition, an actuator control unit 136 controls a scanning actuator 135 of the optical mechanism 108 and performs scanning of a place in front of the vehicle with the laser light B2 in a composite light, thereby depicting a figure having a predetermined shape on the road surface, a structure, or the like around the vehicle. The figure having a predetermined shape includes a light distribution pattern of the vehicle lamp formed by composite white laser light, and a mark and letters calling the attention of the driver in the host vehicle or a different vehicle, or a pedestrian, or the like formed by using diverse composite colors.

Figure 19A:
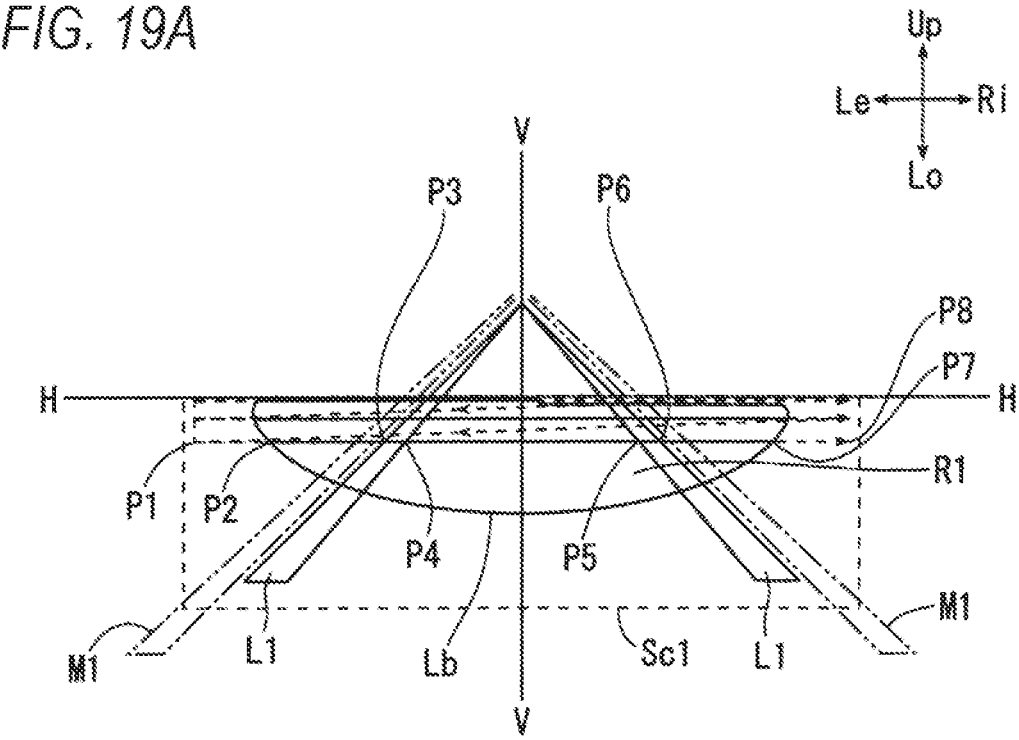
FIG. 19A is an explanatory view related to depiction in front of the vehicle performed with laser light by the vehicle lamp in the fifth example.
Figure 19B:
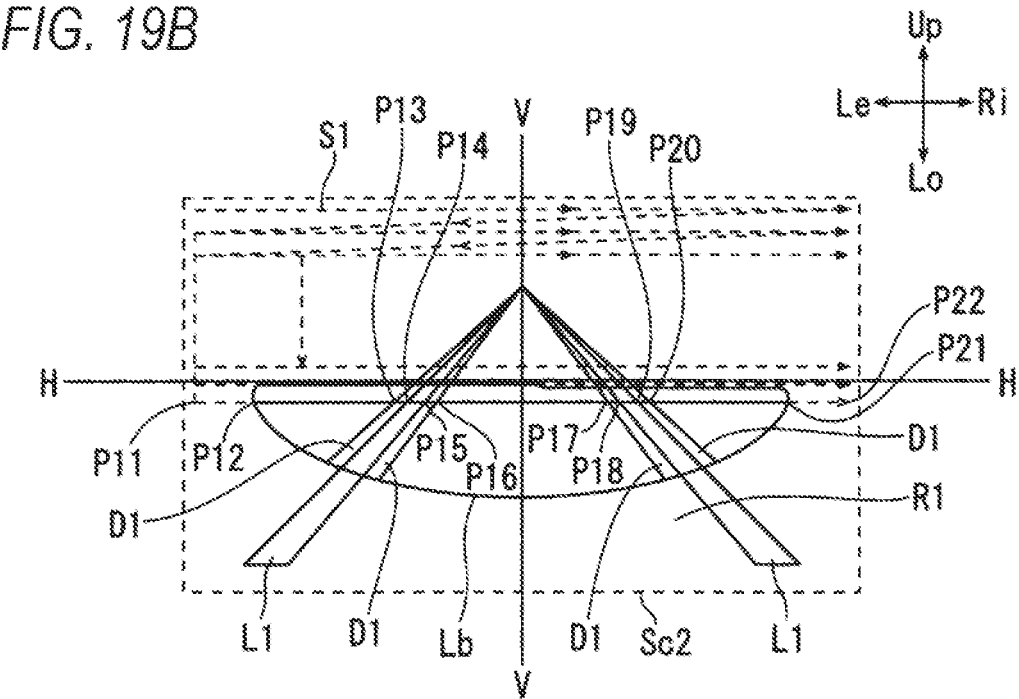
FIG. 19B is an explanatory view of depiction performed by the vehicle lamp in the sixth example, in which a dark portion is formed around a bright portion (line) formed by using laser light.

Here, depiction of a figure performed in front of the vehicle with composite laser light will be described with reference to FIGS. 19A, 19B, and 20. FIG. 19A is an explanatory view of depiction of a figure performed by the vehicle lamp 101 in the fifth example, and FIG. 19B is an explanatory view of depiction of a figure performed by the vehicle lamp 145 in the sixth example. The optical mechanism 108 in each of the first and second examples illustrated in FIGS. 19A and 19B slightly can repeatedly perform scanning in a direction from left to right of the vehicle by changing the position in the vertical direction within each of the rectangular scanning regions (the reference signs Sc1 and Sc2) in front of the vehicle. In the vehicle lamp 145 in the sixth example illustrated in FIG. 19B, the extension reflector 134 which cuts light oriented upward with respect to the horizontal direction is not provided in front of the optical mechanism 108. Accordingly, the optical mechanism 108 in the sixth example can perform scanning of the wide scanning region Sc2 higher than the scanning region Sc1 of the optical mechanism 108 in the fifth example, and thus, it is possible to perform depiction of a figure with respect to a high beam light distribution pattern, and a road surface or an obstacle at a place far ahead.

The reference sign S1 indicates the tracking path of the scanning line performed by the optical mechanism 108. As illustrated in FIGS. 19A and 19B, the optical mechanism 108 causes the reflection portion 132 (refer to FIG. 16B) to pivot from left to right and performs scanning from left to right. Thereafter, the reflection portion 132 is caused to pivot obliquely downward to the left, and the orientation of the reflection portion 132 is returned to the next scanning start position which is deviated downward from the initial scanning start position by a very-short-distance dl, thereby repeatedly performing an operation of scanning again from left to right.

In addition, the laser light source control unit 154 illustrated in FIG. 18 performs light-on or light-off with respect to the first to third light sources (115 to 117) when the scanning line S1 in FIGS. 19A and 19B is moved from left to right by the optical mechanism 108, and the laser light source control unit 154 performs light-off with respect to all of the first to third light sources (115 to 117) when the scanning line S1 is returned to the next scanning start position from right to left obliquely downward by the optical mechanism 108. The dotted line portion of the scanning line S1 illustrated in FIGS. 19A and 19B indicates the range in which all of the first to third light sources (115 to 117) are subjected to light-off, and the solid line portion of the scanning line S1 indicates the range in which a portion or all of the first to third light sources (115 to 117) are subjected to light-on and a figure is depicted on the road surface with laser light. Regarding the control of light-on and light-off with respect to the first to third light sources (115 to 117) performed by the optical mechanism 108, the control may be performed while moving the scanning line S1 from right to left, or may be performed while moving the scanning line S1 laterally in a reciprocating manner. The control is not limited to only a case of moving from left to right as that in the present example.

FIG. 19A illustrates a view in which the low beam light distribution pattern Lb formed in front of the vehicle by first white light, and the lines L1 in color other than white making the driver recognize the positions of the lane marks M1 (portions indicated by the two-dot chain lines) are depicted on the road surface R1 with laser light. For example, the lines L1 are depicted as lines in red or the like on the lane marks M1 or places adjacent to the lane marks M1. A method of detecting the positions of the lane marks M1 and the like will be described later.

In the vehicle lamp 101 in the fifth example, the low beam light distribution pattern Lb is formed by performing compositing of the light B1 from the LED light source unit 105 and the laser light B2 which is subjected to compositing in white and scanning. In the vehicle lamp 145 in the sixth example, the low beam light distribution pattern Lb is formed by only the laser light B2 which is subjected to compositing in white and scanning.

For example, in FIG. 19A, in a case where scanning is performed from left to right by the optical mechanism 108, the laser light source control unit 154 first performs light-off with respect to all of the first to third light sources (115 to 117) in a section from P1 to P2 in which depiction is not performed. Subsequently, the laser light source control unit 154 generates white laser light which is subjected to compositing through the control of the first to third light sources (115 to 117) in a section from P2 to P3 in which the low beam light distribution pattern Lb is depicted on the road surface R1 and an object in front of the vehicle. Subsequently, the laser light source control unit 154 performs light-off with respect to green and blue laser light from the second and third light sources (116, 117) in a section from P3 to P4 in which the lines L1 are depicted on the road surface with red laser light, and adjusts the intensity of irradiation of the first light source, thereby generating red laser light having predetermined luminance. Moreover, the laser light source control unit 154 causes the first to third light sources (115 to 117) to generate white laser light in a section from P4 to P5, causes the first light source to generate red laser light in a section from P5 to P6, causes the first to third light sources (115 to 117) to generate white laser light in a section from P6 to P7, and performs light-off with respect to all of the first to third light sources (115 to 117) in a section from P7 to P8 after depiction ends.

When the optical mechanism 108 repeats such scanning in the direction from left to right at a high speed, white laser light subjected to compositing by the laser light source unit 107 is used together with light from the LED light source unit 105 (in a case of the fifth example) or alone (in a case of the sixth example) in depicting the low beam light distribution pattern Lb from the headlamp on the road surface and an object in front of the vehicle, and red laser light is used in depicting the two lines L1 indicating the positions of the lane marks M1 on the road surface. In the laser light source unit 107 and the optical mechanism 108, the low beam light distribution pattern may be formed with white light by performing predetermined scanning. As the color of the lines L1, it is possible to employ not only red but also multifarious colors obtained through compositing of rays of laser light from the first to third light sources (115 to 117). In addition, as the means of depiction of a figure calling the attention of the driver, it is possible to consider multifarious marks described below, without being limited to the lines L1.

In a case where the lines L1 in red are depicted within the regions of the low beam light distribution pattern Lb in white and the high beam light distribution pattern (not illustrated), as illustrated in FIG. 19B, it is desirable that the lines L1 are depicted within a dark portion D1 by forming the dark line-shaped dark portion D1 on both right and left sides of the lines L1 in red on the road surface R1. The contours of the lines L1 in red are accentuated within the low beam light distribution pattern Lb by providing the dark portion D1 with respect to the low beam light distribution pattern Lb in white, and thus, the visual recognizability is improved. FIG. 19B is a view in which the lane marks M1 in FIG. 19A are omitted and the dark portion D1 is added in order to make the view easy to understand.

Figure 20:
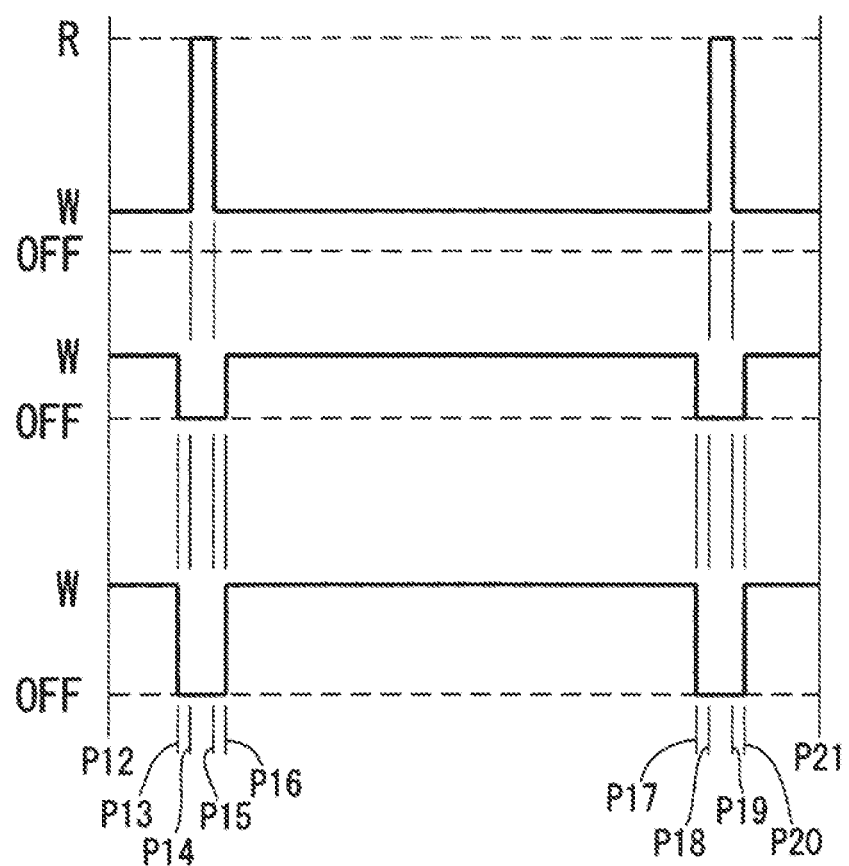
FIG. 20 is an explanatory view illustrating light-on states and light-off states of each of first to third light sources.

With reference to FIGS. 19B and 20, description will be given regarding a procedure of forming the lines L1 in red which becomes the bright portion within the region in which the dark portion D1 is formed, within the region of the low beam light distribution pattern Lb in white. The reference signs (R, G, B) in FIG. 20 indicate each of the light-on and light-off states of the first to third light sources (115 to 117). The reference signs W and R indicate the magnitude of the outputs of the light sources. The output R has the intensity of irradiation stronger than that of the output W. Each of the light sources generates white laser light by performing light-on with respect to all of the light sources at the output W. The first light source 115 generating red laser light is not subjected to light-off, and of which the intensity of irradiation is enhanced to the output R at a predetermined time. The second and third light sources (116, 117) are subjected to light-off at the positions of "OFF".

First, the laser light source control unit 154 in FIG. 18 performs light-off with respect to all of the first to third light sources (115 to 117) in a section from P11 to P12 in which depiction illustrated in FIG. 19B is not performed, and a section from P21 to P22. The laser light source control unit 154 depicts the low beam light distribution pattern Lb with white laser light in the section from P12 to P21, the dark portion D1, and the lines L1 in red formed by the red laser light on the road surface or an object in front of the vehicle.

As illustrated in FIGS. 19B and 20, the laser light source control unit 154 generates white laser light while performing light-on with respect to the first to third light sources (115 to 117) in the section from P12 to P13 at the output W, thereby forming the low beam light distribution pattern Lb.

In the section from P13 to P14, the laser light source control unit 154 performs light-off with respect to only the second and third light sources (116, 117) without changing the intensity of irradiation of the first light source 115, thereby forming the dark portion D1 within the low beam light distribution pattern Lb in white. Specifically, in the vehicle lamp 101 in the fifth example forming the low beam light distribution pattern Lb by using the LED light source unit 105 and laser light subjected to compositing in white, the dark portion D1 is formed by reducing the white color. In addition, in the vehicle lamp 145 in the sixth example forming the low beam light distribution pattern Lb by using only white laser light, the dark portion D1 is formed by performing light-off with respect to white. In addition, the laser light source control unit 154 enhances the output of the first light source 115 from the output W to R in the section from P14 to P15, thereby forming the lines L1 by using red laser light adjacent to the dark portion D1.

In addition, the laser light source control unit 154 reduces the output of the first light source 115 from the output R to W again in the section from P15 to P16, thereby forming the dark portion D1 adjacent to the lines L1 in red. The laser light source control unit 154 generates white laser light together with the first light source 115 having the same output by performing light-on with respect to the second and third light sources (116, 117) again at the output W in the section from P16 to P17, thereby forming the low beam light distribution pattern Lb in white which continues to the dark portion D1. As a result thereof, the lines L1 in red surrounded by the dark portion D1 is vividly depicted within the low beam light distribution pattern Lb in white.

In addition, the laser light source control unit 154 performs the same control as that described above with respect to the first to third light sources (115 to 117), thereby forming the dark portion D1 in the section from P17 to P18, forming the lines L1 in red in the section from P18 to P19, forming the dark portion D1 in the section from P19 to P20, and forming the low beam light distribution pattern Lb in white in the section from P20 to P21.

In the vehicle lamp (101 or 145) in the fifth or sixth example, the laser light source unit 107 generates predetermined laser light at a predetermined time as described above, and the optical mechanism 108 repeats predetermined scanning at a high speed in the direction from left to right as described above while sliding in the vertical direction, thereby depicting a white light distribution pattern having a predetermined shape as the headlamp, or a figure having a predetermined shape calling the attention of the driver and the like on the road surface or an object in front of the vehicle with laser light in diverse colors.

In addition, an image processing apparatus 155, a raindrop sensor 156, a navigation system 157, a speedometer 158, a road information communication system 159, a turn signal lamp switch 164, a steering operation detecting mechanism 165, an accelerator position detecting mechanism 171, and the like are connected to a lighting tool ECU 151 illustrated in FIG. 18. An in-vehicle camera 160, a road monitoring camera 161, and the like are connected to the image processing apparatus 155.

The in-vehicle camera 160 includes a camera and the like which are mounted in the host vehicle or a different vehicle and capture a moving image or a still image of a place on the periphery of the vehicle. The road monitoring camera 161 includes an intersection camera which is disposed at an intersection, and a monitoring camera which is installed near a road and captures a moving image or a still image of the road surface conditions, a pedestrian, a bicycle, a motorcycle, a vehicle such as an automobile, an obstacle, and the like. The image processing apparatus 155 is connected to the road monitoring camera 161 via a communication line such as the internet and acquires a video image and image data from the road monitoring camera 161. The image processing apparatus 155 sends a video image and the like captured by the in-vehicle camera 160, the road monitoring camera 161, or the like as analysis-processed data to the lighting tool ECU 151. The raindrop sensor 156 sends a data signal related to an amount of rainfall during the traveling of the vehicle to the lighting tool ECU 151.

For example, the navigation system 157 has a GPS, map data, and the like (not illustrated), thereby sending a data signal related to the current position of the host vehicle to the lighting tool ECU 151. In addition, the lighting tool ECU 151 receives a signal related to the traveling speed of the host vehicle through the speedometer 158. The road information communication system 159 receives data related to the traveling road surface conditions such as an amount of rainfall on the traveling road, and frozenness circumstances of the road, via a communication line such as the internet to the lighting tool ECU 151.

The lighting tool ECU 151 analyzes the circumstances related to the host vehicle and the like on the road and the road surface conditions based on each of the pieces of the above-described data, thereby controls the laser light source unit 107 and the optical mechanism 108 such that a predetermined figure calling the attention of drivers in the host vehicle and a different vehicle is depicted on the road surface or the like. The means of depicting a predetermined figure calling the attention of the drivers in the host vehicle and a different vehicle by utilizing the vehicle lamp (101 or 145) in the fifth example or the sixth example will be exemplified below.

With reference to FIGS. 18 and 21, description will be given regarding the seventh example related to the depiction system of the vehicle lamp (101 or 145) in the fifth or sixth example in which the stopping distance is automatically calculated based on the traveling speed of the host vehicle, and marks and the like indicating a stopping vehicle-to-vehicle distance are depicted on the road surface with laser light.

In a case where a different vehicle traveling ahead (hereinafter, will be simply referred to as a vehicle ahead) suddenly decelerates due to a sudden stop or the like, the driver in the traveling vehicle has to cause the vehicle to travel while ensuring an appropriate vehicle-to-vehicle distance with respect to the vehicle ahead such that the host vehicle can safely stop without causing a rear-end collision. However, in a case where an object serving as a target which makes the driver recognize the vehicle-to-vehicle distance with respect to a vehicle ahead is not provided on the road, the driver cannot recognize the vehicle-to-vehicle distance with respect to a different vehicle. In addition, the braking distance of the vehicle varies in accordance with the speed of the host vehicle and also varies in accordance with the road surface conditions such as a rainfall and frozenness. Accordingly, it is difficult for the driver who is actually traveling to recognize the vehicle-to-vehicle distance with respect to the vehicle ahead, and the braking distance in which the vehicle can safely stop without causing a rear-end collision with the vehicle ahead. As means for measuring the vehicle-to-vehicle distance with respect to a vehicle ahead, there is a method of adopting an image analysis system in which a millimeter-wave radar or an in-vehicle camera is used. However, a millimeter-wave radar can only sense a vehicle ahead to the extent of 150 m of the vehicle-to-vehicle distance. Therefore, in regard to the point that a distant vehicle is less likely to be seized, the in-vehicle camera also as a vehicle-to-vehicle distance that can be measured.

In consideration of the above-described problem, according to the depiction system in the present example, after the braking distance of the traveling host vehicle is automatically measured in accordance with the traveling speed of the host vehicle or the road surface conditions, a figure making the traveling driver recognize the required vehicle-to-vehicle distance with respect to the vehicle ahead is depicted on the road surface with laser light.

According to the depiction system in the present example, a program in which after the braking distance is calculated in accordance with the speed of the host vehicle, an amount of rainfall on the traveling road surface, and the presence or absence of frozenness, marks and the like are depicted in a position where the host vehicle actually stops at the time of emergency braking, that is, at a position ahead by the braking distance from the vehicle with laser light is recorded in the ROM in FIG. 18. The lighting tool ECU 151 automatically calculates the braking distance in accordance with the speed of the host vehicle obtained through the speedometer 158.

Regarding the braking distance to be calculated, for example, in consideration of a margin allowing the vehicle to stop, it is desirable to calculate multiple braking distances such as a first braking distance in which the vehicle can stop by gently stepping on the brake, a second braking distance in which the vehicle can stop by stepping on the brake with ordinary force, and a third braking distance, that is, the limit braking distance in which the vehicle can stop by stepping on the brake with full strength. Regarding the first to third braking distances, for example, in a case where the vehicle travels 60 km per hour on a dry road surface, the lighting tool ECU 151 calculates the shortest braking distance (the third braking distance) in which the vehicle can stop to be 40 m, calculates the second braking distance to be 50 m, calculates the first braking distance to be 60 m, and the like. Each of the first to third braking distances is increased or decreased in accordance with the change of the speed of the host vehicle.

In addition, in a case where the vehicle travels on the road surface in a wet state due to a rainfall or on the road surface which may freeze, it is more desirable that the lighting tool ECU 151 calculates the first to third braking distances to be longer than that when it is dry. Specifically, for example, the lighting tool ECU 151 calculates the first to third braking distances to be longer than that when it is dry by receiving data related to an amount of rainfall on the traveling road through the raindrop sensor 156 or the road information communication system 159, and receiving data related to the presence or absence of frozenness on the traveling road surface through the road information communication system.

For example, in a case where the vehicle travels 60 km per hour on the wet road surface due to a rainfall or the like, the lighting tool ECU 151 calculates the third braking distance to be 50 m, calculates the second braking distance to be 70 m, calculates the first braking distance to be 90 m, and the like such that the braking distance is longer than that when traveling the dry road surface. Each of the braking distances is increased or decreased in accordance with the change of additionally obtained data of an amount of rainfall. In addition, for example, in a case where the vehicle travels 60 km per hour on a road surface which may freeze, the lighting tool ECU 151 calculates the third braking distance to be 80 m, calculates the second braking distance to be 120 m, calculates the first braking distance to be 160 m, and the like such that the braking distance is much longer than that when traveling on the wet road surface.

Subsequently, with reference to FIG. 21, description will be given regarding specified means of depicting a figure making the traveling driver recognize the required vehicle-to-vehicle distance with respect to the vehicle ahead on a road surface with laser light. The reference sign R2 indicates the traveling road, the reference sign My indicates the host vehicle, the reference sign Ot indicates a different vehicle, and the reference signs Fr and Re indicate the forward and rearward directions of the vehicle. As an example, the host vehicle is considered to be traveling 60 km per hour on the dry road surface.

Figure 21A:
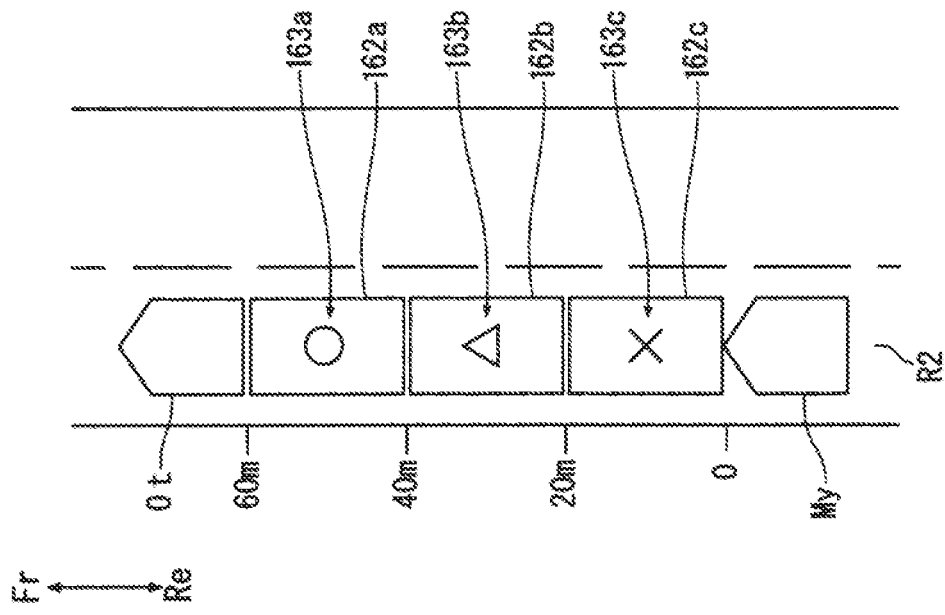
FIG. 21A is an explanatory view of a depiction system in a seventh example in which a figure making the driver recognize the vehicle-to-vehicle distance to a vehicle in front is depicted on a road surface with laser light.

In FIG. 18, for example, as illustrated in FIG. 21A, in accordance with the first to third braking distances calculated when traveling 60 km per hour, for example, the actuator control unit 136 which has received a signal from the lighting tool ECU 151 operates the optical mechanism 108 which has received laser light such that a rectangular first mark 162a is depicted on the road surface R2 positioned within a range from 60 m ahead from the host vehicle My to 40 m ahead from the vehicle, a rectangular second mark 162b is depicted on the road surface R2 positioned within a range from 40 m ahead from the host vehicle My to 20 m ahead from the vehicle, and a rectangular third mark 162c depicted on the road surface R2 positioned within a range from the tip portion (the position of the reference sign O) of the host vehicle My to 20 m ahead from the vehicle.

For example, it is desirable to vary in color for each mark corresponding to the degree of safety of the vehicle-to-vehicle distance such that the laser light source control unit 154 which has received a signal from the lighting tool ECU 151 generates green or blue laser light when the first mark 162a is depicted, generates yellow laser light when the second mark 162b is depicted, generates red laser light when the third mark 162c is depicted, and the like.

When the different vehicle Ot intrudes into the first mark 162a, the first mark 162a indicates that the vehicle-to-vehicle distance becomes shorter than the first braking distance, the second mark 162b indicates that the vehicle-to-vehicle distance becomes shorter than the second braking distance due to the intrusion of the different vehicle Ot, and when there is an intrusion of the different vehicle Ot, the third mark 162c indicates that the vehicle-to-vehicle distance becomes short to the level at which a rear-end collision cannot be avoided.

When the vehicle-to-vehicle distance is ensured such that the different vehicle Ot is ahead from the first mark 162a which can be visually recognized, the driver recognizes that even though the different vehicle Ot makes a sudden stop or the like, the vehicle can stop safely. In addition, when the driver visually recognizes that the different vehicle Ot intrudes into any one of the first to third marks (162a to 162c), the driver perceives that the vehicle-to-vehicle distance needs to be little longer through the recognition described below. When the vehicle-to-vehicle distance is shortened and the different vehicle Ot intrudes into the first mark 162a, the driver recognizes that the driver needs to pay attention to braking for avoiding a rear-end collision when the different vehicle Ot makes a sudden stop. When the different vehicle Ot intrudes into the second mark 162*b*, the driver recognizes that a sudden brake with full strength may be necessary in order to avoid a rear-end collision when the different vehicle Ot makes a sudden stop. When the different vehicle Ot intrudes into the third mark 162*c*, the driver recognizes that a rear-end collision cannot be avoided even through a sudden brake is applied. The first to third marks (162*a* to 162*c*) depicted on the road surface makes the driver recognize the vehicle-to-vehicle distance in which the vehicle can avoid a rear-end collision in a case where the different vehicle Ot makes a sudden stop, thereby reducing a rear-end collision accident.

A depiction range and a depiction position of the first to third marks (162*a* to 162*c*) change in accordance with the speed of the host vehicle and the circumstances of the traveling road surface R2 (when it is dry, raining, freezing, or the like). However, the depiction range and the depiction position may be automatically changed by the lighting tool ECU 151 which has obtained data related to the road surface conditions and may be manually switched by the driver by providing a mode switching button such as "dry road surface mode", "wet mode", and "frozen road surface mode" which operates in association with the lighting tool ECU 151.

As an example, the widths of the first to third marks (162*a* to 162*c*) are formed to have the same length as that of the host vehicle My. However, in order to limit the depiction on the road surface to the minimum range, it is desirable that the width of each mark is equal to or less than half the host vehicle My.

Figure 21B:
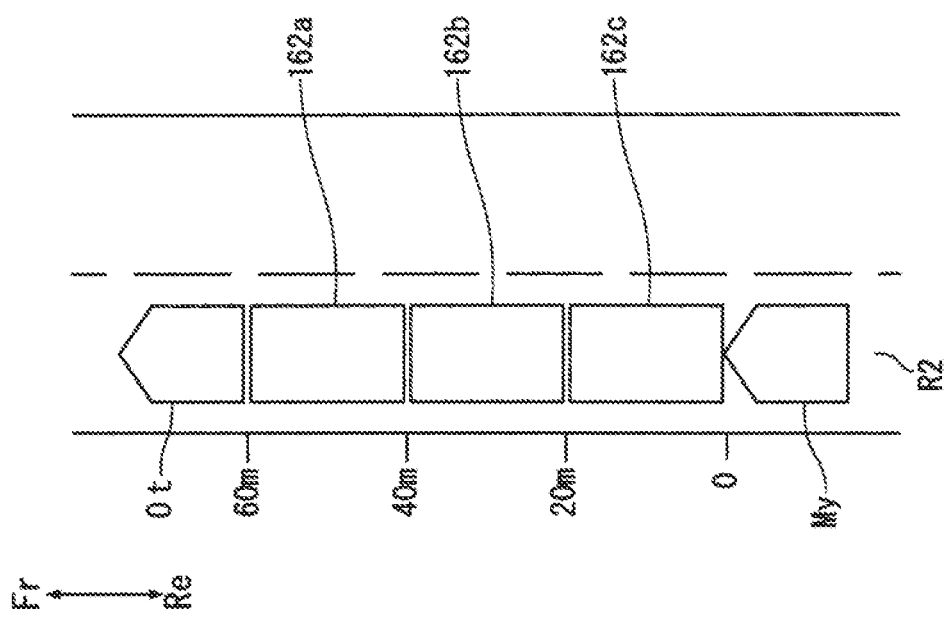
FIG. 21B is a view illustrating a modification example of marks in FIG. 21A.

In addition, as long as the first to third marks (162*a* to 162*c*) have the shapes making the driver recognize that the different vehicle Ot intrudes into the regions of the marks and the risk in the vehicle-to-vehicle distance has increased, multifarious figure, letters, and the like may be employed. For example, instead of the rectangular shapes, lines which are depicted in the positions of the first to third braking distances in the width direction may be adopted. The rectangular marks (162*a* to 162*c*) may have hollow frame body shapes or solid square shapes. In addition, As illustrated in FIG. 21B, within the first to third marks (162*a* to 162*c*) having rectangular frame body shapes, figures of O, A, and X respectively indicated by the reference signs (163*a* to 163*c*), or letters such as "attention", "danger", and "rear-end collision" may be displayed.

In addition, the present depiction system is provided with an alarm sound generation mechanism which generates various sounds when the different vehicle Ot intrudes into the first to third marks (162*a* to 162*c*). For example, when the different vehicle Ot intrudes into the first mark 162*a*, a sensed sound is issued, when the different vehicle Ot intrudes into the second mark 162*b*, an attention calling sound is issued, and when the different vehicle Ot intrudes into the third mark 162*c*, a warning sound is issued.

Subsequently, with reference to FIGS. 18 and 22A, description will be given regarding the eighth example related to the depiction system of the vehicle lamp (101 or 145) in the fifth or sixth example in which marks and the like informing a driver in a following vehicle in an adjacent lane of a lane change of the host vehicle are depicted on the road surface with laser light.

In a case where the host vehicle makes a lane change during traveling on a road having two or more lanes on each side, the driver in a different vehicle traveling side-by-side in the adjacent lane with the host vehicle cannot see the turn signal lamp of the host vehicle traveling alongside. Therefore, there are cases where the lane change cannot be recognized, thereby resulting in a rear-end collision accident or a minor collision. The present example aims to make the following driver in the adjacent lane easily recognize a lane change of the host vehicle by depicting drawings imparting information on the lane change on the road surface with laser light.

The lighting tool ECU 151 illustrated in FIG. 18 detects the operation of the turn signal lamp switch 164 to determine which turn signal lamp of the right and left is turned ON. In addition, the lighting tool ECU 151 forms a mark having a predetermined shape on the road surface with laser light in a predetermined color based on the signal detected by the steering operation detecting mechanism 165 regarding which direction of the right and left the steering wheel is turned. It is desirable that the color of the laser light when the figure is depicted within the light distribution pattern in white is red or the like instead of white.

Figure 22B:
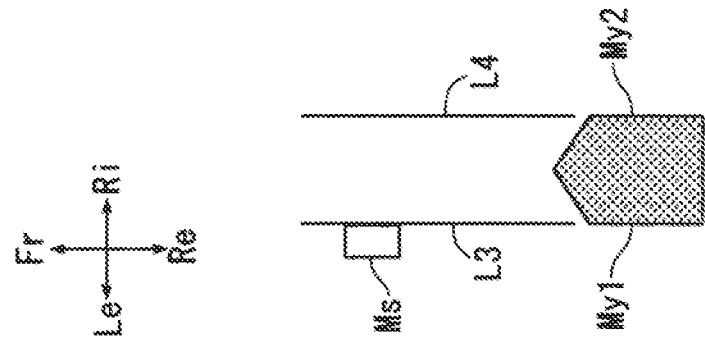
FIG. 22B is an explanatory view of a depiction system in a ninth example in which marks and the like imparting information on the vehicle width of the host vehicle are depicted on a road surface with laser light.
Figure 22A:
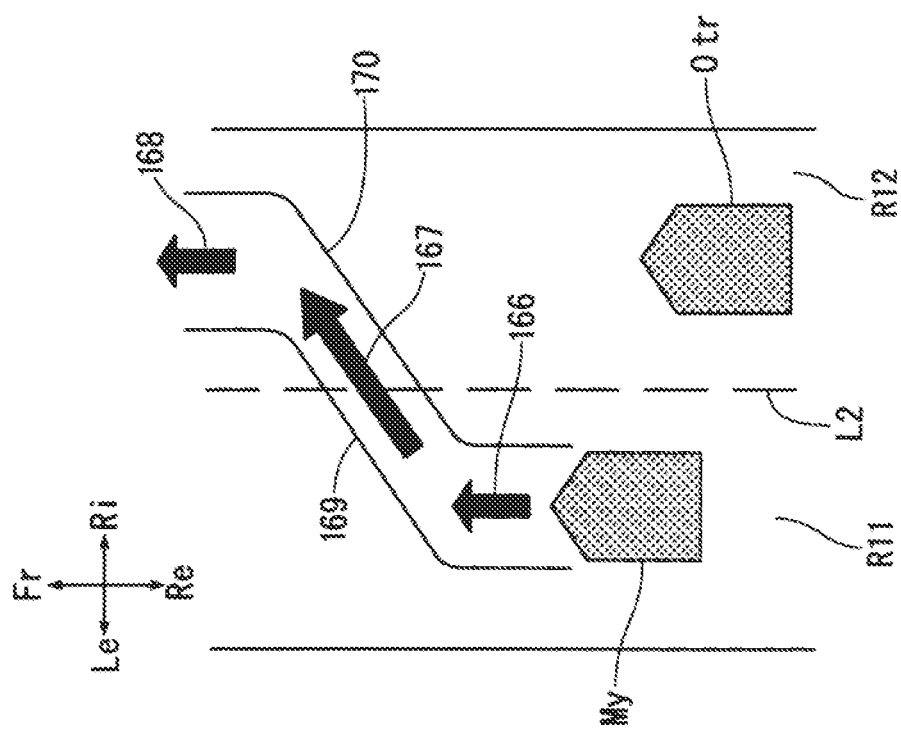
FIG. 22A is an explanatory view of a depiction system in an eighth example in which a figure informing a following vehicle in an adjacent lane of a lane change is depicted on a road surface with laser light.

For example, the reference sign My in FIG. 22A indicates the host vehicle traveling in a lane R11 on the left side on a two-lane road, and the reference sign Otr indicates the different vehicle Otr traveling side-by-side slightly behind in a lane R12 on the right side.

For example, when the driver in the host vehicle attempts to make a lane change to the lane R12 on the right side, the lighting tool ECU 151 illustrated in FIG. 18 senses that the turn signal lamp for the right direction is turned on or the steering wheel is turned in the right-turn direction, thereby driving the laser light source unit 107 and the optical mechanism 108. The laser light source unit 107 and the optical mechanism 108 continuously depict a first arrow mark 166 which is oriented forward and is depicted in front of the host vehicle My in the lane R11, a second arrow mark 167 which is oriented obliquely forward to the right and is depicted across the lanes (R11, R12) on the right and left, and a third arrow mark 168 which is oriented forward and is depicted in the lane R12 on the right side. In addition, a pair of lines (169, 170) extending along the orientation of each of the marks are depicted on the right and left sides of the first to third arrow marks (166 to 168).

It is possible for the driver in the different vehicle Otr traveling side-by-side in the adjacent lane R12 at a position where the turn signal lamp of the host vehicle My cannot be seen to visually recognize the first to third arrow marks (166 to 168) and the lines (169, 170) indicating the lane change in the right direction on the road surface in front of the different vehicle Otr, thereby recognizing the lane change of the host vehicle My, even though the turn signal lamp of the host vehicle My cannot be seen. Therefore, it is possible to avoid a rear-end collision accident or a minor collision.

In a case of making a lane change from the right lane to the left lane (not illustrated), the lighting tool ECU 151 forms marks which have bilateral symmetry with the first to third arrow marks (166 to 168) and the lines (169, 170) in a continuous state from a place in front of the host vehicle traveling in the right lane and across the lane mark L2 defining the lane. In addition, the first to third arrow marks (166 to 168) can employ marks, letters, and the like having multifarious colors and shapes as long as the figure of a lane change in the right or left direction is depicted in front of a different vehicle traveling side-by-side.

Subsequently, with reference to FIG. 22B, description will be given regarding the ninth example related to the depiction system of the vehicle lamp (101 or 145) in the fifth or sixth example in which marks and the like imparting information on the vehicle width of the host vehicle are depicted on the road surface in front of the host vehicle with laser light.

In a case where a driver traveling on a road at night cannot recognize the positional relationship between the vehicle width of the host vehicle and an obstacle in front of the vehicle, there is concern that a minor collision with the obstacle occurs. If a sign indicating the vehicle width can be provided in front of the traveling host vehicle, the driver can avoid a minor collision with the obstacle in advance by visually recognizing the sign. In the present example, as illustrated in FIG. 22B, the laser light source unit 107 and the optical mechanism 108 are operated, and the lines (L3, L4) are formed by the laser light in front of the vehicle along the left and right side end portions (My1, MY2) of the vehicle in front of the host vehicle My. The pair of lines (L3, L4) are depicted on the road surface in front of the vehicle or the obstacle at the vehicle width interval of the host vehicle My. Accordingly, as illustrated in FIG. 22B, the driver operates the steering wheel such that the depicted lines (L3, L4) do not come into contact with the obstacle Ms in front of the host vehicle My, and thus, it is possible avoid a minor collision with the obstacle Ms in advance.

It is desirable that the laser light when a figure is depicted within the light distribution pattern in white is red or the like, avoiding white. It is more desirable that the lines (L3, L4) in red are provided within the dark portion D1 illustrated in FIG. 19B. In addition, regarding the lines (L3, L4), as long as the driver can recognize the vehicle width, a rectangular figure may be depicted instead.

Subsequently, with reference to FIGS. 18, 9A, and 9B, description will be given regarding the tenth example related to the depiction system of the vehicle lamp (101 or 145) in the fifth or sixth example in which the attention calling marks and the like related to passing vehicles, a pedestrian, and the like near an intersection are depicted on the road surface with laser light.

As illustrated in FIG. 9A, when making a right turn at an intersection where a right-turn lane is present, due to a vehicle turning right in the opposite lane blocking the view, it is difficult to recognize the presence of the oncoming-straight vehicle Ots. A delay of recognition of the oncoming-straight vehicle Ots by the driver in the host vehicle My causes a right-straight accident, and a delay of recognition of the pedestrian Hu on a crosswalk causes an accident embroiling the pedestrian therein.

In addition, FIG. 9B is a view illustrating a state where the two-wheeled vehicle Bk intends to pass ahead from the left side of the host vehicle My making a left turn. The rider on the two-wheeled vehicle intending to pass ahead may not be aware of the light-on state of the left-turn signal lamp (not illustrated) of the host vehicle My, and the driver in the host vehicle My may make a left turn of the host vehicle My without being aware of the two-wheeled vehicle intending to pass ahead, and thus, there is a risk of causing an embroiled accident.

In the present example, in association with the in-vehicle camera of the host vehicle or the intersection camera, attention calling marks and the like related to the presence of the vehicle traveling straight ahead in the opposite lane, the pedestrian Hu, a bicycle (not illustrated), and the like crossing a crosswalk, and the two-wheeled vehicle Bk intending to pass ahead from behind on the left side of the host vehicle are depicted on the road surface R3 on the periphery of the host vehicle with laser light.

First, in the depiction system of the present example, the image processing apparatus 155 in FIG. 18 performs analysis processing of a video image or image data captured by the in-vehicle camera 160 of the host vehicle My or the road monitoring camera 161 which is the intersection camera. In addition, the lighting tool ECU 151 calculates the current place and the speed of the oncoming vehicle, and the position of the pedestrian Hu, a bicycle (not illustrated), or the like on the crosswalk based on the analysis data of the image processing apparatus 155. In addition, the lighting tool ECU 151 detects which side of the right and left the vehicle intends to turn by detecting the operation of the turn signal lamp switch 164 or the steering operation of the steering operation detecting mechanism 165. The lighting tool ECU 151 operates the laser light source unit 107 and the optical mechanism 108 respectively via the laser light source control unit 154 and the actuator control unit 136, and the lighting tool ECU 151 depicts marks having predetermined shapes with laser light in predetermined colors on the right and left on the road surface in the advancing direction in which the vehicle intends to turn.

For example, in a case where the lighting tool ECU 151 in FIG. 18 detects a right turn operation of the host vehicle My in association with the light-on state of the right-turn signal, and detects the circumstances in which the vehicle cannot safely turn since an approach of the oncoming-straight vehicle Ots illustrated in FIG. 9A is detected by the image processing apparatus 155 based on the video image or the image data near the intersection, or the pedestrian Hu, a bicycle (not illustrated), or the like crossing on the crosswalk, the lighting tool ECU 151 causes the laser light source unit 107 and the optical mechanism 108 to depict a mark St denoting "cannot advance further" on the road surface R3 that is a road surface in front of the host vehicle My or obliquely forward to the right where the vehicle intends to advance. As the mark denoting "cannot advance further", for example, there are "X", "hand mark (denoting "stop")", "STOP", "WAIT", and the like. It is desirable that the mark is depicted with laser light in red which is a color warning the danger.

In addition, in a case where the lighting tool ECU 151 detects the circumstances in which a right turn can be safely made at the intersection since the oncoming-straight vehicle Ots is not coming or has passed already, based on the data from the image processing apparatus 155, and detects none of the pedestrian Hu, a bicycle, or the like crossing on a crosswalk, the laser light source unit 107 and the optical mechanism 108 depicts a mark denoting "can advance further" on the road surface R3 in front of the host vehicle My or obliquely forward to the right where the vehicle intends to advance. As the mark denoting "can advance further", for example, there are marks such as "0", "arrow (denoting that "a right turn can be made")", "GO", and the like. It is desirable that the mark is depicted with laser light in green or blue which implies safety.

It is possible for the driver in the host vehicle My to safely make a right turn at the intersection by visually recognizing the mark implying "can advance further" on the road surface R3 ahead, and to avoid a right-straight accident with the oncoming-straight vehicle Ots or an embroiled accident with the pedestrian Hu by visually recognizing the mark implying "cannot advance further" ahead.

It is desirable that the marks implying "cannot advance further" and "can advance further" are depicted the opposite lane R13 obliquely forward to the right. In such a case, the driver in the oncoming-straight vehicle Ots can recognize the presence or absence of the vehicle My turning right by visually recognizing the mark depicted on the traveling lane, and the pedestrian Hu or the like on the crosswalk can also recognize the presence or absence of the vehicle My turning right by visually recognizing the mark depicted on the road surface near the crosswalk, and thus, an accident is less likely to occur. In addition, for example, the lighting tool ECU 151 analyzes which direction of behind or ahead the vehicle the pedestrian or the like on the crosswalk is crossing based on the video image or the image data. In the laser light source unit 107 and the optical mechanism 108, it is desirable to depict a mark making the driver recognize the crossing direction of the pedestrian or the like. For example, as the mark indicating the crossing direction of the pedestrian, for example, it is desirable to display a mark indicating the presence of a crossing pedestrian and a mark such as an arrow indicating the crossing direction together next to the red mark indicating "cannot advance further".

In addition, regarding the mark indicating "cannot advance further", for example, it is desirable to inform the driver of the risk which increases as the vehicle speed of the host vehicle My becomes higher, the degree of acceleration becomes greater, or the stepped amount of the accelerator becomes greater, by depicting the mark in a greater size. In addition, in the depiction system of the present example, in addition to displaying road surface depiction indicating "cannot advance further" or "can advance further", it is possible to consider applying audio guidance imparting information whether or not to advance. In addition, each of the marks may be depicted by maintaining laser light to be continuously in a light-on state or may be depicted by blinking the laser light.

In addition, for example, in a case where the lighting tool ECU 151 detects a left-turn operation of the host vehicle My in association with the light-on state of the left-turn signal, and detects the two-wheeled vehicle Bk approaching from behind the host vehicle My based on the video image or the image data from the image processing apparatus 155 near an intersection, the laser light source unit 107 and the optical mechanism 108 depict the mark Sst implying "cannot pass ahead" on the road surface obliquely rearward on the left side from the host vehicle My. As the mark Sst implying "cannot pass ahead", for example, there are "X", "hand mark (denoting "stop")", "STOP", "WAIT", and the like. It is desirable that the mark is depicted with laser light in red which is a color warning the danger. In addition, at the same time, it is desirable that "the left-turn mark ML" including an arrow and the like in the left direction implying the left turn of the host vehicle My is depicted on a place obliquely forward to the left from the host vehicle My with laser light in blue or green, and "an approach mark Stb" including displaying of letters such as "BIKE!" informing the driver in the host vehicle My of the two-wheeled vehicle Bk approaching from obliquely rearward on the left side is depicted with laser light in red or the like.

The rider of the two-wheeled vehicle Bk can recognize the risk of passing-ahead by visually recognizing the mark Sst of "cannot pass ahead", and can also recognize the risk of being embroiled in the left turn in advance by visually recognizing "the left-turn mark ML" of the host vehicle My ahead thereof. In addition, the driver in the host vehicle My can also recognize the risk of embroiling the two-wheeled vehicle at the time of the left turn in advance by visually recognizing "the approach mark Stb" of the two-wheeled vehicle ahead on the left side that is the advancing direction. As a result thereof, an embroiled accident between the vehicle turning left and the two-wheeled vehicle is prevented in advance.

Subsequently, with reference to FIGS. 18, and 23A to 23C, description will be given regarding the eleventh example related to the depiction system of the vehicle lamp (101 or 145) in the fifth or sixth example in which marks and the like causing the driver to refrain over-speeding of the host vehicle or calling the attention of the driver to increasing speed for solving traffic congestion are depicted on the road surface with laser light.

Over-speeding of a traveling vehicle leads to an increase of an accident caused due to lane deviation, or a rear-end collision accident with a different vehicle. In addition, in a case where the traveling vehicle speed is too slow, traffic congestion occurs on the road. In the depiction system of the present example, in consideration of such problems, deceleration or acceleration is promoted by making the driver visually recognize the marks depicted on the road surface or a structure and the like on the road with laser light.

Figure 23A:
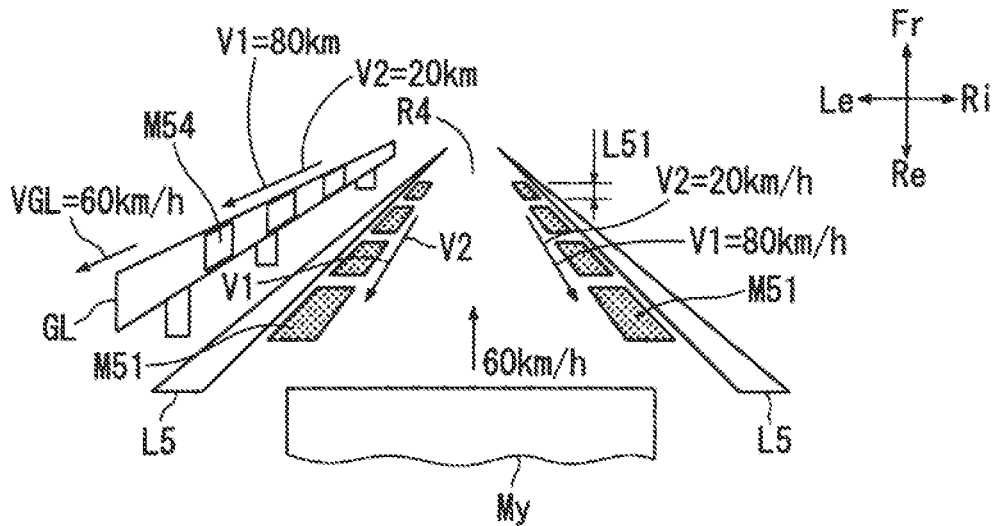
FIG. 23A is an explanatory view of a depiction system in an eleventh example in which marks and the like calling the attention of the driver to deceleration or acceleration of the host vehicle are depicted on a road surface with laser light.
Figure 23B:
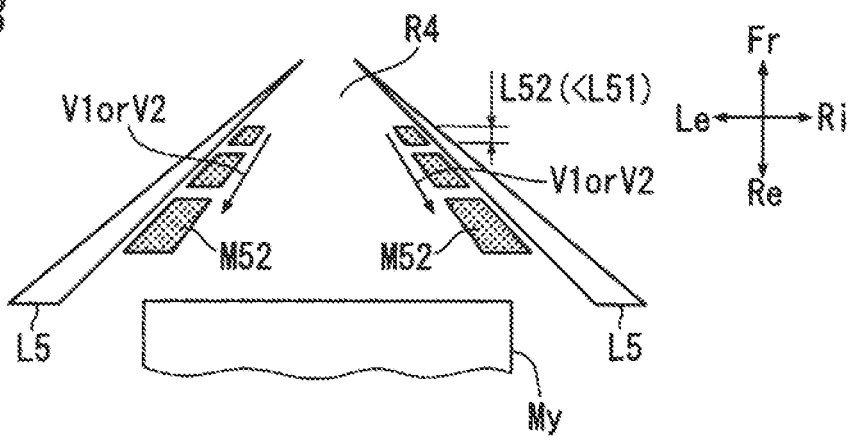
FIG. 23B is an explanatory view of a modification example of the eleventh example in which the marks and the like calling the attention of the driver to additional deceleration of the host vehicle are depicted on a road surface with laser light.
Figure 23C:
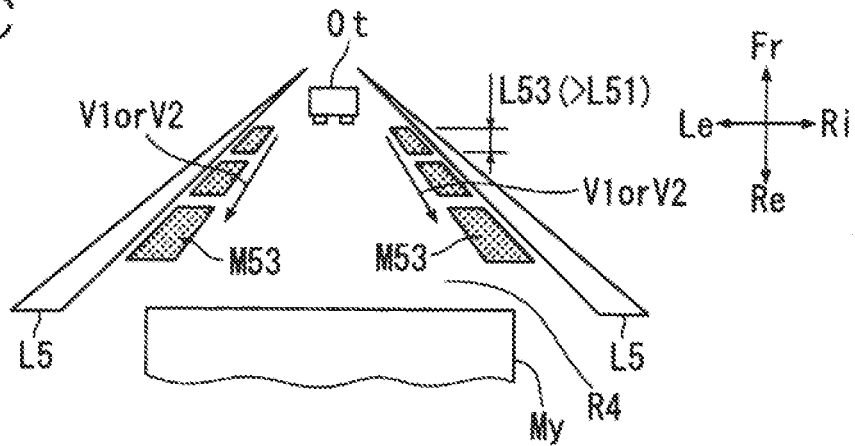
FIG. 23C is an explanatory view of the modification example of the eleventh example in which the marks and the like calling the attention of the driver to additional acceleration of the host vehicle are depicted on a road surface with laser light.

First, in FIGS. 23A to 23C, the reference sign R4 indicates the road surface, the reference sign L5 indicates a pair of lane marks on the road surface R4, the reference sign GL indicates a guardrail on the road on the left side, and the reference signs (M51 to M54) indicate marks depicted with laser light, respectively. The marks (M51 to M53) are multiple rectangular marks intermittently depicted on the road surface in the forward-rearward direction, and the marks M54 are multiple rectangular marks intermittently depicted with respect to the guardrail in the forward-rearward direction.

The lighting tool ECU 151 in FIG. 18 operates the laser light source unit 107 and the optical mechanism 108 respectively via the laser light source control unit 154 and the actuator control unit 136. As illustrated in FIGS. 23A to 23C, The lighting tool ECU 151 depicts the multiple rectangular marks (M51 to M53) intermittently depicted in the forward-rearward direction in the position in contact with the pair of lane marks L5 on the road surface R4, and depicts the marks M54 on the guardrail GL. As a result thereof, the driver in the host vehicle My precisely recognizes the installation positions and the installation directions of the pair of lane marks L5 and the guardrail GL by visually recognizing the marks (M51 to M54), and can drive the host vehicle My so as not to deviate from the lane. In addition, the lighting tool ECU 151 in FIG. 18 calculates a current speed of the host vehicle based on the position data of the traveling host vehicle obtained through the navigation system 157 having the map data and the GPS, and the speed data of the speedometer. In addition, the lighting tool ECU 151 calculates the position where the marks (M51 to M53) in FIGS. 23A to 23C are depicted, based on the data of a structure such as the guardrail GL near the road obtained by processing the video image or the like from the in-vehicle camera 160 through the image processing apparatus 155. Moreover, the lighting tool ECU 151 analyzes an amount of rainfall on the traveling road obtained through the raindrop sensor, the circumstances of frozenness on the road obtained through the road information communication system, and the road sign captured by the in-vehicle camera 160, thereby obtaining the result thereof. The lighting tool ECU 151 calculates a speed at which the host vehicle My is required to travel on the traveling road, based on the speed limit on the traveling road obtained through the navigation system 157, the road information communication system 159, and the like, or the speed information at which traffic congestion is solved.

In a case where the actual traveling speed is different from the required traveling speed on the traveling road, the lighting tool ECU 151 causes the laser light source unit 107 and the optical mechanism 108 to respectively operate such that the marks (M51 to M54) are moved rearward at a speed different from a relative speed of an object on the road with respect to the host vehicle My, and thus, it is possible to urge the driver to perform acceleration or deceleration of the vehicle while traveling.

Specifically, in a case where the driver needs to be urged so as to decelerate the vehicle, the lighting tool ECU 151 causes the marks (M51 to M54) depicted on the road surface R4 and the guardrail GL to move in the advancing direction and the reverse direction of the host vehicle at a speed faster than the speed of the traveling host vehicle My. In a case where the driver needs to be urged so as to accelerate the vehicle, the lighting tool ECU 151 causes the marks (M51 to M54) depicted on the road surface R4 and the guardrail GL to move in the advancing direction and the reverse direction of the vehicle at a speed slower than the speed of the traveling host vehicle My.

The below-described examples are "Example 1" in a case where the driver traveling 60 km per hour is urged to decelerate to the speed of 40 km per hour, and "Example 2" in a case where the driver traveling 40 km per hour is urged to accelerate to the speed of 60 km per hour.

First, "Example 1" will be described. The guardrail GL fixed onto the road as illustrated in FIG. 23A seems to the driver in the vehicle My traveling 60 km per hour to be moving rearward at a relative speed VGL=60 km per hour. For example, in a case where it is desirable to travel at the speed of 40 km per hour since the condition of the traveling road surface is slippery due to a rainfall, or the legal speed of the traveling road is 40 km per hour, the lighting tool ECU 151 generates a signal to operate the laser light source unit 107 and the optical mechanism 108 and to depict the marks (M51 to M54) on the road surface and the guardrail such that the marks (M51 to M54) move rearward from the vehicle, that is, in the advancing direction and the reverse direction of the vehicle at the speed V1=80 km per hour with respect to the road surface. In such a case, the driver in the host vehicle My who has visually recognized the marks (M51 to M54) feels that the host vehicle My seems to be traveling faster than the actual speed by the speed of 20 km per hour, and thus, the driver is likely to feel to suppress further acceleration of the host vehicle or to decelerate the vehicle. In this manner, the marks (M51 to M54) generate an action making the driver feel to suppress the traveling vehicle speed, and generate an effect of preventing a traffic accident in advance.

Subsequently, "Example 2" will be described. The guardrail GL in FIG. 23A seems to the driver in the vehicle My traveling 40 km per hour to be moving rearward at a relative speed VGL=40 km per hour. For example, in a case where traffic congestion is generated due to insufficient speed of each vehicle on the road, and it is desirable to travel at the speed of 60 km per hour in order to solve the traffic congestion, the lighting tool ECU 151 operates the laser light source unit 107 and the optical mechanism 108 so as to depict the marks (M51 to M54) on the road surface R4 and the guardrail GL such that the marks (M51 to M54) move rearward from the vehicle at the speed of V2=20 km per hour with respect to the road surface. In such a case, the driver in the host vehicle My who has visually recognized the marks (M51 to M54) feels that the host vehicle My seems to be traveling slower than the actual speed by the speed of 20 km per hour, and thus, the driver is likely to feel to accelerate the host vehicle. In this case, the marks (M51 to M54) generate an action making the driver feel accelerate the traveling vehicle, and generate an effect of solving the traffic congestion.

In addition, the multiple marks (M51 to M53) depicted on the road surface R4 illustrated in FIG. 23A are depicted so as to have a significant length in the forward-rearward direction as the position becomes closer to the host vehicle My, and are depicted so as to have a gradually small length in the forward-rearward direction as the position becomes far from the host vehicle My. Here, in FIGS. 23A to 23C, in a case where the longitudinal lengths of the marks (M51 to M53) depicted in front of the host vehicle My by the equal distance are respectively referred to as (L51 to L53), the marks (M51 to M53) are depicted so as to be L52<L51 and L53>L51.

The visual field of the driver while traveling becomes narrow as the speed of the host vehicle My increases, and the visually recognizable length of an object with respect to the advancing direction seems to be short as the speed increases. Accordingly, in a case where the lighting tool ECU 151 in FIG. 18 operates the laser light source unit 107 and the optical mechanism 108, and the mark M51 formed at a position away from the host vehicle My by a predetermined distance is changed to the mark M52 having a short length in the forward-rearward direction as illustrated in FIGS. 23A and 23B, the driver feels that the driver is traveling faster than the actual speed, and thus, the driver is likely to feel to suppress further acceleration of the host vehicle or to decelerate the vehicle. Meanwhile, as illustrated in FIGS. 23A and 23C, in a case where the mark M51 formed at a position away from the host vehicle My by a predetermined distance is changed to the mark M53 having a long length in the forward-rearward direction, the driver feels that the driver is traveling slower than the actual speed, and thus, the driver is likely to feel to accelerate the host vehicle.

In this manner, as the marks (M51 to M54) are depicted on the road surface so as to move in the advancing direction and the reverse direction of the vehicle at a speed faster than the speed of the traveling vehicle, and as the longitudinal lengths of the depicted marks (M51 to M53) are adjusted to be shorter while traveling, an action of making the driver suppress further acceleration of the vehicle and urging the driver to decelerate the vehicle is generated. Meanwhile, as the marks (M51 to M54) are depicted on the road surface so as to move in the advancing direction and the reverse direction of the vehicle at a speed slower than the traveling vehicle, and as the longitudinal lengths of the depicted marks (M51 to M53) are adjusted to be longer while traveling, the driver is urged to accelerate the speed, and thus, an action of making the driver control the vehicle speed is generated.

The marks (M51 to M53) are formed so as to be longitudinally long when being closer to the host vehicle My, and formed to be longitudinally short when being away from the host vehicle My, in a case where the longitudinal length of the mark depicted so as to be close to the different vehicle Ot is changed to be longer, the driver feels that the vehicle-to-vehicle distance with respect to the different vehicle Ot traveling ahead becomes short. Accordingly, in consideration of a rainfall and the like sensed by the raindrop sensor 156, in a case where it is required for the driver to ensure the longer vehicle-to-vehicle distance with respect to the different vehicle Ot traveling ahead, it is desirable to urge the driver so as to ensure the vehicle-to-vehicle distance to be longer by changing the longitudinal lengths of the marks (M51 to M53) to be longer while traveling and making the driver feel that the vehicle-to-vehicle distance with respect to the different vehicle Ot traveling ahead becomes shorter than the actual vehicle-to-vehicle distance.

In a case where the marks (M51 to M54) are depicted within the light distribution pattern in white, it is desirable that the color of the laser light is red or the like, avoiding white, and it is more desirable that the marks (M51 to M54) formed within the white light distribution pattern are provided within the dark portion D1 as illustrated in FIG. 19B.

In addition, the shapes of the marks (M51 to M54) are not limited to the rectangular shapes.

Here, supplementary description will be given regarding means for depicting the lines (L1, L5) or the dark portion D1 in which the lines L1 are depicted, along the lane marks M1 as illustrated in FIGS. 19A, 19B, and 23A to 23C.

It is dangerous for the host vehicle to cross the adjacent lane on a road such as a curve for leading to a collision accident with a vehicle traveling a different lane. However, a driver traveling an unfamiliar road is likely to cause a line-crossing accident, since the driver does not know the direction and the degree of curve of the road in the advancing direction in advance. As illustrated in FIGS. 19A, 19B, and 23A to 23C, in a case where the lines (M1, L5) depicted with laser light are depicted along not only the straight line but also the lane marks M1 formed in the curve, the driver can visually recognize and grasp the presence or absence of a curve in the advancing direction, the curved state, and the like sooner. Therefore, the driver is unlikely to cross a different lane in the curve or the like even through the driver travels an unfamiliar road.

The lighting tool ECU 151 illustrated in FIG. 18 detects the lane marks (M1, L5) in FIGS. 18 and 23 from the analysis result from the image processing apparatus 155 obtained based on the data captured by the in-vehicle camera 160 or the road monitoring camera 161 which is the intersection camera, operates the laser light source unit 107 and the optical mechanism 108 based on the detection result, and depicts the lines (L1, M51 to M53) on the lane marks (M1, L5) or in the position adjacent thereto. It is desirable that the color of the line to be depicted is formed to be red, yellow, blue, or the like other than white in a case of considering that the lines (L1, M51 to M53) is depicted within the light distribution pattern.

In addition, for example, in a case where the traveling vehicle approaches the lane marks (M1, L5) even though the turn signal lamp switch 164 is not operated, or wandering of the steering wheel (not illustrated) is detected by the steering operation detecting mechanism 165 due to driving while drowsy or the like, it is desirable that the lighting tool ECU 151 operates the laser light source unit 107 and an operation of blinking the lines (L1, M51 to M53) in red or yellow is performed, thereby informing the driver of the risk of deviating from the lane.

In addition, it is desirable that the lighting tool ECU 151 illustrated in FIG. 18 calls the attention of the driver in advance to the risk while turning the curve which is present in the advancing direction by changing the color of the lines (L1, M51 to M53) illustrated in FIGS. 19 and 23 based on the speed of the host vehicle calculated through the speedometer 158, the navigation system 157, or the like, and the curved state of the curve based on the lane marks (M1, L5) detected by the in-vehicle camera 160 or the like. For example, in a case where the intruding speed with respect to the curve is appropriate and the vehicle can easily turn, it is desirable that the lines (L1, M51 to M53) are depicted with laser light in blue. In a case where it is favorable to slightly decelerate the intruding speed, it is desirable that the lines (L1, M51 to M53) are depicted in yellow. In a case where it is favorable to drastically drop the intruding speed, it is desirable that the lines (L1, M51 to M53) are depicted in red. In a case where the vehicle surely crosses a different lane unless the brake is applied with full strength, it is desirable that the lines (L1, M51 to M53) in red is caused to blink at fast intervals.

In a case where the driver suddenly and fully steps on the accelerator, it is desirable that the lighting tool ECU 151 receives the detection result from the accelerator position detecting mechanism 171, and the lines (L1, M51 to M53) are changed to red or are caused to blink, thereby calling the attention of the driver to the sudden acceleration, for example.

Subsequently, with reference to FIGS. 18, 24A, and 24B, description will be given regarding the twelfth example related to the depiction system of the vehicle lamp (101 or 145) in the fifth or sixth example in which the presence or absence and the shape of a structure or an obstacle on the road surface, the width of the road, and the like are easily recognized by depicting the latticed grid line figure on the periphery of the vehicle with laser light. The reference sign R5 in FIGS. 24A and 24B indicates the road surface. The reference sign PG indicates the grid line figure depicted on the road surface so as to a latticed shape. The reference signs PH and PL respectively indicate the high beam light distribution pattern and the low beam light distribution pattern in front of the vehicle formed by the LED lighting tool units (105, 106) with white light. The reference sign C1 indicates the side groove on the road. The reference sign C2 indicates the sinkhole on the road surface. The reference sign C3 indicates the fallen object fallen on the road from a vehicle such as a truck. The reference sign C4 indicates the front wall of a tunnel TN.

Figure 24A:
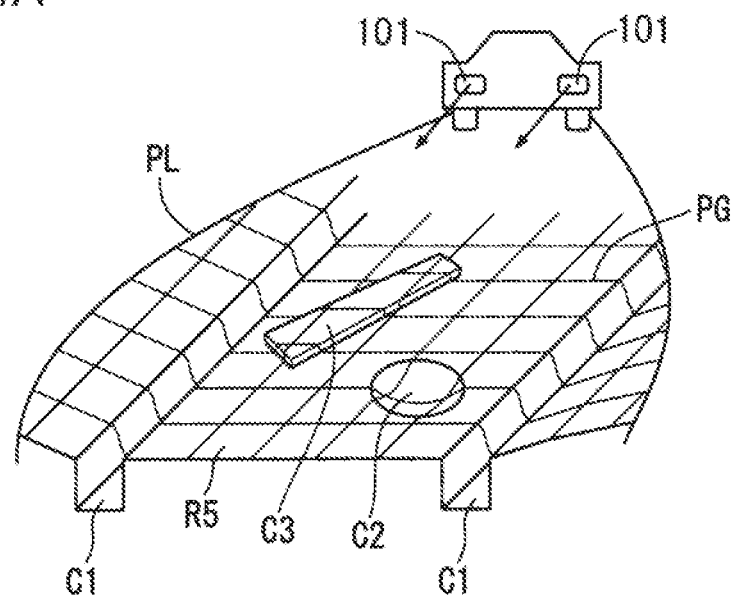
FIG. 24A is an explanatory view of a depiction system in a twelfth example in which a latticed grid line figure is depicted on a road surface or the like with laser light together with a low beam light distribution pattern.
Figure 24B:
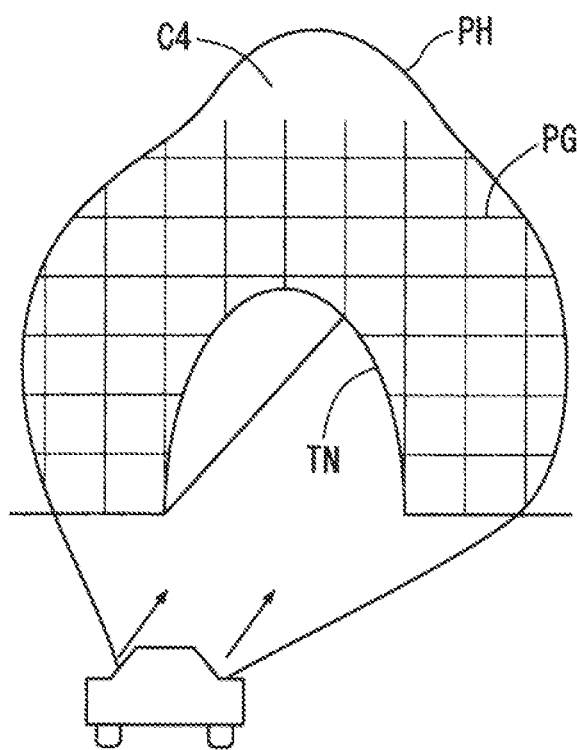
FIG. 24B is another explanatory view of the depiction system in the twelfth example in which a latticed grid line figure is depicted on a road surface or the like with laser light together with a low beam light distribution pattern.

The lighting tool ECU 151 in FIG. 18 operates the laser light source unit 107 and the optical mechanism 108, thereby depicting the latticed grid line figure PG on the road surface R5 in front of the vehicle with laser light illustrated in FIGS. 24A and 24B or on the front wall C4 of the tunnel. The grid line figure PG is radiated to the side groove C1 or the like which is a recess on the road surface, and the fallen object C3 or the like which is a projection, and is curved or cut into pieces. Therefore, the shape of the side groove C1 or the like is accentuated, thereby allowing the driver to easily grasp the shapes and the positions thereof. The grid line figure PG may be depicted not only within the light distribution patterns (PH, PL) but also outside thereof. However, in a case of being depicted within the light distribution patterns (PH, PL), it is desirable that the grid line figure PG is a line other than white and is depicted within the dark portion.

A person experiences extremely strong dazzling feeling when directly staring at laser light. In addition, there is a need to consider the regulation defining that the light distribution pattern of the headlamp has to be formed by using only white light. Therefore, it is desirable that the light-emitting portion 132a (the light emission end toward the front) of the optical mechanism 108 illustrated in FIG. 16B cannot be directly stared from a place in front of the vehicle as much as possible in consideration of reflection of laser light other than white light. From such a viewpoint, as illustrated in FIG. 15, the extension reflector 134 disposed in front of the optical mechanism 108 is disposed inside the lighting chamber S so as to cover the opening portion 134a from above the light-emitting portion 132a to at least the horizontal position. In addition, as illustrated in FIGS. 15 and 17, the reflection portion 132 is oriented obliquely downward such that laser light B2 is reflected obliquely downward.

In this case, generally, the vehicle lamp is likely to be disposed at a position lower than the eye level of a person (for example, equal to or lower than 1 m), and the luminous flux of the laser light B2 oriented upward from a position in the horizontal direction is cut by the upper end edge portion 134b of the extension reflector 134. Therefore, a pedestrian and the driver in the oncoming vehicle cannot directly stare at the light-emitting portion 132a. As a result thereof, a pedestrian or a driver in an oncoming vehicle in front of the vehicle does not experience dazzling feeling caused by the laser light, and does not recognize that the light-emitting portion 132a reflecting the laser light in color other than white forms the light source of the headlamp.

In addition, in the vehicle lamp 101 in the fifth example, in a front cover 103, it is desirable that the reflection portion 132 is oriented toward a region where the luminous flux of the light B1 emitted from the LED light source units (105, 106) passes through. In such a case, even though the laser light B2 is subjected to diffused reflection due to the unevenness such as dirt and a scratch present on the front cover 103, diffused reflection is countervailed by white light having strong luminance for forming a light distribution pattern, the diffused reflection of the laser light B2 in color other than white is not visually recognized by a pedestrian or the like ahead.

The light sources of the LED light source units (105, 106) of the vehicle lamp 101 in the fifth example illustrated in FIG. 14 may be configured with multiple LED light emitters, without configuring with a single LED light emitter 111 as illustrated in FIG. 15. In addition, in the vehicle lamp (101 or 145), a daytime running lamp (DRL) which is configured by disposing multiple LED light sources in a plane manner or on a line (not illustrated) similar to that in the third example illustrated in FIG. 12 may be disposed.

In addition, the vehicle lamp having the DRL may have a configuration similar to that in the third example illustrated in FIG. 12. According to such a configuration, the luminescent color of the light-emitting portion which emits light by reflecting laser light other than white light is countervailed by multiple LED light emitters having high luminance, thereby not being visually recognized by a pedestrian or the driver in the oncoming vehicle ahead.

Similar to the fourth example illustrated in FIG. 14, the AO device may be used instead of the MEMS mirror used in the vehicle lamp (101 or 145) in the fifth or sixth example.

Figure 25:
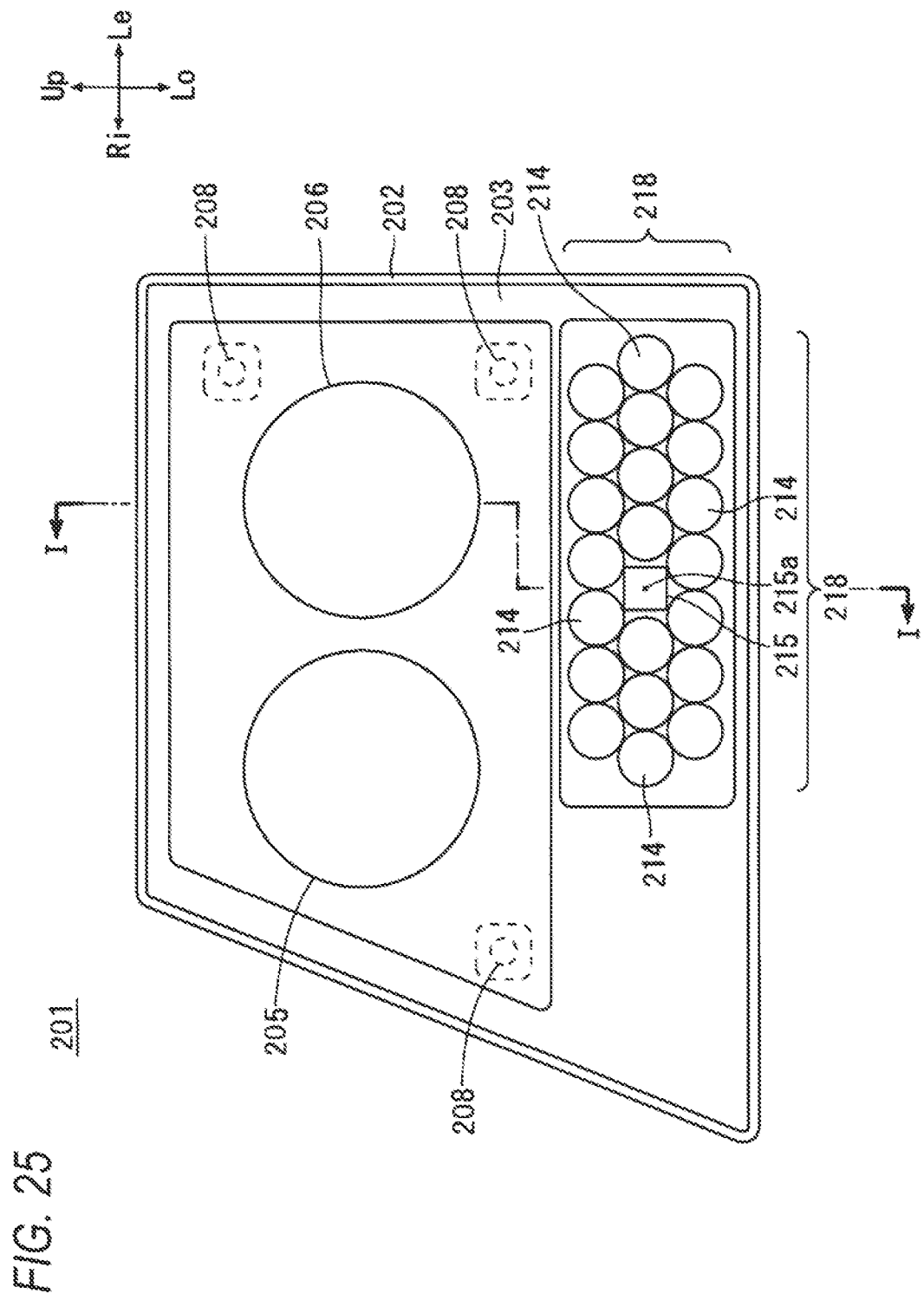
FIG. 25 is a front view of a vehicle lamp in a thirteenth example.
Figure 26:
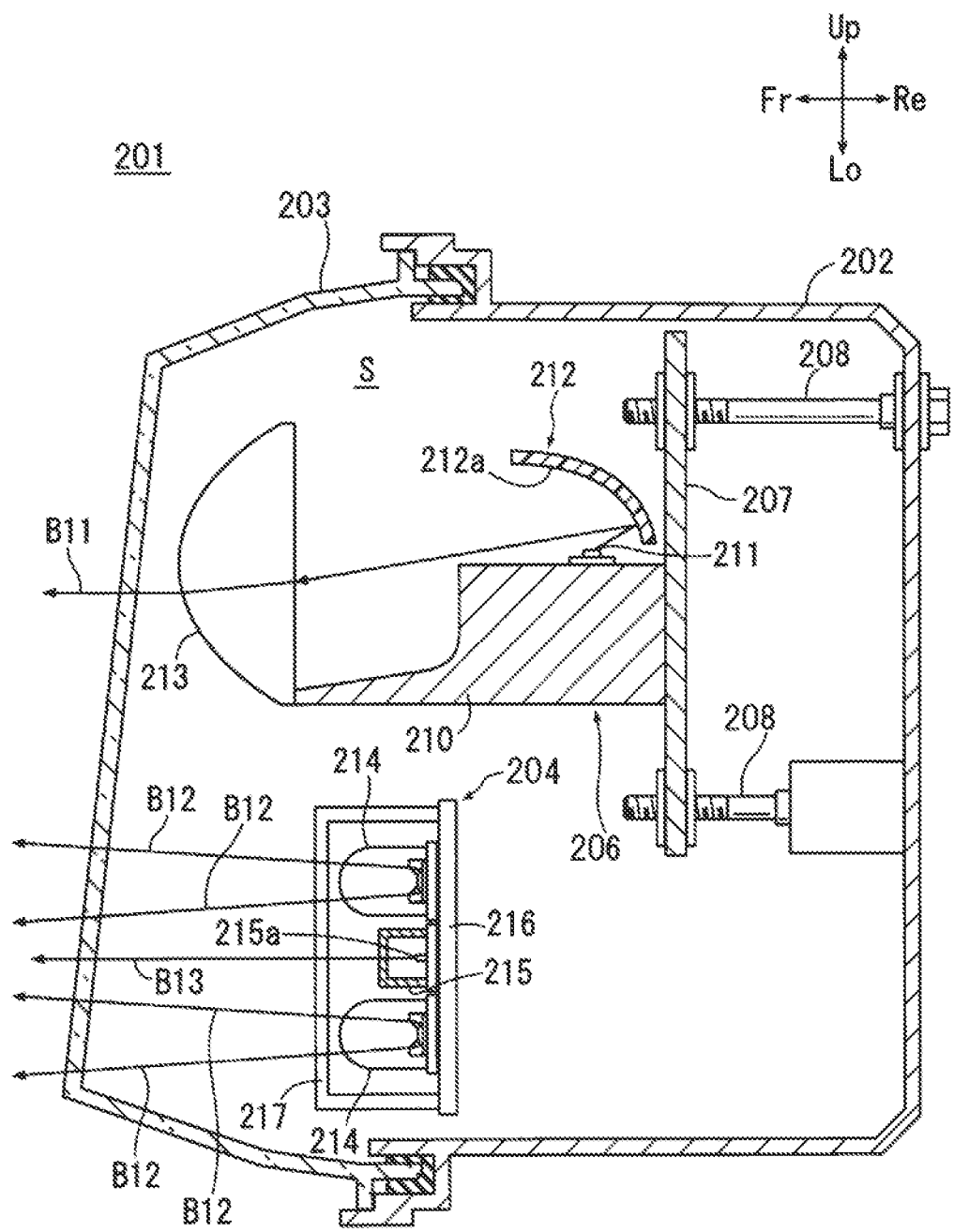
FIG. 26 is a sectional view taken along line I-I in FIG. 25.
Figure 27:
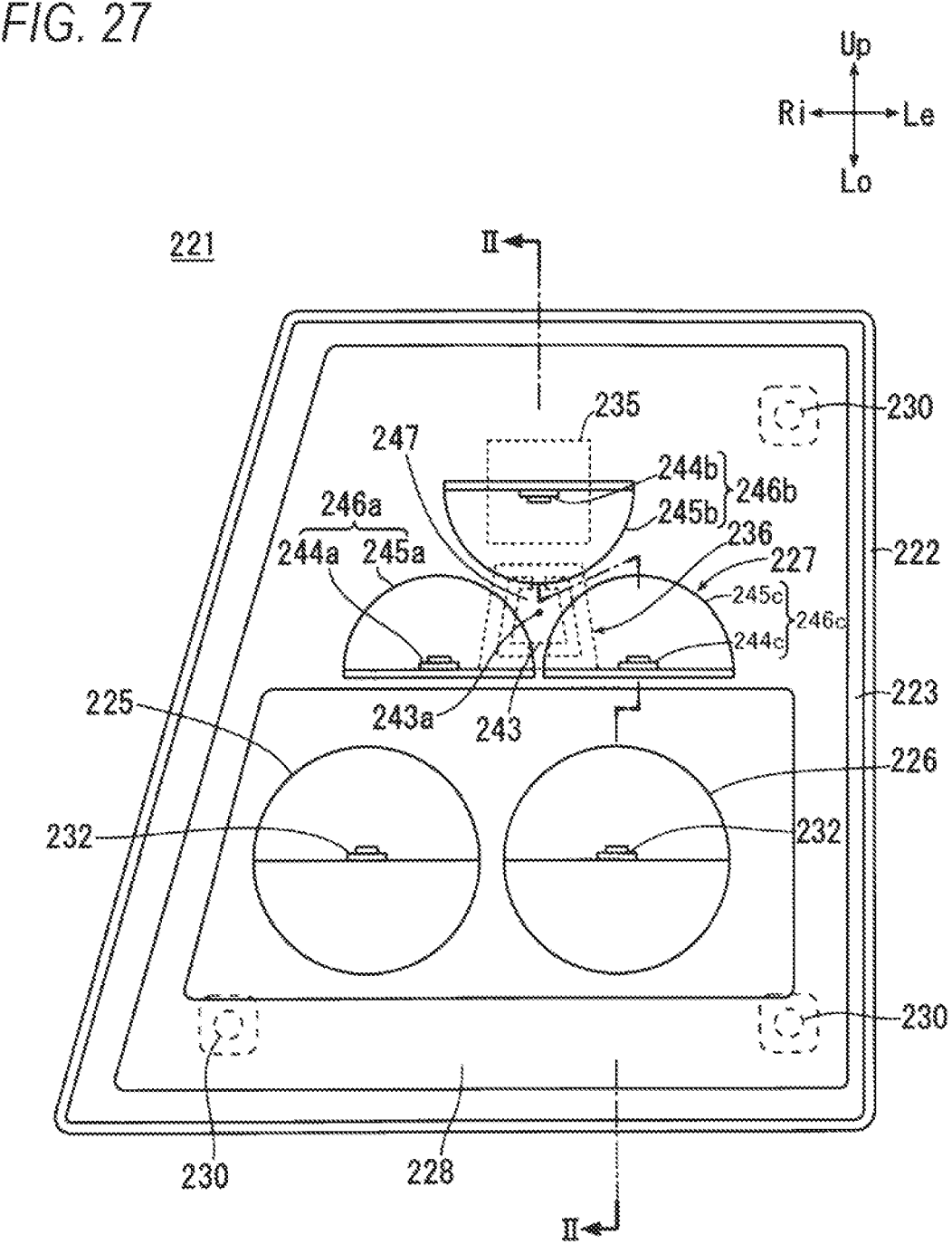
FIG. 27 is a front view of a vehicle lamp in a fourteenth example.
Figure 28:
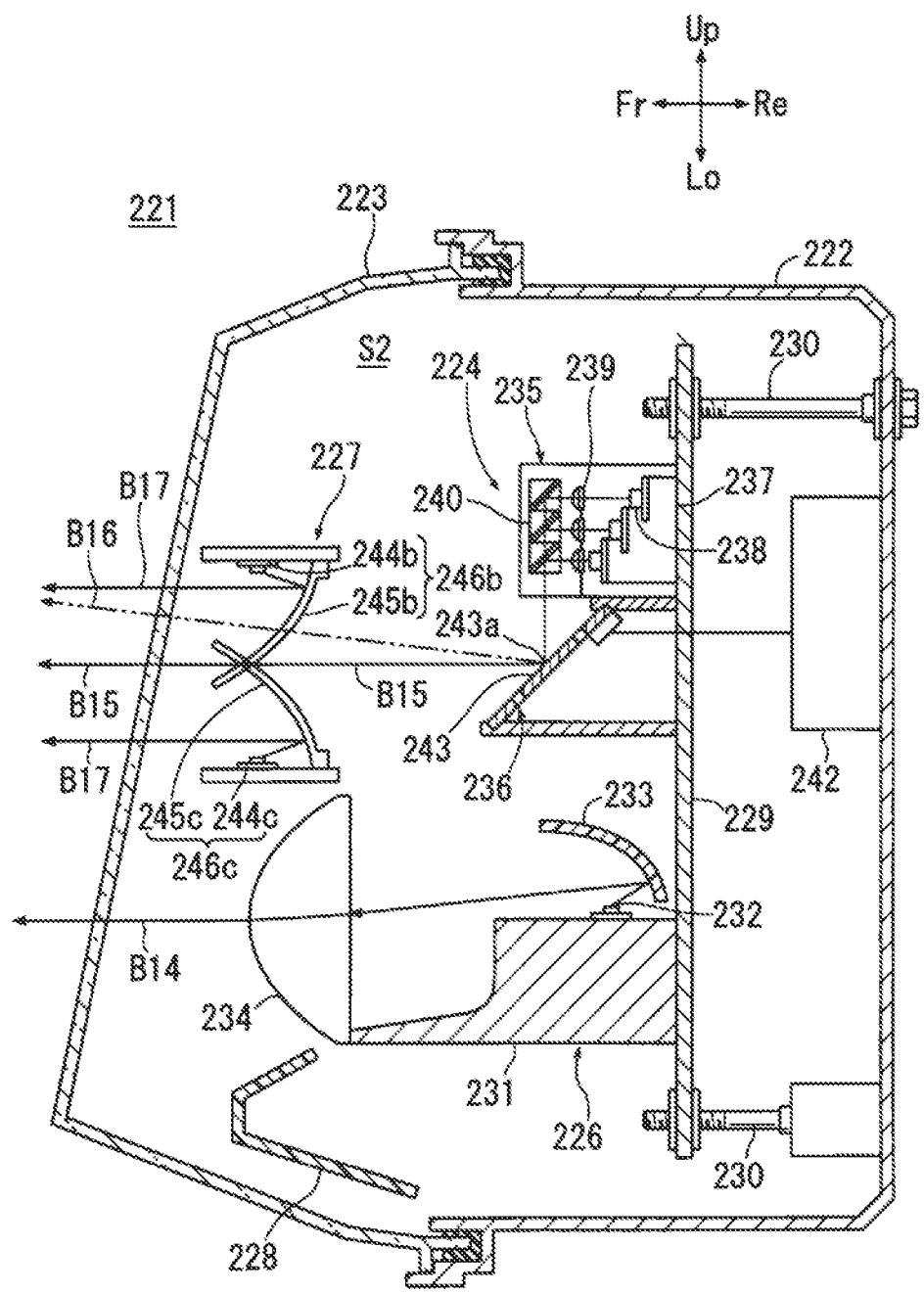
FIG. 28 is a sectional view taken along line II-II in FIG. 27.
Figure 29:
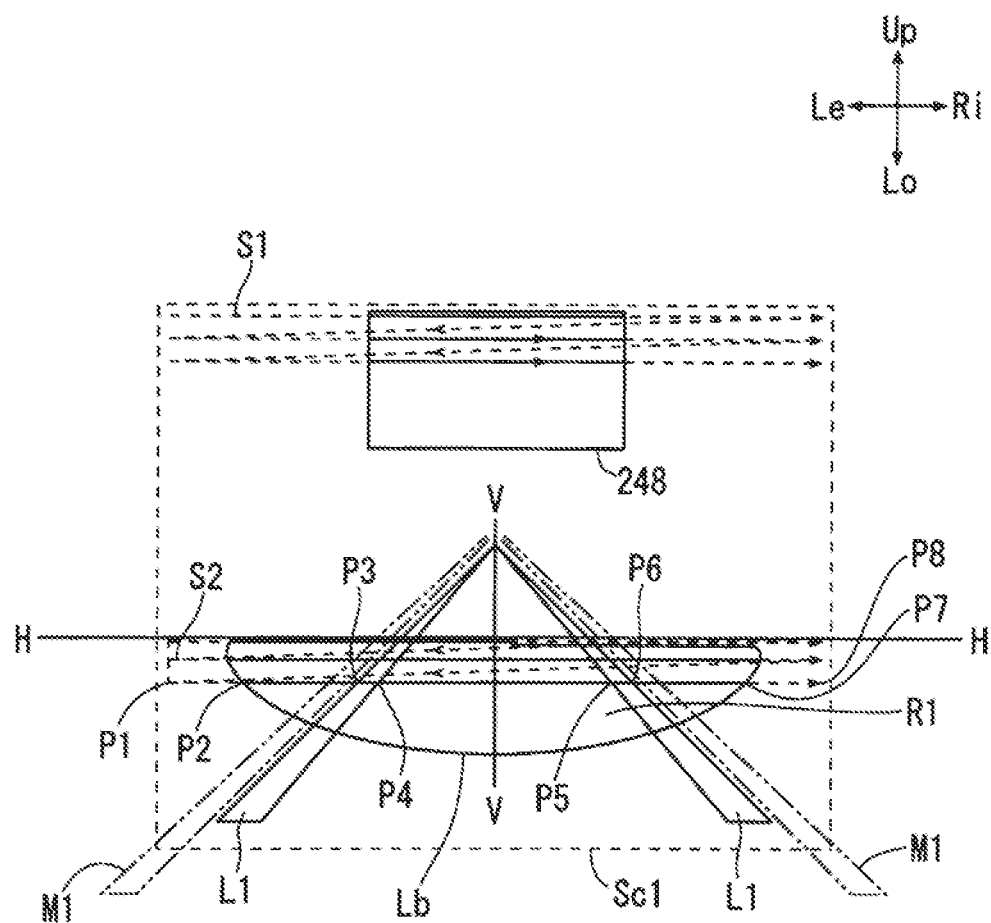
FIG. 29 is an explanatory view related to depiction and the like performed with laser light.

Hereinafter, another example of the present invention will be described based on FIGS. 25 to 29. FIGS. 25 and 26 illustrate a thirteenth example of a vehicle lamp in which the emission end of the laser light source unit is disposed within the light emission area formed to have multiple LED devices, and FIGS. 27 and 28 illustrate a fourteenth example of a vehicle lamp in which the emission end of the laser light source unit is disposed among the reflectors of multiple LED light source units. FIG. 29 illustrates a depiction form performed by the vehicle lamp in the thirteenth or fourteenth example with laser light.

With reference to FIGS. 25 and 26, a vehicle lamp 201 in the thirteenth example will be described. The vehicle lamp 201 is an example of the headlamp on the right side, and has a lamp body 202 and a transparent or semitransparent front cover 203. The lighting chamber S formed inside the lamp body 202 and the front cover 203 is provided with a daytime running lamp (DRL) unit 204 and a pair of head lamp units (205, 206) having white LEDs as the light sources. The DRL unit 204 is fixed to the lamp body 202. The head lamp units (205, 206) are fixed to a plate-like support member 207 and are attached to the lamp body 202 via the support member 207 and multiple aiming screws 208 in a vertically and laterally tiltable manner. In the present example, the DRL unit 204 may be tilted together with the head lamp units (205, 206) by fixing the DRL unit 204 to the support member 207.

The head lamp unit 205 forming the high beam light distribution pattern and the head lamp unit 206 forming the low beam light distribution pattern have a metal bracket 210 which is fixed to the support member 207, LED light emitters 211 each of which is attached to the bracket 210, reflectors 212, and transparent or semitransparent projection lenses 213. The luminous flux B11 of light distribution pattern forming light emitted from the LED light emitters 211 is reflected forward by a reflection surface 212a of the reflectors 212 and passes through the projection lenses 213 and the front cover 203, thereby being emitted forward from the vehicle.

The DRL unit 204 has multiple LED light emitters 214, a laser light source 215 configured to have laser diode in red or the like other than white, a support member 216, and a transparent or semitransparent front cover 217. The multiple LED light emitters 214 and the laser light source 215 are attached to the support member 216 and are contained inside the front cover 217. The multiple LED light emitters 214 in the thirteenth example are disposed in multiple rows so as to be laterally adjacent to each other. Each of the rows of the LED light emitters 214 is disposed in a vertically zig-zag manner, thereby forming a light emission area 218.

In the thirteenth example, one row of the LED light emitters 214 positioned in the center among three rows which are vertically arranged is omitted, and the laser light source 215 is disposed instead. The laser light source 215 is attached to the support member 216 in a state of being surrounded by the multiple LED light emitters 214. Each of rays (B12, B13) of emission light from the multiple LED light emitters 214 and the laser light source 215 passes through the front cover 217 and the front cover 203 and is emitted forward from the vehicle.

The luminescent color such as red of an emission end 215a of the laser light source 215 emitting light by emitting laser light B13 in red or the like other than white is countervailed by emission light B12 from the multiple LED light emitters 214 having high luminance, thereby being not visually recognized by a pedestrian or the driver in the oncoming vehicle ahead. It is desirable that the laser light source 215 is formed to be smaller than the LED light emitters 214 so as to be less likely to be viewed from a place in front of the vehicle.

The laser light source 215 is oscillated vertically and laterally with respect to the support member 216 by an oscillation mechanism (not illustrated) at a high speed and performs scanning of a predetermined position in front of the vehicle with the laser light B13, thereby functioning as an overhead sign lamp (OHSL) irradiating a sign obliquely above and depicts the attention calling mark in front of the vehicle.

Subsequently, with reference to FIGS. 27 and 28, the fourteenth example of the vehicle lamp will be described. A vehicle lamp 221 in the fourteenth example is an example of the headlamp on the right side similar to that in the thirteenth example, and has a lamp body 222 and a transparent or semitransparent front cover 223. A lighting chamber S2 formed inside the lamp body 222 and the front cover 223 is provided with a laser light source unit 224, a pair of head lamp units (225, 226) having LEDs as the light sources, a DRL unit 227, an extension reflector 228, and a control apparatus 242. The laser light source unit 224 and the LED light source units (225, 226) are fixed to a plate-like support member 229 and are attached to the lamp body 222 via the support member 229 and multiple aiming screws 230 in a vertically and laterally tiltable manner. Meanwhile, the DRL unit 227 and the extension reflector 228 are fixed to the lamp body 222. In the present example, the DRL unit 227 may be tilted together with the head lamp units (225, 226) by fixing the DRL unit 227 to the support member 229.

The head lamp units (225, 226) having white LEDs as the light sources have a metal bracket 231 fixed to the support member 229, LED light emitters 232 fixed to the bracket 231, reflectors 233, and transparent or semitransparent projection lenses 234. The luminous flux B14 in white emitted from the LED light emitters 232 is reflected forward by the reflectors 233 and passes through the projection lens 234 and the front cover 223, thereby forming the light distribution pattern in front of the vehicle.

The laser light source unit 224 includes a laser light generation portion 235 and an optical mechanism 236. The laser light generation portion 235 has a heat-radiation member 237 fixed to the support member 229, multiple laser diodes 238 attached to the heat-radiation member 237, multiple first condensing lenses 239, and multiple dichroic mirrors 240. For example, as the multiple laser diodes 238, laser diodes in multiple colors of RGB (red, green, and blue) are employed. Laser light emitted from the laser diodes 238 is subjected to parallel light by the first condensing lenses 239. Thereafter, the laser light is reflected or transmitted toward a reflection portion 243 of the below-described optical mechanism 236 by the multiple dichroic mirrors 240.

The optical mechanism 236 is configured to have a so-called MEMS mirror. The optical mechanism 236 is fixed to the support member 229 so as to tilt from behind in the forward direction. Moreover, the optical mechanism 236 is connected to the control apparatus 242 which is fixed to the lamp body 222. The optical mechanism 236 has the reflection portion 243 which is subjected to silver deposition or plating processing and can oscillate vertically and laterally at a high speed based on a command of the control apparatus. The optical mechanism 236 causes the reflection portion 243 reflecting laser light B15 to oscillate vertically and laterally at a high speed, and depicts the attention calling mark in front of the vehicle by performing scanning of a predetermined position in front of the vehicle with the laser light B15, thereby functioning as an overhead sign lamp (OHSL) irradiating a sign obliquely above the vehicle by reflecting laser light B16 obliquely upward and performing scanning therewith.

In addition, as illustrated in FIG. 28, above the head lamp units (225, 226), there is provided the DRL unit 227 positioned in front of the optical mechanism 236. As illustrated in FIGS. 27 and 28, the DRL unit 227 is configured to have multiple LED light source units (246a to 246c) formed of the combination of three white LED light emitters (244a to 244c) and reflectors (245a to 245c) formed through silver deposition or the like. The LED light source units (246a, 246c) causing the LED light emitters (244a, 244c) to be oriented upward and the LED light source unit 246b causing the LED light emitter 244b to be oriented downward are disposed in a zig-zag manner.

The three reflectors (245a to 245c) reflect white light of each of the LED light emitters (244a to 244c) and form the light emission area emitting light in white, thereby forming the daytime running lamp (DRL). Among the three reflectors (245a to 245c), an insertion portion 247 for laser light is formed by a gap penetrating the place in the forward-rearward direction. The emission end 243a emitting laser light forward from the vehicle by reflecting light forward in the reflection portion 243 of the optical mechanism 236 is disposed so as to be superimposed within the insertion portion 247 behind the DRL unit 227. The reflection portion 243 reflects the laser light B15 in red or the like other than white or OHSL forming laser light B16 toward the insertion portion 247, performs scanning of a place in front of the vehicle with the rays (B15, B16) of laser light which have passed through the insertion portion 247, performing road surface depiction, and irradiates a sign obliquely above the vehicle.

The luminous fluxes (B15, B16) of laser light in red or the like other than white are surrounded by luminous flux B17 in white from the multiple LED light emitters (244a to 244c) having high luminance. When the laser light B15 in red or the like other than white is emitted from the insertion portion 247, the luminescent color of the reflection point 243a of the reflection portion 243 emitting light is countervailed by white light B17 having high luminance, thereby not being visually recognized by a pedestrian or the driver in the oncoming vehicle ahead. The DRL units (204, 227) in the thirteenth and fourteenth examples may be used as clearance lamp (CLL) units.

The irradiation of the sign positioned obliquely above the depiction of the figure and the vehicle is performed as illustrated in FIG. 29, for example. The laser light source 215 in the thirteenth example and the optical mechanism 236 in the fourteenth example change the orientation of the laser beams (B13, B15, B16) vertically and laterally, thereby performing scanning laterally and repeatedly while moving the orientation downward by a very small length within a rectangular region (the reference sign Sc1) in front of the vehicle. The reference sign S1 indicates the tracking path of the scanning line formed by the laser light B16 when a sign 248 obliquely above the vehicle is irradiated, and the reference sign S2 indicates the tracking path of the scanning line formed by the laser light B15 when depicting the lines L1 along the lane marks M1 on the road surface R1. The dashed line portions of the scanning lines (S1, S2) indicate a light-off state, and the solid line portions thereof indicate a light-on state. As indicated by the scanning line S1, the laser light B16 irradiates the sign 248 by being vertically stacked on the tracking path in the lateral direction at the time of light-on.

In addition, as indicated by the scanning line S2, the rays (B13, B15) of laser light depict the lines L1 adjacent to the lane marks M1 by being vertically stacked on the tracking path in the lateral direction at the time of light-on as described below. The rays (B13, B15) of laser light are in a light-off state in the sections of P1 to P2, and P7 to P8, and are in a light-on in white in the sections of P2 to P3, P4 to P5, and P6 to P7, thereby supplementing the low beam light distribution pattern Lb in white from the head lamp units (206, 226). The rays (B13, B15) of laser light are in a light-on state in red or the like other than white in the sections of P3 to P4, and P5 to P6, thereby depicting the lines L1. On both the right and left sides of the lines L1, it is desirable that a dark line is formed by reducing or performing light-off of light-on laser light in white so as to accentuate the lines L1. The driver visually recognizes the figure such as the lines L1 and other marks or letters formed by the rays (B13, B15) of laser light, thereby being urged to pay the attention to the vehicle so as not to travel in the position deviated from the lane marks M1.

The present invention has been described in detail with reference to particular embodiment forms. It is clear for those skilled in the art that various changes and modifications can be added without departing from the gist and the scope of the present invention.

The invention claimed is:

1. A vehicle lamp comprising: a light source that is able to emit rays of laser light of multiple colors and is able to change the color of irradiation light; and an optical mechanism that performs scanning with the laser light and depicts a figure in an irradiation destination, wherein the light source and the optical mechanism are operated by a control unit which provides a first light distribution comprising rays of laser light of multiple colors and radiates the laser light as white light, a second light distribution which reduces at least rays of laser light of some colors among the rays of the first light distribution and depicts a dark portion in the irradiation destination, and a third light distribution which radiates light other than white light among the rays of laser light of multiple colors and depicts a bright portion within the dark portion.

* * * * *